(12) United States Patent
Kato et al.

(10) Patent No.: US 8,174,737 B2
(45) Date of Patent: May 8, 2012

(54) IMAGE READING APPARATUS

(75) Inventors: Tetsuya Kato, Aichi-ken (JP); Noriko Misumi, Kiyosu (JP); Hiroaki Fujii, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 520 days.

(21) Appl. No.: 12/343,110

(22) Filed: Dec. 23, 2008

(65) Prior Publication Data

US 2009/0185240 A1    Jul. 23, 2009

(30) Foreign Application Priority Data

Dec. 28, 2007  (JP) ................. 2007-340771
Dec. 28, 2007  (JP) ................. 2007-340774
Dec. 28, 2007  (JP) ................. 2007-340776

(51) Int. Cl.
  H04N 1/04   (2006.01)
  H04N 1/40   (2006.01)
  H04N 1/387  (2006.01)
  G06K 9/38   (2006.01)
  G06K 9/48   (2006.01)

(52) U.S. Cl. ........ 358/474; 358/448; 358/452; 382/271; 382/199

(58) Field of Classification Search ............ 358/448, 358/488, 462, 452, 474, 1.15; 382/271, 199, 382/164, 266
See application file for complete search history.

(56) References Cited

U.S. PATENT DOCUMENTS

| | | | | |
|---|---|---|---|---|
| 4,875,104 A * | 10/1989 | Kamon | ............... | 358/400 |
| 5,491,759 A * | 2/1996 | Nagao et al. | ............... | 382/199 |
| 5,969,795 A * | 10/1999 | Honda | ............... | 355/25 |
| 6,433,896 B1 * | 8/2002 | Ueda et al. | ............... | 358/488 |
| 6,466,340 B1 | 10/2002 | Washio | | |
| 7,072,527 B1 * | 7/2006 | Nako | ............... | 382/290 |
| 7,119,926 B2 | 10/2006 | Takeda et al. | | |
| 2004/0170324 A1 * | 9/2004 | Eguchi et al. | ............... | 382/199 |

(Continued)

FOREIGN PATENT DOCUMENTS

JP    S63-280569 A    11/1988

(Continued)

OTHER PUBLICATIONS

Japan Patent Office, Notification of Reason for Refusal for Japanese Patent Application No. 2007-340776 (counterpart to above-captioned patent application), dispatched Jul. 26, 2011.

(Continued)

*Primary Examiner* — Charlotte M Baker
*Assistant Examiner* — Rury Grisham
(74) *Attorney, Agent, or Firm* — Baker Botts L.L.P.

(57) ABSTRACT

An image reading apparatus includes a document table, a read unit that reads a document so as to generate image data representing a read image of the document, a partial prescanning unit, which conveys the read unit in a partial area of a readable area of the document table, and which controls the read unit to execute read operation in the partial area, a corner estimation unit, which converts the image data of the read result of the read unit into edge image data representing an edge image, and which estimates position coordinates on the document table corresponding to two of four corners of the document on the assumption that the placed document is quadrangular based on the edge image data, and a document estimation unit that estimates the state of the placed document based on the estimation result of the corner estimation unit.

26 Claims, 25 Drawing Sheets

U.S. PATENT DOCUMENTS

| | | |
|---|---|---|
| 2005/0226510 A1 | 10/2005 | Eguchi et al. |
| 2007/0065037 A1 | 3/2007 | Honda et al. |
| 2009/0180155 A1* | 7/2009 | Kato et al. .................... 358/448 |

FOREIGN PATENT DOCUMENTS

| | | | |
|---|---|---|---|
| JP | H05-145710 | A | 6/1993 |
| JP | H05-330668 | A | 12/1993 |
| JP | H06-027547 | A | 2/1994 |
| JP | H06-162190 | A | 6/1994 |
| JP | H07-245680 | A | 9/1995 |
| JP | H07-245681 | A | 9/1995 |
| JP | H08-256263 | A | 10/1996 |
| JP | H08-256264 | A | 10/1996 |
| JP | H10-341332 | A | 12/1998 |
| JP | H11-122433 | A | 4/1999 |
| JP | H11-177774 | A | 7/1999 |
| JP | H11-187207 | A | 7/1999 |
| JP | H11-252351 | A | 9/1999 |
| JP | H11-331547 | A | 11/1999 |
| JP | 2000-078355 | A | 3/2000 |
| JP | 2001-036696 | A | 2/2001 |
| JP | 2001-268367 | A | 9/2001 |
| JP | 2001-309114 | A | 11/2001 |
| JP | 2002-142084 | A | 5/2002 |
| JP | 2002-185721 | A | 6/2002 |
| JP | 2003-283766 | A | 10/2003 |
| JP | 2003-348305 | A | 12/2003 |
| JP | 2004-201240 | A | 7/2004 |
| JP | 2004-282517 | A | 10/2004 |
| JP | 2005-285010 | A | 10/2005 |
| JP | 2006-071926 | A | 3/2006 |
| JP | 2006-087027 | A | 3/2006 |
| JP | 2007-082047 | A | 3/2007 |
| JP | 2007-088654 | A | 4/2007 |
| JP | 2007-143036 | A | 6/2007 |

OTHER PUBLICATIONS

Japan Patent Office, Notification of Reason for Refusal for Japanese Patent Application No. 2007-340771 (counterpart to above-captioned patent application), dispatched Aug. 23, 2011.

Japan Patent Office, Notification of Reason for Refusal for Japanese Patent Application No. 2007-340774 (counterpart to above-captioned patent application), dispatched Aug. 23, 2011.

Japan Patent Office, Notification of Reasons for Refusal for Japanese Patent Application No. 2007-340770 (counterpart to above-captioned patent application), dispatched Aug. 16, 2011.

Japan Patent Office, Notification of Reasons for Refusal for Japanese Patent Application No. 2007-340769 (counterpart to above-captioned patent application), dispatched Aug. 16, 2011.

Japan Patent Office, Notification of Reason for Refusal for Japanese Patent Application No. 2007-340771 (counterpart to above-captioned patent application), dispatched Feb. 28, 2012.

* cited by examiner

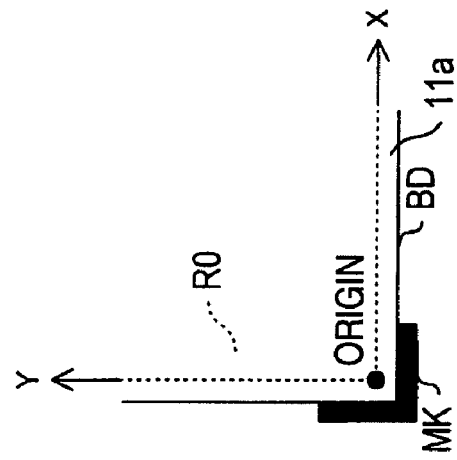
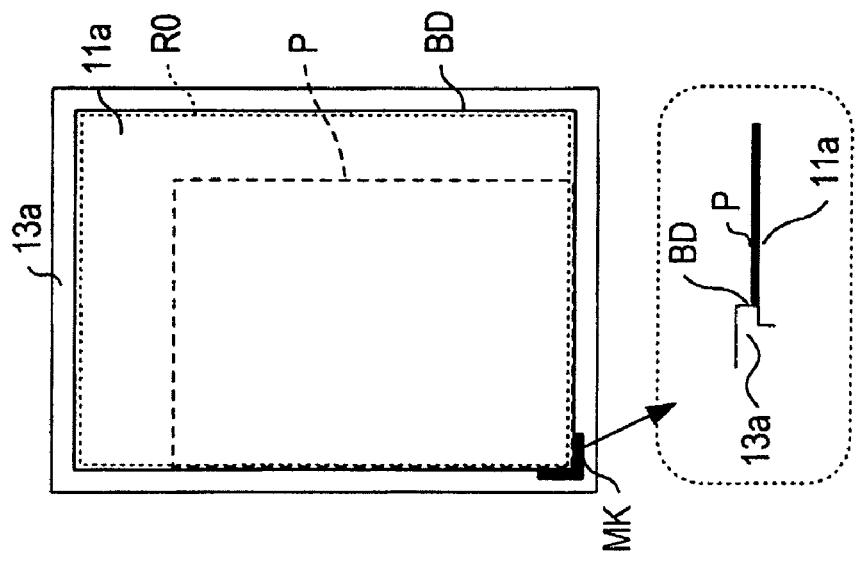

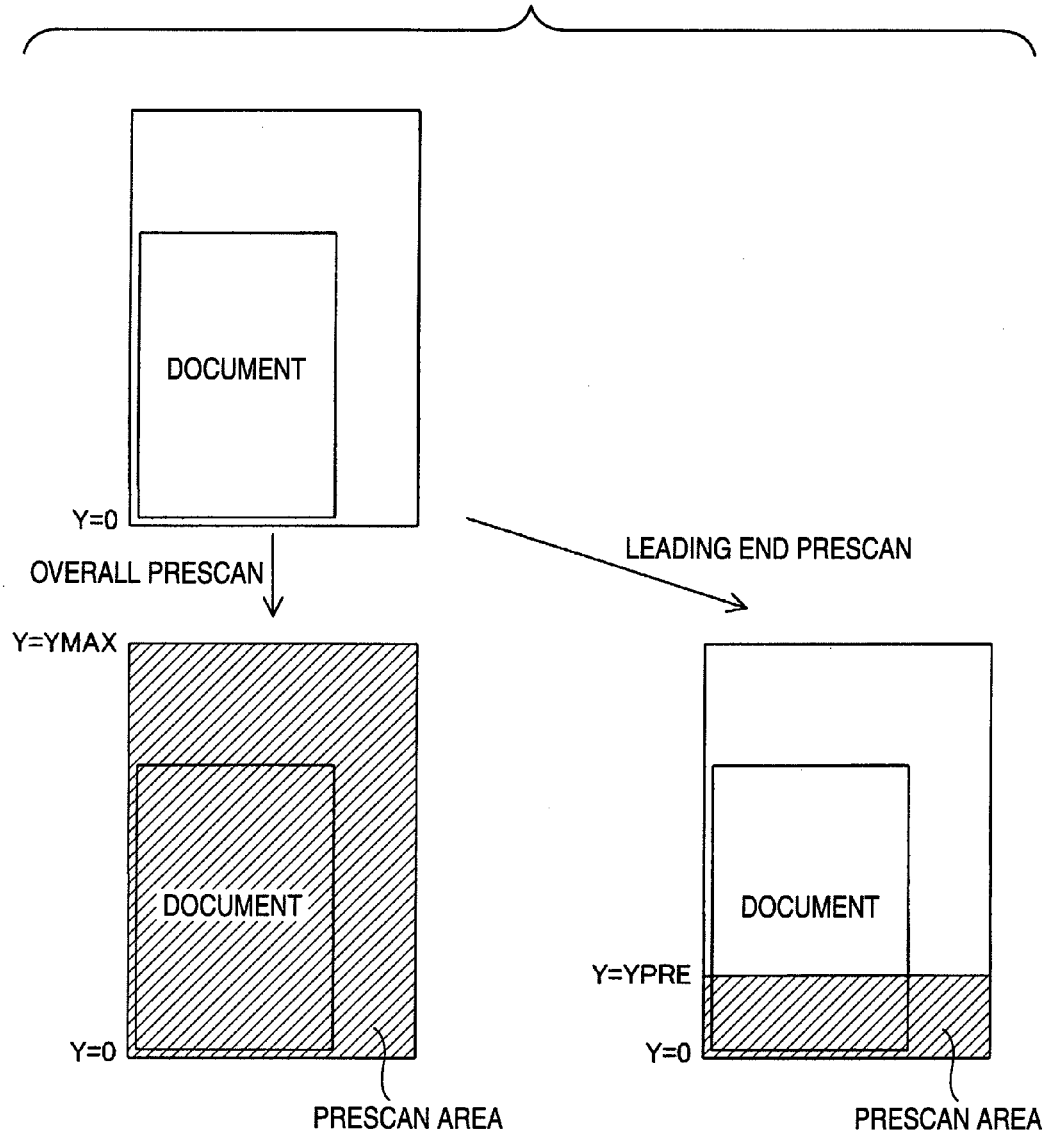

*FIG. 21A*

| | | | | | | | | | | | | | |
|---|---|---|---|---|---|---|---|---|---|---|---|---|---|
|(0,19)|(1,19)|(2,19)|(3,19)|(4,19)|(5,19)|(6,19)|(7,19)|(8,19)|(9,19)|...|(14,19)|(15,19)|(16,19)|
|(0,18)|(1,18)|(2,18)|(3,18)|(4,18)|(5,18)|(6,18)|(7,18)|(8,18)|(9,18)|...|(14,18)|(15,18)|(16,18)|
|(0,17)|(1,17)|(2,17)|(3,17)|(4,17)|(5,17)|(6,17)|(7,17)|(8,17)|(9,17)|...|(14,17)|(15,17)|(16,17)|
|(0,16)|(1,16)|(2,16)|(3,16)|(4,16)|(5,16)|(6,16)|(7,16)|(8,16)|(9,16)|...|(14,16)|(15,16)|(16,16)|
|(0,15)|(1,15)|(2,15)|(3,15)|(4,15)|(5,15)|(6,15)|(7,15)|(8,15)|(9,15)|...|(14,15)|(15,15)|(16,15)|
|(0,14)|(1,14)|(2,14)|(3,14)|(4,14)|(5,14)|(6,14)|(7,14)|(8,14)|(9,14)|...|(14,14)|(15,14)|(16,14)|
|(0,13)|(1,13)|(2,13)|(3,13)|(4,13)|(5,13)|(6,13)|(7,13)|(8,13)|(9,13)|...|(14,13)|(15,13)|(16,13)|
|(0,12)|(1,12)|(2,12)|(3,12)|(4,12)|(5,12)|(6,12)|(7,12)|(8,12)|(9,12)|...|(14,12)|(15,12)|(16,12)|
|(0,11)|(1,11)|(2,11)|(3,11)|(4,11)|(5,11)|(6,11)|(7,11)|(8,11)|(9,11)|...|(14,11)|(15,11)|(16,11)|
|(0,10)|(1,10)|(2,10)|(3,10)|(4,10)|(5,10)|(6,10)|(7,10)|(8,10)|(9,10)|...|(14,10)|(15,10)|(16,10)|
|(0,9)|(1,9)|(2,9)|(3,9)|(4,9)|(5,9)|(6,9)|(7,9)|(8,9)|(9,9)|...|(14,9)|(15,9)|(16,9)|
|(0,8)|(1,8)|(2,8)|(3,8)|(4,8)|(5,8)|(6,8)|(7,8)|(8,8)|(9,8)|...|(14,8)|(15,8)|(16,8)|
|(0,7)|(1,7)|(2,7)|(3,7)|(4,7)|(5,7)|(6,7)|(7,7)|(8,7)|(9,7)|...|(14,7)|(15,7)|(16,7)|
|(0,6)|(1,6)|(2,6)|(3,6)|(4,6)|(5,6)|(6,6)|(7,6)|(8,6)|(9,6)|...|(14,6)|(15,6)|(16,6)|
|(0,5)|(1,5)|(2,5)|(3,5)|(4,5)|(5,5)|(6,5)|(7,5)|(8,5)|(9,5)|...|(14,5)|(15,5)|(16,5)|
|(0,4)|(1,4)|(2,4)|(3,4)|(4,4)|(5,4)|(6,4)|(7,4)|(8,4)|(9,4)|...|(14,4)|(15,4)|(16,4)|
|(0,3)|(1,3)|(2,3)|(3,3)|(4,3)|(5,3)|(6,3)|(7,3)|(8,3)|(9,3)|...|(14,3)|(15,3)|(16,3)|
|(0,2)|(1,2)|(2,2)|(3,2)|(4,2)|(5,2)|(6,2)|(7,2)|(8,2)|(9,2)|...|(14,2)|(15,2)|(16,2)|
|(0,1)|(1,1)|(2,1)|(3,1)|(4,1)|(5,1)|(6,1)|(7,1)|(8,1)|(9,1)|...|(14,1)|(15,1)|(16,1)|
|(0,0)|(1,0)|(2,0)|(3,0)|(4,0)|(5,0)|(6,0)|(7,0)|(8,0)|(9,0)|...|(14,0)|(15,0)|(16,0)|

SUBSCANNING DIRECTION ↑  MAIN SCANNING DIRECTION →

*FIG. 21B*

| | | |
|---|---|---|
|(0,19)|(8,19)|(16,19)|
|(0,18)|(8,18)|(16,18)|
|(0,17)|(8,17)|(16,17)|
|(0,16)|(8,16)|(16,16)|
|(0,15)|(8,15)|(16,15)|
|(0,14)|(8,14)|(16,14)|
|(0,13)|(8,13)|(16,13)|
|(0,12)|(8,12)|(16,12)|
|(0,11)|(8,11)|(16,11)|
|(0,10)|(8,10)|(16,10)|
|(0,9)|(8,9)|(16,9)|
|(0,8)|(8,8)|(16,8)|
|(0,7)|(8,7)|(16,7)|
|(0,6)|(8,6)|(16,6)|
|(0,5)|(8,5)|(16,5)|
|(0,4)|(8,4)|(16,4)|
|(0,3)|(8,3)|(16,3)|
|(0,2)|(8,2)|(16,2)|
|(0,1)|(8,1)|(16,1)|
|(0,0)|(8,0)|(16,0)|

*FIG. 21C*

|(0,16)|(1,16)|(2,16)|(3,16)|(4,16)|(5,16)|(6,16)|(7,16)|(8,16)|(9,16)|...|(14,16)|(15,16)|(16,16)|
|---|---|---|---|---|---|---|---|---|---|---|---|---|---|
|(0,8)|(1,8)|(2,8)|(3,8)|(4,8)|(5,8)|(6,8)|(7,8)|(8,8)|(9,8)|...|(14,8)|(15,8)|(16,8)|
|(0,0)|(1,0)|(2,0)|(3,0)|(4,0)|(5,0)|(6,0)|(7,0)|(8,0)|(9,0)|...|(14,0)|(15,0)|(16,0)|

IMAGE READING APPARATUS

CROSS-REFERENCE TO RELATED APPLICATIONS

This application claims priority from Japanese Patent Application No. 2007-340771 filed on Dec. 28, 2007, Japanese Patent Application No. 2007-340774 filed on Dec. 28, 2007, and Japanese Patent Application No. 2007-340776 filed on Dec. 28, 2007, which are incorporated herein by reference.

TECHNICAL FIELD

Apparatuses consistence with the invention relate to an image reading apparatus for reading a document placed on a document table through a read unit to generate image data representing a read image of the document placed oil the document table.

Further, apparatuses consistence with the invention relate to an image reading apparatus for conveying a read unit and reading an image reflected in a document table through a read unit to generate image data representing a read image of a document placed on the document table.

Still further, apparatuses consistence with the invention relate to an image analysis apparatus for analyzing image data representing a read image of a document, generated by an image reading apparatus and an image reading apparatus including the function of the image analysis apparatus.

BACKGROUND

There has been proposed an image reading apparatus including a read unit below read glass for executing read operation through the read unit while conveying the read unit below the read glass so as to read a document placed on the read glass and generate image data representing a read image of the document.

If the image reading apparatus has a copy function, the generated image data is supplied to print processing, for example. That is, the image data representing the read image is supplied to print processing, whereby a copy image of the read document is printed on a record sheet of paper. As for such an image reading apparatus having the copy function, there has been proposed a digital multifunction device having a printer function, a fax function, etc., as well as the copy function.

Further, there has also been proposed an image reading apparatus for keeping track of an area where a document is placed on read glass by prescanning and then at the scanning time, limiting the read area to the area where the document is placed rather than the whole area below the read glass and conveying a read unit in the read area for reading the document.

In addition, there has been proposed an image reading apparatus for detecting the size and the inclination of a document tabled on the read result of the document through a read unit (refer to JP-A-11-252351, JP-A-2007-082047, and JP-A-2007-088654). An image reading apparatus using the detection result of the size and the inclination of a document for the automatic setting operation of a read area at the scanning time and the automatic setting operation of a scaling factor and the inclination correction operation at the copying time has also been proposed.

For examples the scaling factor is set conforming to the ratio between the document size and the record sheet size from the detected document size and the record sheet size, the rotation amount is set from the inclination of the document, the image data as the read result is rotated for correcting the inclination and is scaled up or down conforming to the setup scaling factor, and the image of the read document is printed on the record sheet at the scaling factor matched with the record sheet size.

For example, the scaling factor is set conforming to the ratio between the detected document size and the record sheet size, the rotation amount is set from the inclination of the document, the image data as the read result is rotated for correcting the inclination and is scaled up or down conforming to the setup scaling factor, and the image of the read document is printed on the record sheet at the scaling factor matched with the record sheet size.

There has also been proposed a flatbed image reading apparatus including a read unit below read glass for reading a document placed on the read glass through the read unit below the read glass (for example, refer to JP-A-8-256263, JP-A-8-256264, and JP-A-2005-285010). In this kind of image reading apparatus, while the read unit is conveyed below the read glass, read operation is executed through the read unit, whereby the document placed on the read glass is read and image data representing a read image of the document is generated.

An image reading apparatus for reading a document to be read, placed on read glass through a read unit and detecting a document edge (end margin of document) from the read result has also been proposed. As for an image reading apparatus having a copy function, there has been proposed an image reading apparatus for detecting a document edge from the read result provided by prescanning, detecting the size and the inclination of the document to be read, and setting the scaling factor, the inclination correction amount, etc., based on information of the detected document size and inclination.

SUMMARY

One aspect of the invention provides an apparatus capable of estimating the size, the inclination, the placement area, etc., of a document efficiently and precisely in an image reading apparatus for conveying a read unit and reading a document placed on a document table through the read unit.

Another aspect of the invention provides an apparatus capable of estimating the document state with accuracy from a small amount of information contained in the read result.

Still another aspect of the invention provides an apparatus capable of suppressing the effect of dust and detecting a document edge appropriately in an apparatus for detecting a document edge (an end margin of a document) from image data as the read result through a read unit.

BRIEF DESCRIPTION OF THE DRAWINGS

FIGS. 2A and 2B are schematic representations to show a readable area of read glass;

FIG. 5 is a schematic representation to represent a read area of whole prescanning processing and a read area of leading end prescanning processing;

FIGS. 21A to 21C are schematic representations to describe generation methods and compositions of low resolution data;

DETAILED DESCRIPTION

<General Overview>

Figure 1A:
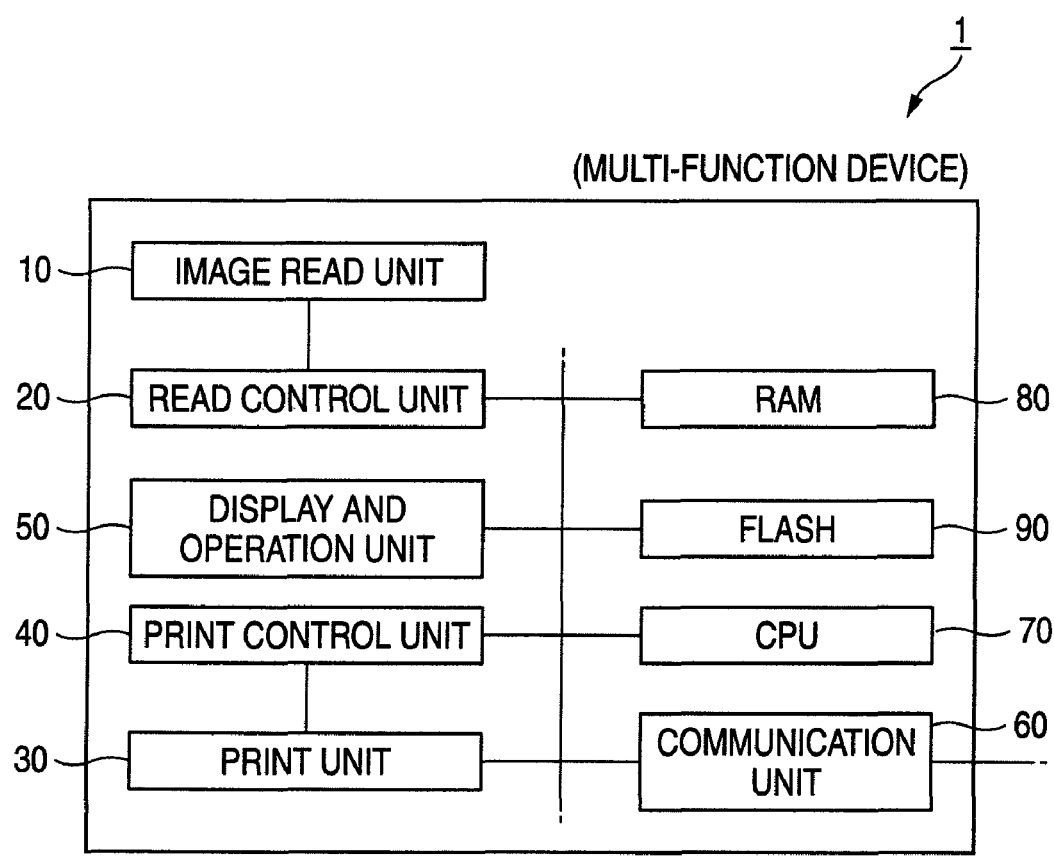
FIGS. 1A to 1C are block diagrams of a multi-function device.

The related art described above has some disadvantages. For example, in the technique of reading the whole document and finding the size, the inclination, the placement area, etc., of the document from the whole image, how a document of what size is placed is unknown before the read operation. Thus, the read unit must be conveyed over the readable area below the read glass for executing the read operation and time is required for the read operation of the document. That is, fruitless read operation must be executed for an area where the document does not exist.

JP-A-2007-082047 discloses a technique of estimating the document size based on the read result of a partial area of a document. However, the technique of conveying a document to be read, determining the document range and the document range outside from change in read data before and after the passage of the document and estimating the document size is premised on conveying of the document. Thus, if the technique is diverted for an image reading apparatus for conveying a read unit and reading an image of a document with the document standing still on read glass, it may be difficult to solve the problem described above.

That is, to divert the technique for the image reading apparatus for conveying the read unit and reading an image of a document with the document standing still on the read glass, an image with no document placed on the read glass needs to be read and fruitless read operation may be required to be executed for the area where no document exists.

In contrast, if reading the whole document is skipped and the document state of the document size, the inclination, the placement area, etc., is found from the read result of a partial area of the document, only the area on the read glass where a document always exists may be read and the document state may be found from the read result and fruitless read operation need not be performed for an area where the document does not exist.

However, in the technique of finding the document state of the document size, the inclination, the placement area, etc., from the read result of a partial area, the document state needs to be estimated from information contained in the read result (image data) less than information provided when the whole document is read. Thus, it is hard to find the document state with accuracy, because the document information contained in the read result is too small.

Incidentally, in the flatbed image reading apparatus, an image reflected on the read glass is read below the read glass with a document placed on the read glass. Thus, if dust (a hair, etc.,) is placed on the read glass, the dust is also read and an image other than the document appears in the image data as the read result.

Therefore, to analyze the image data in which such a dust image appears and detect a document edge, there is a possibility that an erroneous document edge may be detected as the detection function is deceived by the dust image.

For example, to detect a document edge, a method of converting the image data as the read result into edge image data representing an edge image and detecting a document edge from an edge point distribution of the edge image data is possible. However, if a document edge is detected according to the method, there is a possibility that an erroneous document edge may be detected because the edge point distribution corresponding to the dust image is similar to the edge point distribution corresponding to the document edge.

One aspect of the invention provides an apparatus capable of estimating the size, the inclination, the placement area, etc., of a document efficiently and precisely in an image reading apparatus for conveying a read unit and reading a document placed on a document table through the read unit.

Another aspect of the invention provides an apparatus capable of estimating the document state with accuracy from a small amount of information contained in the read result.

Still another aspect of the invention provides an apparatus capable of suppressing the effect of dust and detecting a document edge appropriately in an apparatus for detecting a document edge (an end margin of a document) from image data as the read result through a read unit.

According to a first aspect of the invention, there is provided an image reading apparatus comprising: a document table; a read unit, which is movable along the document table, and which reads a document placed on the document table so as to generate image data representing a read image of the document; a partial prescanning unit, which conveys the read unit in a partial area of a readable area of the document table that can be read through the read unit, and which controls the read unit to execute read operation in the partial area, a corner estimation unit, which converts the image data of the read result of the read unit provided by the operation of the partial prescanning unit into edge image data representing an edge image, and which estimates position coordinates on the document table corresponding to two of four corners of the document on the assumption that the document placed on the document table is quadrangular based on the edge image data; and a document estimation unit that estimates the state of the document placed on the document table based on the estimation result of the corner estimation unit.

According to the image reading apparatus of the invention, a part of the readable area is prescanned and the document state is estimated based on the read result without estimating the document state (the document size, the document inclination, the document placement area, etc.,) based on the image data of the read result produced by prescanning the whole readable area as former. Therefore, according to the invention, the prescanning operation can be completed at higher speed than the prescanning technique of the whole readable area and the document state can be estimated efficiently.

However, to prescan only a part of the readable area without prescanning the whole readable area, the whole image of a document cannot be read by prescanning. Thus, in the invention, assuming that the document placed on the document table is a quadrangular document, the position coordinates of the two corners of the document placed on the document table are estimated and the document state is estimated based on the estimation result.

The document to be read is often a quadrangular blank form with a given aspect ratio and reading any other document than the blank form is scarce. Further, if the document to be read is any other document than the blank form, the case where the document to be read largely differs from the shape of the blank form is also scarce.

In contrast, a corner of the document to be read may be broken, etc., in the process in which the document is placed on the document plate. However, if an attempt is made to estimate the document state also considering the case where the document to be read is not quadrangular in a state in which the whole image of the document to be read cannot be read as in the invention, it becomes difficult to estimate the precise document size, inclination, etc., as a broken corner misleads the estimation.

Then, in the invention, assuming that the document placed on the document table is a quadrangular document, the corner positions are estimated and the document state is estimated based on the estimation result. If the corner positions of the document are thus estimated on the assumption that the document placed on the document table is a quadrangular document, the document inclination and the length of a side of the document can be derived from the information of the estimated corner positions and the whole image of the document containing the portion placed on any other area than the prescan area on the document table if a corner of the document is broken so long as the document placed on the document table is actually quadrangular.

Therefore, according to the invention, the document state (the document size, the document inclination, the document placement area, etc.,) can be estimated efficiently and precisely in the image reading apparatus for conveying the read unit and reading the document placed on the document table through the read unit.

According to a second aspect of the invention, in the image reading apparatus, the document estimation unit is configured to: estimate the length of one side of the document placed on the document table from the length between the position coordinates of the two corners estimated by the corner estimation unit; estimate the length of the side of the document orthogonal to that side from the estimated length of the side on the assumption that the document placed on the document table is a blank form; and estimate the size of the document placed on the document table as the state of the document placed on the document table.

According to the above-described document estimation unit, so long as the document placed on the document table is a blank form, the corner positions of the document and the document size can be precisely estimated by prescanning a partial area and the document inclination and the document placement area can also be precisely derived from the information.

In the invention, if the document placed on the document table is not a blank form) the likelihood (accuracy) of the estimation operation of the state of the document is lowered; however, the document to be read is generally a blank form and thus the effect of erroneous estimation is small. Therefore, according to the invention, the document state (the document size, the document inclination, the document placement area, etch,) can be estimated more efficiently and precisely than was previously possible.

According to a third aspect of the invention, in the image reading apparatus, the corner estimation unit is configured to: extract edge points corresponding to three sides of the document placed on the document table from the edge points indicated by the edge image data; and estimate that the position coordinates of two intersection points of three lines provided by approximating the extracted edge points corresponding to each side to a line are the position coordinates corresponding to the corners of the document placed on the document table.

According to the above-described corner estimation unit, when a corner of the document placed on the document table is broken, etc., the corner positions of the document can be precisely estimated as no corners of the document are broken. Consequently, the document size, inclination, etc., can be precisely estimated.

To precisely estimate the document state based on the image data provided by executing the read operation of a partial area of the readable area of the document table, preferably the document image is much reflected on the partial area.

Therefore, in the image reading apparatus described above, preferably the document table is made quadrangular to the shape of the document, one specific corner of the four corners of the document table is defined as the position with which a corner of the document is to be matched, and the partial area is determined with the specific corner as the reference.

According to a fourth aspect of the invention, in the image reading apparatus, the document table has a substantially quadrangular shape, and one specific corner of four corners is defined as a corner with which a corner of the document is to be matched, and the partial prescanning unit assumes that an area from an end margin of the document table forming one side of the document table extending from the specific corner of the document table to a position at a predetermined distance from the end margin to the inside of the document table, the area corresponding to the readable area is the partial area.

According to a fifth aspect of the invention, in the image reading apparatus, the partial prescanning unit assumes that an area from an end margin of the document table forming one side of the document table extending from the specific corner of the document table to a position at a predetermined distance from the end margin to the inside of the document table, the area corresponding to the readable area, is the partial area, and the corner estimation unit extracts the edge points corresponding to a first side of the document to be placed along a first side of the document table, the edge points corresponding to a second side of the document to be placed along a second side extending from the specific corner of the document table and perpendicular to the first side, and the edge points corresponding to a third side of the document parallel to the second side of the document as the edge points corresponding to the three sides of the document placed on the document table from the edge points indicated by the edge image data.

According to the above-described image reading apparatus, the partial area can be determined so that two corners of the document are reflected, and the prescanning operation can be realized. Thus, the corner estimation unit can precisely estimate the corners and consequently the document state can be estimated precisely.

The document estimation unit can estimate a placement area of the document on the document table as the state of the document, and the image reading apparatus can perform the following operation using the estimation result of the document estimation unit.

That is, according to a sixth aspect of the invention, in the image reading apparatus, the document estimation unit estimates a placement area of the document on the document table as the state of the document, the image reading apparatus further comprises a read area determination unit that determines that the area on the document table corresponding to the placement area of the document estimated by the document estimation unit is the read area through the read unit, and the image reading apparatus conveys the read unit in the read area determined by the read area determination unit and controls the read unit to execute the read operation so as to generate the image data representing the read image of the document.

According to the above-described image reading apparatus, as the efficient prescanning operation is performed, a transition can be made rapidly to scanning and the read operation is performed only for the read area corresponding to the placement area of the document at the scanning time, so that the image data corresponding to the document placed on the document table can be generated rapidly. That is, according to the invention, the image data representing the read result of the document placed on the document table can be generated at high speed.

According to a seventh aspect of the invention, in the image reading apparatus, the document estimation unit estimates the state of the document by estimating the size of the document placed on the document table based on the estimation result of the corner estimation unit and estimating the inclination of the document placed on the document table with respect to the document table based on the inclination of at least one of the three lines provided by approximating the edge points corresponding to each side of the document to a line, and the image reading apparatus corrects an inclination of the image data of the read result of the read unit based on information of the inclination estimated by the document estimation unit and generates the image data representing the read image of the document placed on the document table.

According to the above-described image reading apparatus, as the efficient prescanning operation is performed, a transition can be made rapidly to scanning and if the document is placed in an inclined manner the inclination of the read image data can be corrected and straight and clear image data can be generated at the scanning time.

According to an eighth aspect of the invention, in the image reading apparatus, the document estimation unit estimates the inclination of the document from the position coordinates of the two corners estimated by the corner estimation unit as the state of the document.

The technique of estimating the document state by prescanning only the partial area of the readable area is inferior in preciseness of the estimation operation to the technique of estimating the document state by prescanning the whole readable area. Thus, more preferably, the described image reading apparatus would be able to prescan the whole readable area and estimate the document state.

That is, according to a ninth aspect of the invention, the image reading apparatus comprises; an overall prescanning unit, which conveys the read unit in the whole readable area of the document table, and which controls the read unit to execute the read operation in the whole readable area of the document table; a subdocument estimation unit that estimates the state of the document placed on the document table based on the read result of the read unit provided by the operation of the overall prescanning unit; and a switching unit that allows either of the partial prescanning unit and the overall prescanning unit to operate in accordance with an external command.

According to the above-described image reading apparatus, the whole readable area can be prescanned to estimate the document state as required, so that the image reading apparatus can operate in an appropriate mode in response to a user's request and can generate the image data representing the read image of the document.

According to a tenth aspect of the invention, there is provided an image reading apparatus comprising: a document table that is transparent, a read unit that reads an image of a document placed on the document table through the document table so as to generate image data representing the read image of the document; a conversion unit that converts the image data of the read result of the read unit into edge image data representing an edge image; a corner estimation unit, which extracts edge points corresponding to each side of the document placed on the document table from the edge points indicated by the edge image data provided by the conversion unit, and which estimates the position coordinates of each corner of the document placed on the document table from information of an approximate line of each side provided by approximating the edge points corresponding to each side to a line on the assumption that the document placed on the document table is quadrangular; and a convex strip, against which the document placed on the document table is struck, wherein the document table has a specific side defined as a side with which a side of the document is to be matched, wherein the convex strip is provided at an outer margin corresponding to the specific side of the document table, and wherein, if extracting the edge points of the side where the edge points are to be extracted results in failure, the corner estimation unit estimates the position coordinates of each corner of the document placed on the document table from the approximate line of each side where extracting the edge points results in success on the assumption that the document placed on the document table is quadrangular and that any corner of the document placed on the document table is struck against the convex strip.

The conversion unit converts the image data of the read result of the read unit into edge image data representing an edge image. In contrast, corner estimation unit extracts edge points corresponding to each side of the document placed on the document table from the edge points indicated by the edge image data provided by the conversion unit and estimates the position coordinates of each corner of the document placed on the document table from information of an approximate line of each side provided by approximating the edge points corresponding to each side to a line on the assumption that the document placed on the document table is quadrangular.

If extracting the edge points of the side where the edge points are to be extracted results in failure, the corner estimation unit estimates the position coordinates of each corner of the document placed on the document table from the approximate line of each side where extracting the edge points results in success on the assumption that any corner of the document placed on the document table is struck against the convex strip.

If matching (striking) one side of the document with (against) the specific side of the document table is adopted as a regular use method as in the invention, of course, the possibility that any corner of the document placed on the document table may be struck against the specific side is high.

Therefore, when extracting the edge points results in failure and the position coordinates of each angle of the document cannot be estimated according to a usual method, if the position coordinates of each angle of the document are estimated provided that any corner of the document placed on the document table is struck against the specific side, the position coordinates of each corner of the document placed on the document table can be estimated precisely for the most part even in a small amount of information with insufficient information of the edge points whose extracting results in failure.

For example, according to the invention, the corner positions of the document can also be estimated appropriately from the information of the edge points that can be extracted in an environment in which it is hard to precisely extract the edge points corresponding to each corner of the document because an end of the document table is an unreadable area, etc.

Thus, according to the image reading apparatus, the position coordinates of each corner of the document can be estimated with accuracy and the document state of the document size, the document inclination, the placement position of the document on the document table, etc., can be estimated in various situations and the subsequent processing can be executed with high accuracy based on the estimated document state.

For example, the document placement area can be estimated from the information of the corner positions of the document and the read area can be set precisely based on the estimation result and the automatic setting operation of a read area at the scanning time can be well executed. In addition, the document size and the document inclination can be estimated from the information of the corner positions of the document and at the copying time, the automatic setting operation of a scaling factor and the inclination correction operation can be well executed from the information of the document size and the document inclination.

In the image reading apparatus wherein the document table is made quadrangular and two sides extending from one specific corner of the document table are defined each as the specific side with which a side of the document is to be matched, the corner estimation unit can be configured as follows.

That is, according to an eleventh aspect of the invention, in the image reading apparatus, the document table has a substantially quadrangular shape, and two sides extending from one specific corner of the document table are defined each as the specific side with which a side of the document is to be matched, and the corner estimation unit is configured to: extract the edge points corresponding to a first side of the document to be placed along a first side of the document table corresponding to the specific side, a second side of the document to be placed along a second side of the document table corresponding to the specific side, and a third side of the document parallel to the second side of the document as the sides where the edge points are to be extracted; and estimate the position coordinates of the corner connecting the first and second sides of the document placed on the document table and the position coordinates of the corner connecting the first and third sides of the document as the position coordinates of each corner of the document placed on the document table, and, if extracting the edge points corresponding to the first or second side results in failure, the corner estimation unit estimates the position coordinates of the corner connecting the first and second sides of the document placed on the document table and the position coordinates of the corner connecting the first and third sides of the document from the approximate line of each side where extracting the edge points results in success on the assumption that the document placed on the document table is quadrangular and that the corner connecting the first and second sides of the document placed on the document table is struck against the convex strip.

Further, according to a twelfth aspect of the invention, in the image reading apparatus, if extracting the edge points corresponding to the second side of the document results in failure and extracting the edge points corresponding to the third side of the document results in success, the corner estimation unit estimates the position coordinates of the corner connecting the first and third sides of the document from information of the edge points corresponding to the third side and estimates that the position coordinates of the point where a line passing through the estimated position coordinates of the corner connecting the first and third sides of the document and perpendicular to an approximate line of the edge points corresponding to the third side of the document crosses the specific side of the document table are the position coordinates of the corner connecting the first and second sides of the document.

According to the above-described image reading apparatus, if extracting the edge points corresponding to the second side of the document results in failure, the position coordinates of the corner connecting the first and second sides of the document placed on the document table and the position coordinates of the corner connecting the first and third sides can be estimated precisely.

In the image reading apparatus wherein an end of the document table is an unreadable area, as described above, if two sides extending from one specific corner are defined as the specific sides with which sides of the document are to be matched, the possibility that extracting the edge points corresponding to the first and second sides of the document may result in failure becomes high. In contrast, the possibility that the third side of the document may put on an unreadable area is low. Therefore, if each corner of the document is thus estimated based on the third side of the document, various situations are covered appropriately and each corner of the document can be estimated precisely.

According to a thirteenth aspect of the invention, in the image reading apparatus, if extracting the edge points corresponding to the first side of the document results in failure and extracting the edge points corresponding to the second and third sides of the document results in success, the corner estimation unit estimates that the position coordinates of the intersection point of an approximate line of the edge points corresponding to the second side of the document and the first side of the document table are the position coordinates of the corner connecting the first and second sides of the document and estimates that the position coordinates of the point where a line passing through the estimated position coordinates of the corner connecting the first and second sides of the document and perpendicular to the approximate line of the edge points corresponding to the third side of the document crosses the approximate line of the third side of the document are the position coordinates of the corner connecting the first and third sides of the document.

When each corner of the document is thus estimated based on the second and third sides of the document, when extracting the edge points corresponding to the first side of the document results in failure, each corner position of the document can also be estimated precisely.

According to a fourteenth aspect of the invention, the image reading apparatus further comprises: a prescanning unit, which conveys the read unit in a partial area of a readable area of the document table, the partial area belonging to an area from the first side of the document table to a position at a predetermined distance from the first side to the inside of the document table, and which controls the read unit to execute read operation in the partial area, and wherein the corner estimation unit estimates the position coordinates of each corner of the document placed on the document table using the edge image data into which the conversion unit converts the image data of the read result of the read unit provided by the operation of the prescanning unit.

In the technique of reading only the partial area of the document table when estimating the document state, the read operation need not be executed for the area where no document is placed and thus the document state can be estimated at high speed; while, the amount of information on which estimating of the document state is based lessens. Then, if the corner positions of the document are estimated on the assumption that a corner of the document is stuck against the end (corner) of the document table as in the invention, even in the technique of reading only the partial area of the document table, the document state can be estimated appropriately in various situations. Consequently, according to the invention, the image reading apparatus having both of the preciseness and the high speed of processing involved in estimation of the document can be provided for the user.

According to a fifteenth aspect of the invention, the image reading apparatus further comprises; a document estimation unit, which estimates the length of one side of the document placed on the document table from the length between the position coordinates of the two corners estimated by the corner estimation unit, and which estimates the length of the side of the document orthogonal to that side from the estimated length of the side on the assumption that the document placed on the document table is a blank form.

According to the above-described image reading apparatus, the height and the width of the document can be detected precisely by as much as reading the partial area of the document table.

According to a sixteenth aspect of the invention, there is provided an image analysis apparatus for analyzing image data representing a read image of a document generated by an image reading apparatus, the image reading apparatus comprising: a document table on which a quadrangular document is placed; a read unit that reads the document placed on the document table; and a read control unit that controls the read unit to read the document placed on the document table so as to generate the image data representing the read image of the document placed on the document table, an end margin of the document being placed along a specific direction on the document table, wherein the image analysis apparatus comprises: a detection unit that referencing the pixel values of pixels forming the image data generated by the read control unit and analyzing the image data so as to adopt either the end margin of the document extending in a first direction as the specific direction and the end margin of the document extending in a second direction perpendicular to the specific direction as the end margin to be detected and detecting the end margin to be detected in the image data, and wherein the detection unit references the pixel values of the pixels forming the image data at a first distance interval in the direction perpendicular to the direction in which the end margin to be detected extends, of the first and second directions and references the pixel values of the pixels forming the image data in a skip manner at a second distance interval wider than the first distance interval in the direction in which the end margin to be detected extends, of the first and second directions to detect the end margin to be detected in the image data.

The detection unit references the pixel values of pixels forming the image data generated by the read control unit, analyzes the image data, and detects the end margin of the document. Specifically, the detection unit adopts either the end margin of the document extending in a first direction as the specific direction and the end margin of the document extending in a second direction perpendicular to the specific direction as the end margin to be detected and detects the end margin to be detected in the image data.

Specifically, the detection unit references the pixel values of the pixels forming the image data at a first distance interval in the direction perpendicular to the direction in which the end margin to be detected extends, of the first and second directions and references the pixel values of the pixels forming the image data in a skip manner at, a second distance interval wider than the first distance interval in the direction in which the end margin to be detected extends, of the first and second directions. The detection unit of the invention thus references the image data, thereby analyzing the image data and detecting the end margin to be detected in the image data.

To detect an end margin of the document in the image data, if an image pattern similar to the end margin of the document in the image data is formed in the presence of dust, there is a possibility that an erroneous document edge may be detected receiving the effect of the image pattern. However, the area where the image pattern formed in the presence of dust is formed is limited as compared with the area where an image pattern is formed as an end margin of the document. That is, generally the length of dust is smaller than the length of the end margin of the document, and the image pattern formed in the presence of dust is sufficiently shorter than the image pattern formed as the end margin of the document.

Then, in the invention, the pixel values are referenced roughly in a skip manner in the direction in which the end margin of the document to be detected extends, whereby a dust image pattern is prevented from appearing as an image pattern similar to the end margin of the document at the reference point. The "second distance interval" can be determined by an experiment, etc., based on the size of dust having a high possibility that it may be placed on the document table.

In the invention, the pixel values are not roughly referenced in the direction perpendicular to the direction in which the end margin of the document to be detected extends. The reason is as follows: The image pattern of the end margin of the document continues long in the direction in which the end margin of the document to be detected extends. The end margin of the document is linear and the image pattern is not much thick in the direction perpendicular to the direction in which the end margin of the document extends and if the pixel values are roughly referenced in the direction perpendicular to the direction in which the end margin of the document to be detected extends, there is a possibility that the image pattern corresponding to the end margin of the document cannot be found.

That is, in the invention, the pixel values are roughly referenced in the direction in which the end margin of the document to be detected extends and the pixel values are finely referenced in the direction perpendicular to the direction in which the end margin of the document extends, so that the effect of dust, etc., can be suppressed and the end margin of the document can be detected appropriately in the image data.

According to a seventeenth aspect of the invention, in the image analysis apparatus, in the image reading apparatus, the end margin of the document is placed along a main scanning direction as the specific direction or a subscanning direction perpendicular to the main scanning direction on the document table, and the read control unit conveys the read unit in the subscanning direction along the document table and causes the read unit to read the document placed on the document table in the main scanning direction so as to generate two-dimensional image data with pixels arranged in the main scanning direction and the subscanning direction as the image data representing the read image of the document placed on the document table.

According to an eighteenth aspect of the invention, the image analysis apparatus further comprises: a conversion unit that converts the image data generated by the read control unit into image data representing an edge image, wherein the detection unit references the pixel values of the pixels forming the image data representing the edge image provided by the conversion unit and detects the end margin to be detected in the image data representing the edge image provided by the conversion unit.

Thus, if the image data generated by the read control unit is converted into edge image data through an image filter (differential filter), etc., and the end margin of the document is made to appear clearly in the image data, the end margin of the document can be detected with still higher accuracy from the image data as the read result produced by the read control unit.

According to a nineteenth aspect of the invention, in the image analysis apparatus, the detection unit is configured to: reference the pixel values of the pixels forming the image data representing the edge image provided by the conversion unit front an end of the image data to the inside thereof in the perpendicular direction to the direction in which the end margin to be detected extends so as to detect an edge point as a candidate for the end margin to be detected; reference the pixel values of the pixels forming the image data representing the edge image provided by the conversion unit in the direction in which the end margin to be detected extends, of the first and second directions with the edge point as the candidate as the base point and checks the edge point for continuity so as to evaluate likelihood of the edge point as the candidate as the end margin to be detected; and detect edge points, which are continuous from the edge point as the candidate evaluated to be likely as the end margin to be detected in the direction in which the end margin to be detected extends, as the end margin to be detected.

According to the above-described detection unit, a search is made for the edge points corresponding to the end margin of the document from the end of the image data to the inside thereof, so that the edge points corresponding to a ruled line, etc., drawn in a document are prevented from being erroneously detected as the edge points corresponding to the end margin of the document, and the end margin of the document can be detected from the image data still more appropriately.

According to a twentieth aspect of the invention, in the image analysis apparatus, the detection unit selects each of the end margin of the document extending in the first direction and the end margin of the document extending in the second direction as the end margin to be checked so as to detect each of the end margin of the document extending in the first direction and the end margin of the document extending in the second direction in the image data.

According to the above-described image analysis apparatus, two or more orthogonal sides of the document can be detected, so that the document area in the image data can be easily estimated. For example, the estimation result can be made useful when the document data is extracted from the image data. In addition, the estimation result can be made useful for the scaling factor setting operation and the inclination correction amount setting operation at the copy operation time.

According to a twenty-first aspect of the invention, there is provided an image analysis apparatus for analyzing image data representing a read image of a document generated by an image reading apparatus, the image reading apparatus comprising: a document table on which a quadrangular document is placed; a read unit that reads the document placed on the document table; and a read control unit that conveys the read unit in a subscanning direction along the document table and controls the read unit to read the document placed on the document table in a main scanning direction perpendicular to the subscanning direction so as to generate two-dimensional image data with pixels arranged in the main scanning direction and the subscanning direction as the image data representing the read image of the document placed on the document table, an end margin of the document being placed along the main scanning direction or the subscanning direction on the document table, wherein the image analysis apparatus comprises: a first analysis target generation unit that lowers a resolution in the main scanning direction in the image data generated by the read control unit so as to generate first image data to be analyzed; a second analysis target generation unit that lowers a resolution in the subscanning direction in the image data generated by the read control unit so as to generate second image data to be analyzed; a first detection unit that references the pixel values of pixels forming the first image data to be analyzed and analyzes the image data so as to detect the end margin of the document extending in the main scanning direction in the image data; and a second detection unit that references the pixel values of pixels forming the second image data to be analyzed and analyzes the image data so as to detect the end margin of the document extending in the subscanning direction in the image data.

When the image analysis apparatus is configured so as to generate the image data to be analyzed and detect the end margin of the image data from the image data, the image analysis apparatus can realize processing equivalent to that of the above-described image analysis apparatus for referencing the pixels in a skip manner and can provide similar advantages to those of the above-described image analysis apparatus.

The first analysis target generation unit described above can convert the image data generated by the read control unit into image data representing an edge image and can lower the resolution in the main scanning direction in the image data before and after the conversion, thereby generating the image data representing the edge image with the resolution lowered in the main scanning direction as the first image data to be analyzed.

According to a twenty-second aspect of the invention, in the image analysis apparatus, the first analysis target generation unit converts the image data generated by the read control unit into image data representing an edge image and lowers the resolution in the main scanning direction in the image data before and after the conversion so as to generate the image data representing the edge image with the resolution lowered in the main scanning direction as the first image data to be analyzed, and the second analysis target generation unit converts the image data generated by the read control unit into image data representing an edge image and lowers the resolution in the subscanning direction in the image data before and after the conversion so as to generate the image data representing the edge image with the resolution lowered in the subscanning direction as the second image data to be analyzed.

According to a twenty-third aspect of the invention, in the image analysis apparatus, the first detection unit is configured to: reference the pixel values of the pixels forming the first image data to be analyzed from an end of the image data to the inside thereof in the subscanning direction so as to detect an edge point as a candidate for the end margin to be detected; reference the pixel values of the pixels forming the first image data to be analyzed in the main scanning direction with the edge point as the candidate as the base point and checks the edge point for continuity so as to evaluate likelihood of the edge point as the candidate as the end margin of the document extending in the main scanning direction; and detect edge points, which are continuous in the main scanning direction from the edge point as the candidate evaluated to be likely as the end margin of the document extending in the main scanning direction, as the end margin of the document extending in the main scanning direction, and the second detection unit is configured to: reference the pixel values of the pixels forming the second image data to be analyzed from an end of the image data to the inside thereof in the main scanning direction so as to detect an edge point as a candidate for the end margin to be detected; reference the pixel values of the pixels forming the second image data to be analyzed in the subscanning direction with the edge point as the candidate as the base point and checks the edge point for continuity so as to evaluate likelihood of the edge point as the candidate as the end margin of the document extending in the subscanning direction, and detect edge points, which are continuous in the subscanning direction from the edge point as the candidate evaluated to be likely as the end margin of the document extending in the subscanning direction, as the end margin of the document extending in the subscanning direction.

According to the above-described first and second analysis target generation units and the first and second detection units, the end margin of the document can be detected from the image data still more appropriately.

According to a twenty-fourth aspect of the invention, there is provided an image reading apparatus comprising: a document table on which a quadrangular document is placed; a read unit that reads the document placed on the document table; a read control unit that controls the read unit to read the document placed on the document table so as to generate the image data representing the read image of the document placed on the document tables an end margin of the document being placed along a specific direction on the document table; and the image analysis apparatus according to the sixteenth aspect.

According to a twenty-fifth aspect of the invention, there is provided an image reading apparatus comprising: a document table on which a quadrangular document is placed; a read unit that reads the document placed on the document table; a read control unit that conveys the read unit in a subscanning direction along the document table and controls the read unit to read the document placed on the document table in a main scanning direction perpendicular to the subscanning direction so as to generate two-dimensional image data with pixels arranged in the main scanning direction and the subscanning direction as the image data representing the read image of the document placed on the document table, an end margin of the document being placed along the main scanning direction or the subscanning direction on the document table; and the image analysis apparatus according to the twenty-first aspect.

According to a twenty-sixth aspect of the invention, there is provided an image reading apparatus comprising: a document table on which a quadrangular document is placed; a read unit that reads the document placed on the document table; and a read control unit that conveys the read unit in a subscanning direction along the document table and controls the read unit to read the document placed on the document table in a main scanning direction perpendicular to the subscanning direction so as to generate two-dimensional image data with pixels arranged in the main scanning direction and the subscanning direction as the image data representing the read image of the document placed on the document table, an end margin of the document being placed along the main scanning direction or the subscanning direction on the document table, wherein the read control unit is configured to: generate first image data with the resolution in the main scanning direction lower than the resolution in the subscanning direction; and generate the second image data with the resolution in the subscanning direction lower than the resolution in the main scanning direction as the two-dimensional image data, and wherein the image reading apparatus further comprises: a first detection unit that references the pixel values of pixels forming the first image data and analyzes the image data so as to detect the end margin of the document extending in the main scanning direction in the image data; and a second detection unit that references the pixel values of pixels forming the second image data and analyzes the image data so as to detect the end margin of the document extending in the subscanning direction in the image data.

According to the above-described image reading apparatus, the effect of dust, etc., can be suppressed and the end margin of the document can be detected appropriately in the image data according to a similar principle to that described above. Consequently, information of the end margin of the document can be made useful for the scaling factor setting operation, the inclination correction operation, etc., at the copy operation time, and the operation can be realized precisely.

EXEMPLARY EMBODIMENTS

Exemplary embodiments of the invention will be described with reference to the accompanying drawings.

First Exemplary Embodiment

FIG. 1A is a block diagram to represent the configuration of a digital multi-function device 1 of a first exemplary embodiment of the invention. As shown in FIG. 1A, the digital multi-function device 1 of the exemplary embodiment includes an image read unit 10, a read control unit 20, a print unit 30, a print control unit 40, a display and operation unit 50, a communication unit 60, a CPU 70, RAM 80, and flash memory 90. It executes various types of processing by the CPU 70 based on a program recorded in the flash memory 90 and controls the whole apparatus.

Figure 1B:
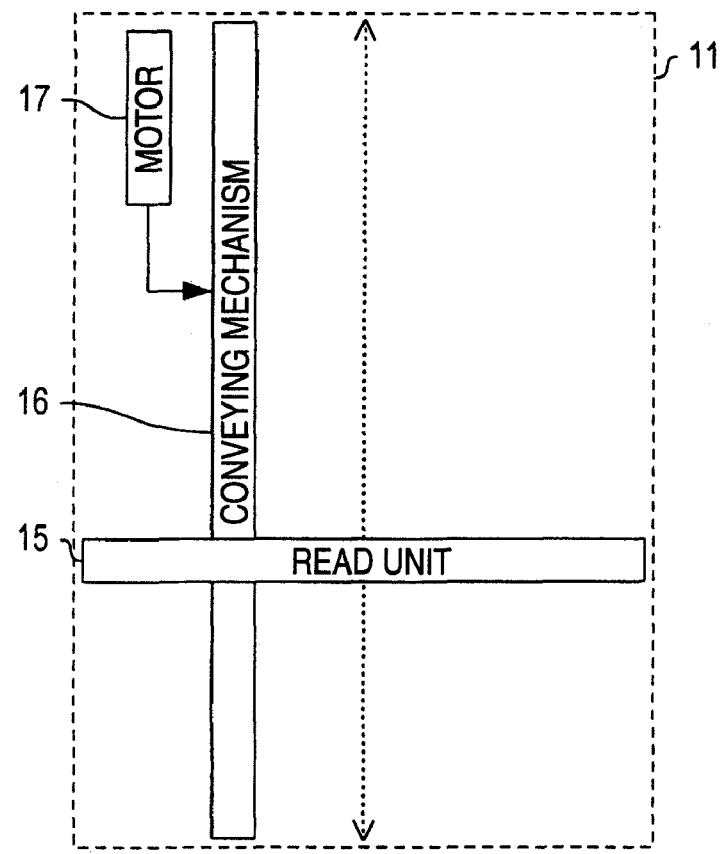
Figure 1C:
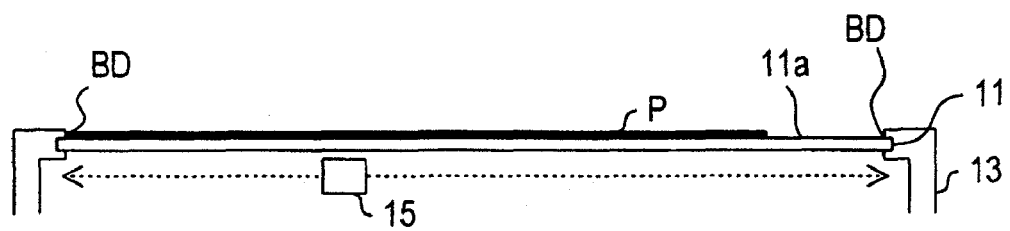

Specifically, the image read unit 10 has the configuration shown in FIGS. 1B and 1C. FIGS. 1B and 1C are schematic representations to show the configuration of the image read unit 10. In the image read unit 10, transparent plate read glass 11 on which a document P to be read is placed is supported on a cabinet 13. The image read unit 10 includes a read unit 15 for optically reading an image reflected on the read glass 11 in a main scanning direction, a conveying mechanism 16 for conveying the read unit 15 in a subscanning direction, and a drive motor 17 for driving the conveying mechanism 16, which are below the read glass 11 in the cabinet 13.

The image read unit 10 drives the conveying mechanism 16 by the rotation force of the motor 17 in accordance with a control signal input from the read control unit 20, thereby conveying the read unit 15 in the subscanning direction (in the dotted arrow direction shown in FIGS. 1B and 1C) below the read glass 11, and executes the read operation through the read unit 15 at the conveying time.

The read unit 15 is a contact image sensor (CIS) for moving in the subscanning direction, reading an image reflected on the read glass 11 for each line, and outputting a line image signal representing the read image under the control of the read control unit 20. The line image signal output from the read unit 15 is converted into digital data (line image data) by an A/D converter (not shown) and the digital data (line image data) is input to the read control unit 20.

Like a scanner, the image read unit 10 is provided with a lid (not shown) that can cover the read glass 11 as the lid can be opened and closed. When the read operation is executed through the read unit 15, the user closes the lid so as to put the lid on a document placed on the read glass 11 by manual operation. The inside of the lid opposed to the read glass 11 is formed of a white member so as to prevent an image of the lid from being reflected on the read image of the document. That is, the inside of the lid opposed to the read glass 11 is provided with a white member so that a black shadow is not reflected on a document outside area in image data of the read result of the read unit 15.

In contrast, the read control unit 20 executes read control processing in accordance with a command from the CPU 70 and controls a move of the read unit 15 in the subscanning direction and also controls the read operation of the read unit 15 in the read control processing.

By performing the control, the read control unit 20 reads an image reflected on a read area of the read glass 11 specified from the CPU 70 through the read unit 15 while conveying the read unit 15 in the subscanning direction below the read glass 11, and records the image data representing the image reflected on the read area of the read glass 11 in the RAM 80. As the operation is performed, the image data representing the read image of the document P placed on the read area of the read glass 11 (for example, two-dimensional image data with pixels arranged in the main scanning direction and the subscanning direction) is recorded in the RAM 80.

The read control unit 20 once stores each piece of line image data input from the image read unit 10 in an internal buffer and executes image processing of a shading correction, etc., for the line image data and then records the line image data in the RAM 80.

In addition, the print unit 30 conveys a record sheet of paper placed on a tray (not shown) to a record position in accordance with a control signal input from the print control unit 40 and forms an image corresponding to the control signal on the record sheet according to a record system of ink jet, laser print, etc.

The print control unit 40 controls the print unit 30 to form an image on a record sheet. It prints an image based on the print data specified from the CPU 70 on a record sheet through the print unit 30 in accordance with a command from the CPU 70.

The communication unit 60 is made up of interfaces for communicating with external machines; it is made up of a USB interface, a LAN interface, a fax modem, etc. That is, the multi-function device 1 can conduct fax communications with an external fax machine through the fax modem included in the communication unit 60 and can communicate with at external personal computer through the USB interface or the LAN interface.

In addition, the display and operation unit 50 includes a liquid crystal display (not shown) for information display and various operation keys. It displays user-oriented information on the liquid crystal display and inputs a command entered by the user through the operation key to the CPU 70 under the control of the CPU 70.

The CPU 70 implements a copy function, a fax function, a scanner function, a printer function, and the like in accordance with a command entered through the operation key and a command input from an external personal computer, etc., through the communication unit 60 by executing a program.

For example, when the user enters a copy command through the operation key provided on the display and operation unit 50, the CPU 70 executes copy control processing (see FIG. 3), controls the units in the apparatus, and prints a read image of a document P placed on the read glass 11 on a record sheet. More specifically, the CPU 60 estimates the size of the document P placed on the read glass 11 based on the read result of the read unit 15, sets a scaling factor from the estimated document size and the record sheet size, scales up or down the read image of the document P to the size fitted to the record sheet size, and prints the read image on the record sheet through the print unit 30.

The copy control processing will be specifically described. Prior to the description, the characteristic of the image read unit 10 of the exemplary embodiment will be discussed with FIGS. 2A and 2B.

FIGS. 2A and 2B are schematic representations to show a readable area R0 of the read glass 11. In the multi-function device 1, the read glass 11 of a rectangular, glass plate is provided so as to close an opening of the cabinet 13 shaped like a rectangular parallelepiped with one face opened, and the surrounding of the read glass 11 is supported by the cabinet 13.

The read glass 11 is provided slightly below the upper face of the cabinet 13, and a boundary BD between an area 11a of the read glass 11 exposed from the cabinet 13 (which will be hereinafter referred to as "document table") and the cabinet 13 is formed with a step against which a document P can be struck. (Hereinafter, a part of the cabinet 13 positioned above the read glass 11 (a part forming the step) 13a will be hereinafter referred to as "frame.")

In the image read unit 10, from the relationship between the line width of the read unit 15 and the size of the document table 11a, the quadrangular area R0 slightly narrower than the whole area of the quadrangular document table 11a is defined as the readable area R0 wherein a document can be read through the read unit 15. Specifically, the readable area R0 is an area having an outer periphery at a position at a minute distance (in the exemplary embodiment, 3 mm) from the boundary BD between the frame 13a and the read glass 11 as indicated by the dotted line in FIGS. 2A and 2B.

In the image read unit 10, a mark MK to allow the user to strike a corner of a document P as an indication is put in the lower-left portion of the frame 13a. In the exemplary embodiment, the corner of the document table 11a on which the mark MK is put is defined "lower-left corner," the corner of the document table 11a positioned at a point distant in the main scanning direction from the lower-left corner is defined as "lower-right corner." and the corner of the document table 11a positioned at a point distant in the subscanning direction from the lower-left corner is defined as "upper-left corner."

That is, in the multi-function device 1, the lower-left corner of the document table 11a (in other words, the inner lower-left corner of the frame 13a) is defined as the position with which the corner of the document P is to be matched. In the multi-function device 1, two sides extending from the lower-left corner of the document table 11a (left end margin and lower end margin of the document table 11a) are defined as sides with which the sides of the document are to be matched. The multi-function device 1 estimates the document size, etc., and realizes the copy operation of the document on the assumption that the user places the document P so as to be matched with the mark MK for the most part.

In addition, in the multi-function device 1 of the exemplary embodiment, an XY coordinate system wherein the lower-left corner of the readable area R0 corresponding to the lower-left corner of the inside of the frame 13a on which the mark MK is put is an origin, the main scanning direction is an X axis, and the subscanning direction is a Y axis is introduced (see FIG. 2B). The CPU 70 uses the XY coordinate system to execute copy control processing shown in FIG. 3.

Figure 3:
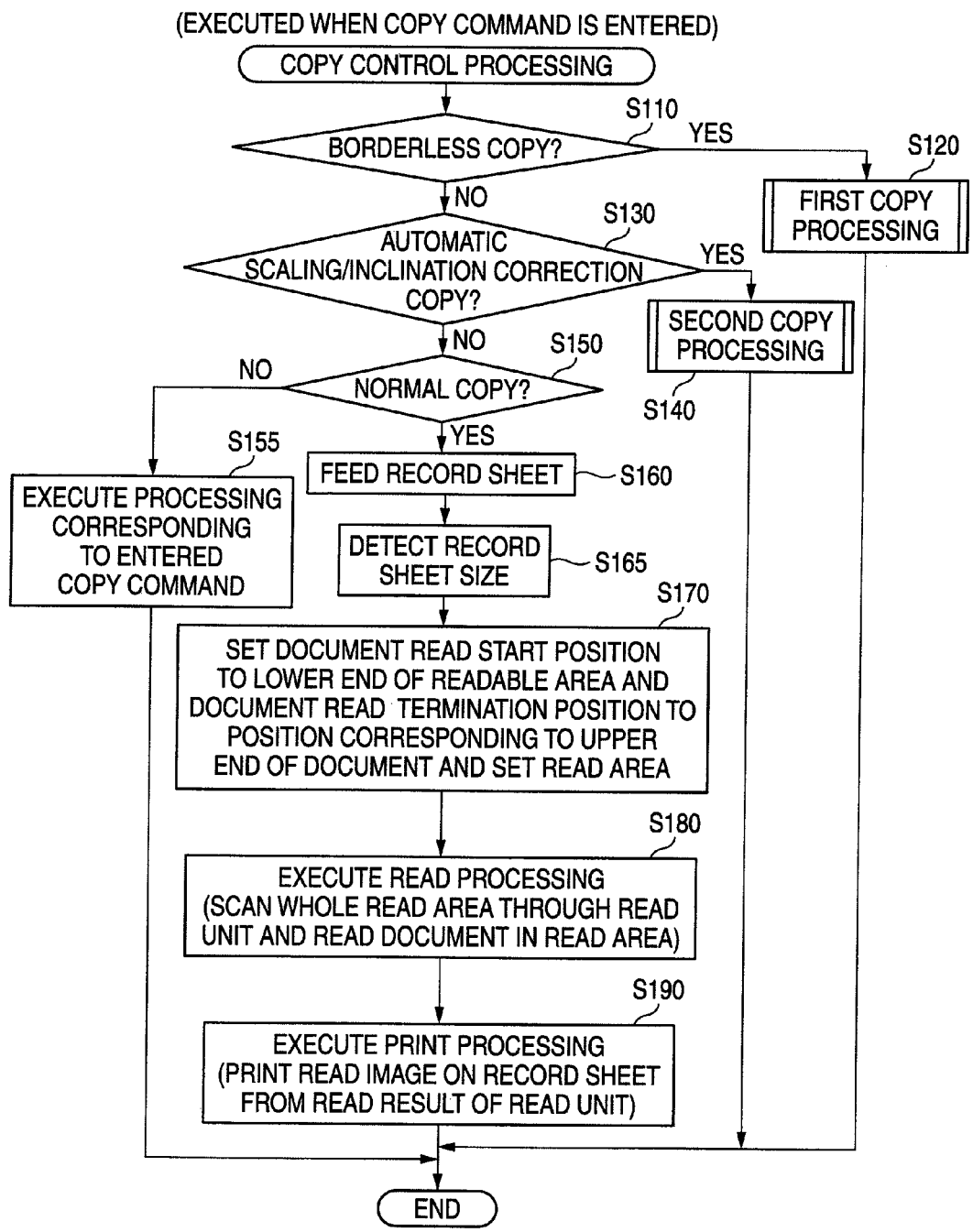
FIG. 3 is a flowchart to represent copy control processing in a first exemplary embodiment of the invention, executed by a CPU.

Subsequently, the copy control processing executed by the CPU 70 will be discussed. FIG. 3 is a flowchart to represent the copy control processing executed by the CPU 70 when the user enters a copy command through the operation key. When starting the copy control processing, the CPU 70 determines whether or not the copy command entered through the operation key is a "borderless" copy command (S110). If the CPU 70 determines that the copy command is a "borderless" copy command (Yes at S110), the CPU 70 goes to S120 and executes first copy processing shown in FIG. 4A.

Although described later in detail, in the first copy processing, the CPU 70 causes the image read unit 10 to execute the prescanning operation over the whole readable area R0, acquires image data of the read result of the whole readable area R0 as the prescanning result from the image read unit 10, estimates the document size and the inclination angle of the document tabled on the image data, and sets a scaling factor and an inclination correction amount. Then, the CPU 70 causes the image read unit 10 to execute the scanning operation, performs scaling up or down and rotation processing of the image data provided by the scanning operation, and prints a copy image of the document as "borderless" on a record sheet through the print unit 30. When exiting the first copy processing, the CPU 70 completes the copy control processing.

In contrast, if the CPU 70 determines that the copy command is not a "borderless" copy command (NO at S110), the CPU 70 determines whether or not the copy command is an "automatic scaling/inclination correction" copy command (S130). If the CPU 70 determines that the entered copy command is an "automatic scaling/inclination correction" copy command (YES at S130), the CPU 70 executes second copy processing shown in FIG. 4B.

Although described later in detail, in the second copy processing, the CPU 70 causes the image read unit 10 to execute the prescanning operation in a partial area of the readable area R0, acquires image data of the read result of the document placed in the partial area as the prescanning result from the image read unit 10, estimates the document size and the inclination angle of the document tabled on the image data, and sets a scaling factor and an inclination correction amount. Then, the CPU 70 causes the image read unit 10 to execute the scanning operation, performs scaling up or down and rotation processing of the image data provided by the scanning operation, and prints a copy image of the document subjected to inclination correction on a record sheet in the size corresponding to the record sheet size through the print unit 30. When exiting the second copy processing, the CPU 70 completes the copy control processing.

If the CPU 70 determines that the copy command entered through the operation key is not an "automatic scaling/inclination correction" copy command (NO at S130), the CPU 70 determines whether or not the entered copy command is a "normal copy" command (S150). If the CPU 70 determines that the copy command is a "normal copy" command (YES at S150), the CPU 70 goes to step S160; if the CPU 70 determines that the copy command is not a "normal copy" command (NO at S150), the CPU 70 executes the processing corresponding to the entered copy command (S155) and then completes the copy control processing.

At S160, the CPU 70 causes the print unit 30 to execute the sheet feed operation through the print control unit 40 and also detects the size of the fed record sheet (S165). The size of the record sheet can be detected according to a technique using a sensor provided in the conveying passage of the record sheet, for example.

Then, based on the detection result at S165, the CPU 70 assumes that the document of the same size as the record sheet size is placed correctly at the specified position on the platen glass 11, and sets the document read start position to the lower end (Y=0) of the readable area R0 and the document read termination position to the position corresponding to the upper end of the document (S170). The CPU 70 thus sets the document read start position to the document read termination position in the read area.

Then, the CPU 70 controls the image read unit 10 through the read control unit 20 and causes the image read unit 10 to convey the read unit 15 in the subscanning direction from the document read start position to the document read termination position. While the read unit 15 is conveyed, the CPU 70 causes the read unit 15 to execute the read operation for each line so as to read an image reflected on the read area on the platen glass 11 and record the image data representing the read result of the read area in the RAM 80 (S180).

Then, the CPU 70 sets the image data representing the read result recorded in the RAM 80 in print data and executes print processing about the print data (S190). That is, the CPU 70 causes the print unit 30 to print an image based on the print data on the fed record sheet through the print control unit 40. The copy image of the document is thus printed on the record sheet without scaling up, scaling down, or inclination correction. Then, the copy control processing is completed.

Figure 4A:
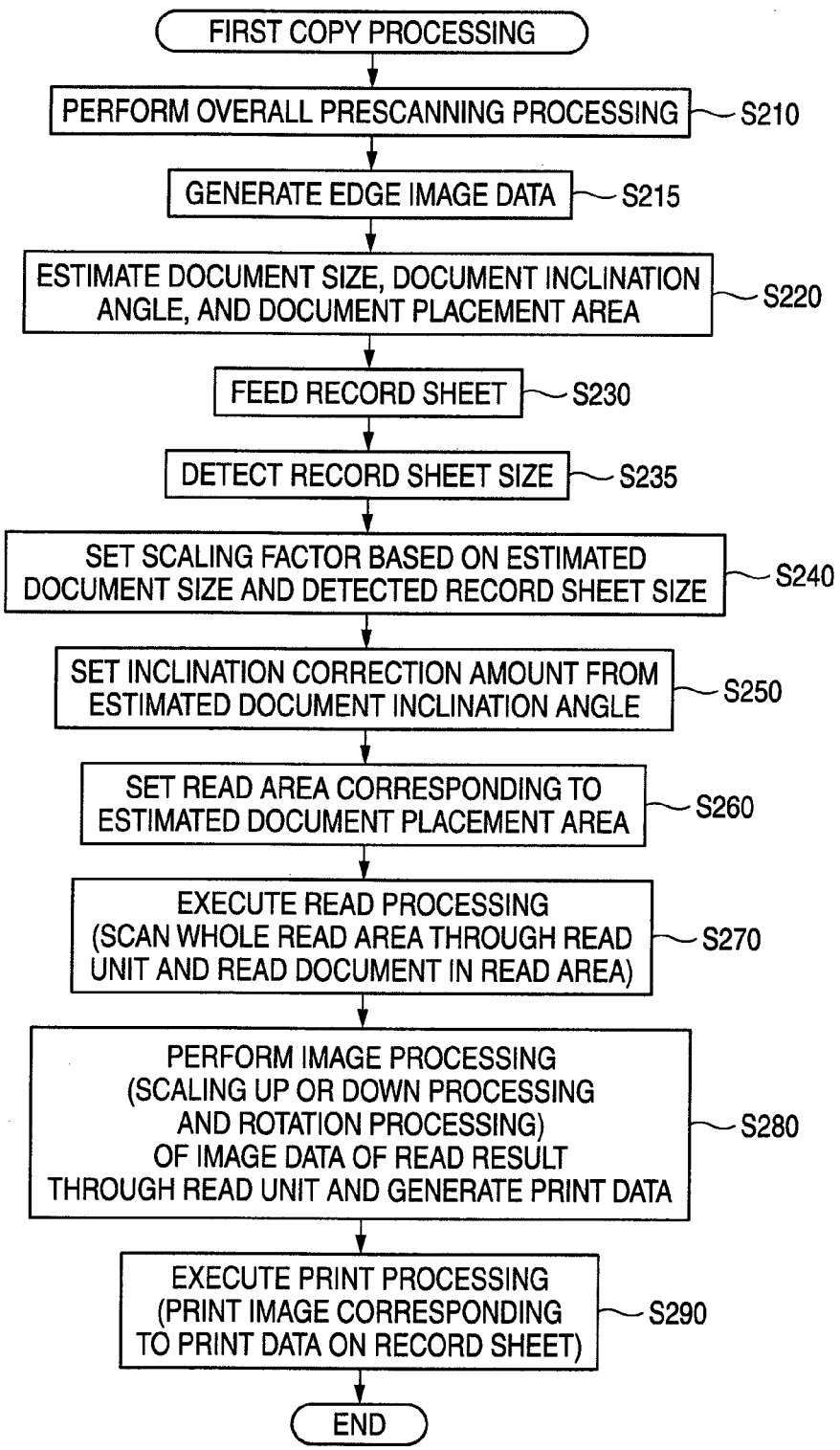
FIG. 4A is a flowchart to represent first copy processing executed by the CPU.

Subsequently, the first copy processing executed at S120 by the CPU 70 will be discussed. FIG. 4A is a flowchart to represent the first copy processing executed by the CPU 70.

When starting the first copy processing, the CPU 70 sets the document read start position to the lower end (Y=0) of the readable area R0 and the document read termination position to the upper end (Y=YMAX) of the readable area KG, thereby setting the whole readable area R0 to the read area, and causes the image read unit 10 to execute the prescanning operation through the read control unit 20 (S210: Overall prescanning processing).

As the prescanning direction, the image read unit 10 executes the operation of conveying the read unit 15 in the subscanning direction at speed corresponding to the resolution for prescanning from one end to the other of the setup read area, causing the read unit 15 to read an image of the read area, and records low-resolution image data as the prescanning result (which will be hereinafter referred to as "prescan image data") in the RAM 80 through the read control unit 20.

After S210, the CPU 70 executes edge detection processing for the prescan image data recorded in the RAM 80 and generates edge image data corresponding to the image data (S215). That is, the CPU 70 passes the prescan image data recorded in the RAM 80 through an image filter for edge detection (such as differential filter) and generates edge image data representing an edge image corresponding to the image data.

Then, the CPU 70 analyzes the generated edge image data and estimates the size (height×width) of the document placed on the document table 11a, an inclination angle θ of the document, and the placement area of the document on the document table 11a (S220). Here, it is assumed that the angle of the lower side of the document with respect to the X axis is the inclination angle θ of the document (see FIG. 9).

After S220, the CPU 70 causes the print unit 30 to execute the sheet feed operation through the print control unit 40 (S230) and also detects the size of the fed record sheet (S235). Further, the CPU 70 sets the scaling factor according to a predetermined calculation expression (specifically, so that the copy image of the document is printed so as to spread to the margin of the record sheet to a maximum extent) based on the document size estimated at S220 and the record sheet size detected at S235 (S240).

In addition, the CPU 70 sets the inclination correction amount of the image data from the document inclination angle θ estimated at S220 (S250). Specifically, the CPU 70 sets the inclination correction amount so that the copy image of the document is printed on the record sheet straightly without any inclination. However, if the estimated document inclination angle θ is a minute amount (in the exemplary embodiment, −0.5 degrees≦θ≦0.5 degrees), an error is also considered and the inclination correction amount is set to zero.

After S250, the CPU 70 sets the document read start position and the document read termination position based on information of the document placement area estimated at S220, and makes the read area defined by the document read start position and the document read termination position correspond to the placement area of the document on the document table 11a (S260).

Specifically, to enable the read unit 15 to read the whole placement area of the document, the document read start position is set to the position corresponding to the end point of the document at the lowest position in the subscanning direction and the document read termination position is set to the position corresponding to the end point of the document at the uppermost position in the subscanning direction so that the read area is made to correspond to the placement area of the document on the document table 11a.

After S260, the CPU 70 controls the image read unit 10 through the read control unit 20, thereby causing the image read unit 10 to convey the read unit 1S in the subscanning direction from the document read start position to the document read termination position and while the read unit 15 is conveyed, causing the read unit 15 to execute the read operation for each line so as to read an image of the setup read area and record the image data representing the read result of the read area in the RAM 80 (S270).

Then, the CPU 70 performs scaling up or down processing of the image data representing the read result recorded in the RAM 80 according to the preset scaling factor, performs rotation processing of the image data as much as the preset inclination correction amount, converts the image data representing the read result into image data for print, and sets the provided image data in print data (S280). However, if the inclination correction amount is set to zero, the rotation processing is skipped at S280.

After S280, the CPU 70 executes print processing about the print data (S290). That is, the CPU 70 causes the print unit 30 to print an image based on the print data on the fed record sheet through the print control unit 40. Then, the copy control processing is completed.

Figure 4B:
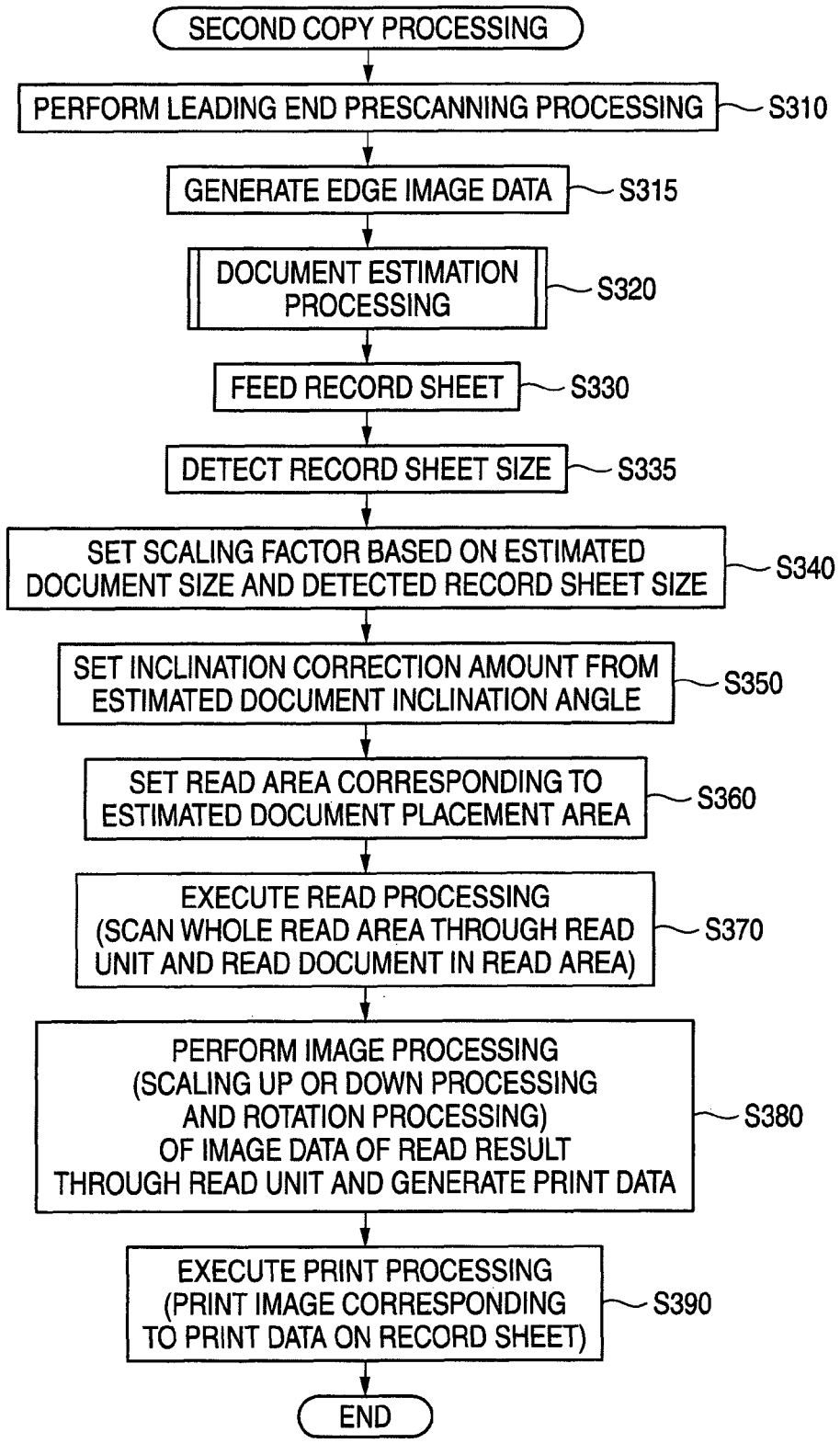
FIG. 4B is a flowchart to represent second copy processing executed by the CPU.

Subsequently, the second copy processing executed at S140 by the CPU 70 will be discussed. FIG. 4B is a flowchart to represent the first copy processing executed by the CPU 70.

When starting the second copy processing, the CPU 70 sets the document read start position to the lower end (Y=0) of the readable area R0 and the document read termination position to a position (Y=YPRE) at a predetermined distance from the lower end of the readable area R0 predetermined at the design stage, thereby setting a part of the readable area R0 to the read area, and causes the image read unit 10 to execute the prescanning operation through the read control unit 20 (S310: Leading end prescanning processing).

FIG. 5 is a schematic representation to represent the difference between the read area of the overall prescanning processing executed in the first copy processing and the read area of the leading end prescanning processing executed in the second copy processing. As shown in FIG. 5, in the second copy processing, the image read unit 10 is caused to execute the prescanning operation from the lower end of the readable area R0 to a point at a predetermined distance from the lower end of the readable area R0 to the inside of the readable area R0 (in the exemplary embodiment, to a point at a distance of 30 mm for the lower end of the readable area R0) rather than caused to execute the prescanning operation over the whole readable area R0 as in the first copy processing.

When thus completing the processing at S310, the CPU 70 executes edge detection processing for the prescan image data (prescanning result) recorded in the RAM 80 and generates edge image data corresponding to the image data (S315). That is, the CPU 70 passes the prescan image data recorded in the RAM 80 through an image filter for edge detection (such as differential filter) and converts the image data into edge image data.

Figure 6:
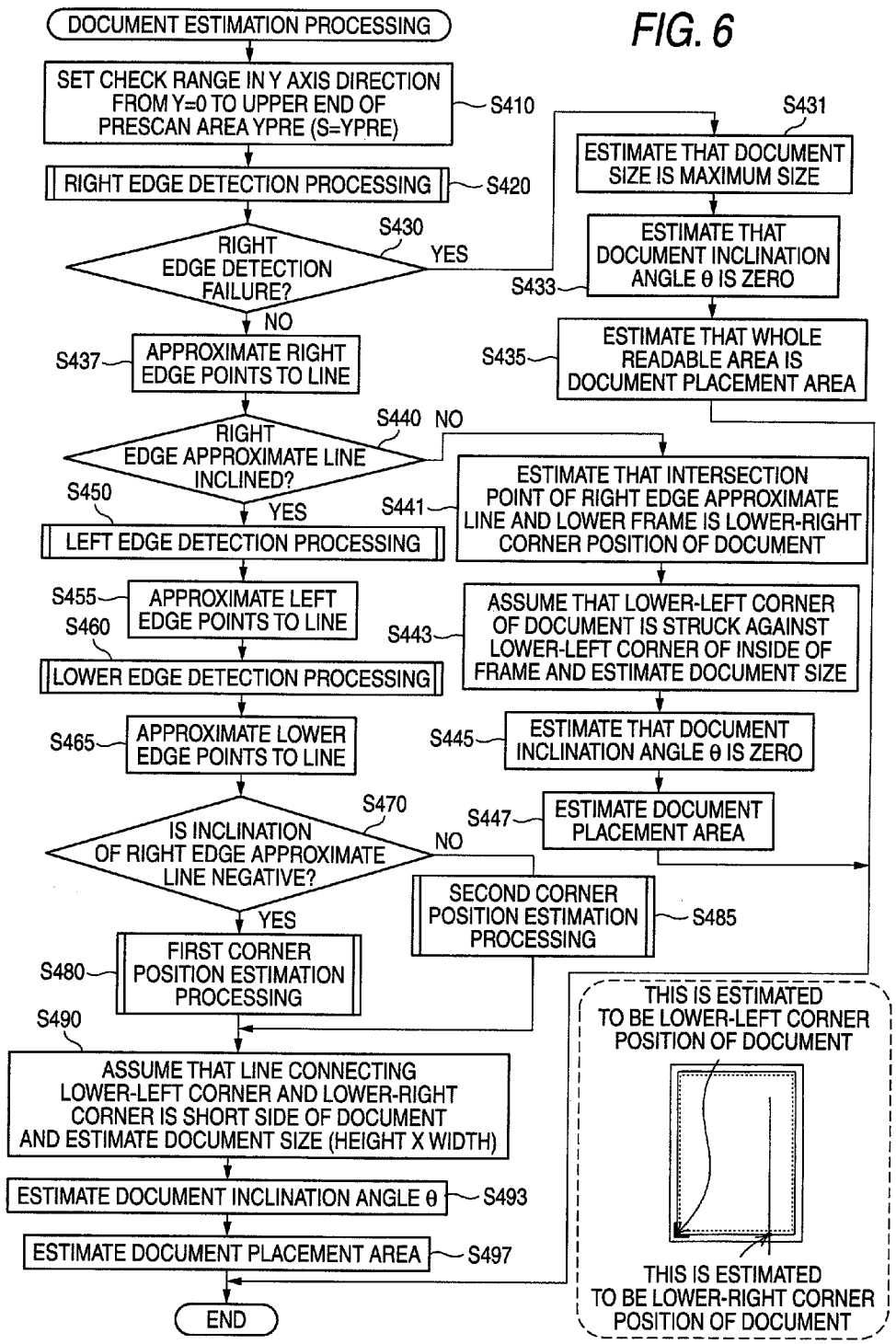
FIG. 6 is a flowchart to represent document estimation processing executed by the CPU.

Then, the CPU 70 sets the edge image data generated at S315 to check target data and executes document estimation processing shown in FIG. 6 at S320. Accordingly, the CPU 70 analyzes the edge image data and estimates the size (height× width) of the document placed on the document table 11a, the inclination angle θ of the document, and the placement area of the document on the document table 11a. Specifically, assuming that the document placed on the document table 11a is a quadrangular blank form with a given aspect ratio, the CPU 70 detects an edge of the document placed on the document table 11a, estimates the lower-left corner position and the lower-right corner position of the document from the detection result, and estimates the size of the document placed on the document table 11a, the inclination angle θ of the document, the placement area of the document tabled on the estimation result (described later in detail).

When exiting the processing at S320, the CPU 70 executes S330 to S390 like S230 to S290.

However, at S340, the CPU 70 sets the scaling factor to the scaling factor corresponding to the ratio between the document size and the record sheet size (for example, record sheet short side length÷document short side length) according to a predetermined calculation expression so that a copy image of the document is printed on the record sheet as it is scaled up according to the scaling factor corresponding to the ratio between the document size and the record sheet size (or is scaled down if the scaling factor is less than 1) in the subsequent processing.

At S350, the CPU 70 sets the inclination correction amount of the image data of the read result so that the copy image of the document is printed on the record sheet straightly from the document inclination angle θ estimated at S320. At S360, the CPU 70 sets the document read start position and the document read termination position based on information of the document placement area estimated at S320, and makes the read area defined by the document read start position and the document read termination position correspond to the placement area of the document on the document table 11a.

Thus, in the second copy processing, the document size, the document inclination angle, and the document placement area are estimated based on the prescanning result of the partial area in the readable area R0 and from the result, the read area at the scanning time (S370 executing time) is determined and the scaling factor and the inclination correction amount are also determined and the copy image of the document is printed on the record sheet in the size corresponding to the record sheet size.

Subsequently, the document estimation processing executed at S320 by the CPU 70 will be discussed with FIG. 6. FIG. 6 is a flowchart to represent the document estimation processing executed by the CPU 70.

Figure 7:
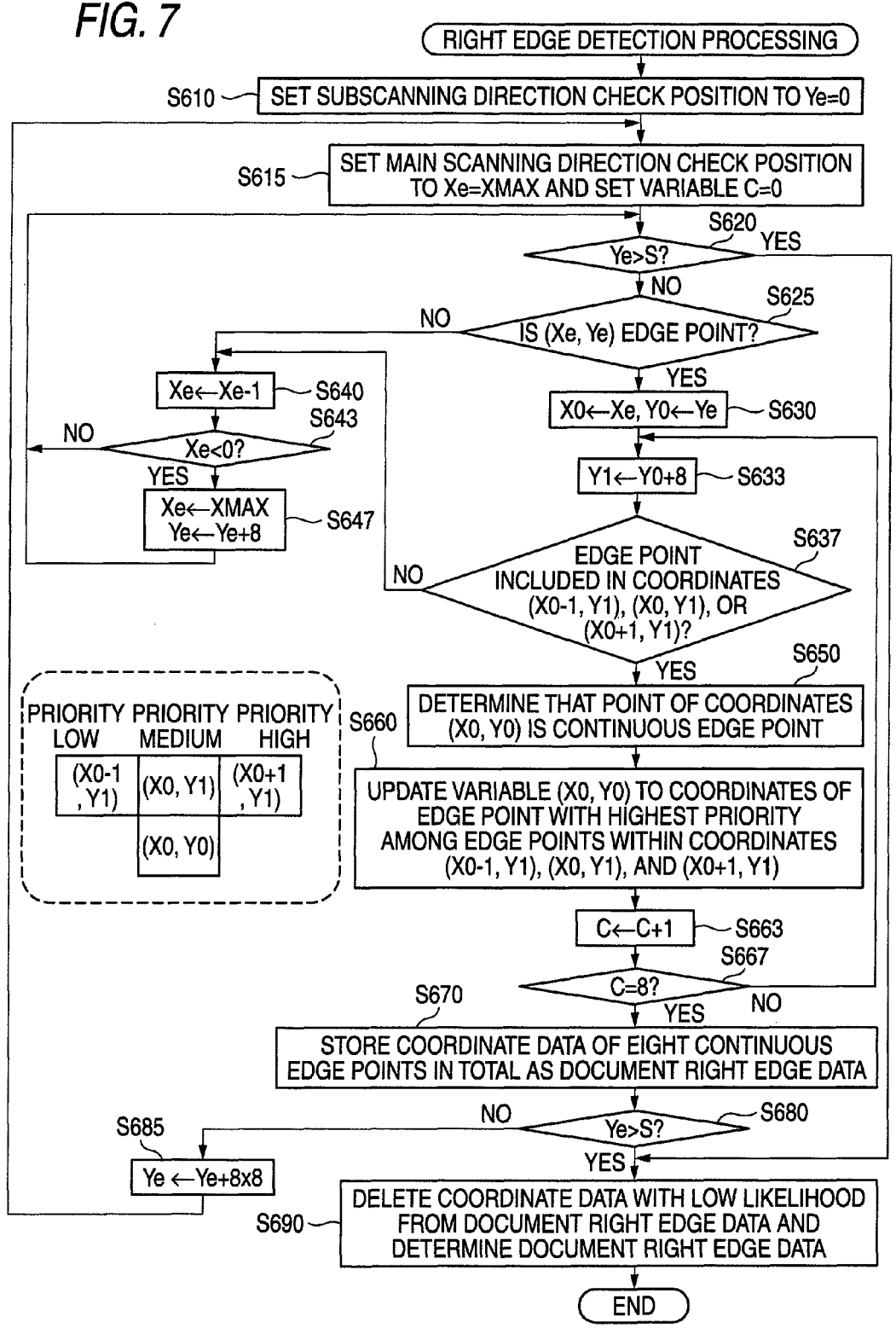
FIG. 7 is a flowchart to represent right edge detection processing executed by the CPU.

When starting the document estimation processing, the CPU 70 sets a variable in YPER of the Y coordinate of the upper end of the prescan area described above (S=YPRE), thereby setting the check range in the Y axis direction from Y=0 to Y=S=YPRE (S410). Then, the CPU 70 goes to S420 and executes right edge detection processing. FIG. 7 is a flowchart to represent the right edge detection processing executed by the CPU 70.

When starting the right edge detection processing, first the CPU 70 sets a subscanning direction check position Ye to the lower end Y coordinate of the readable area R0 (Ye=0) at S610 and sets a main scanning direction check position Xe to the right end X coordinate of the readable area R0 (Xe=XMAX) and also initializes a variable C to a value of zero (C=0) at S615. Then, the CPU 70 determines whether or not the subscanning direction check position Ye exceeds the check range (S620). Specifically, the CPU 70 determines whether or not Ye>S.

Figure 8:
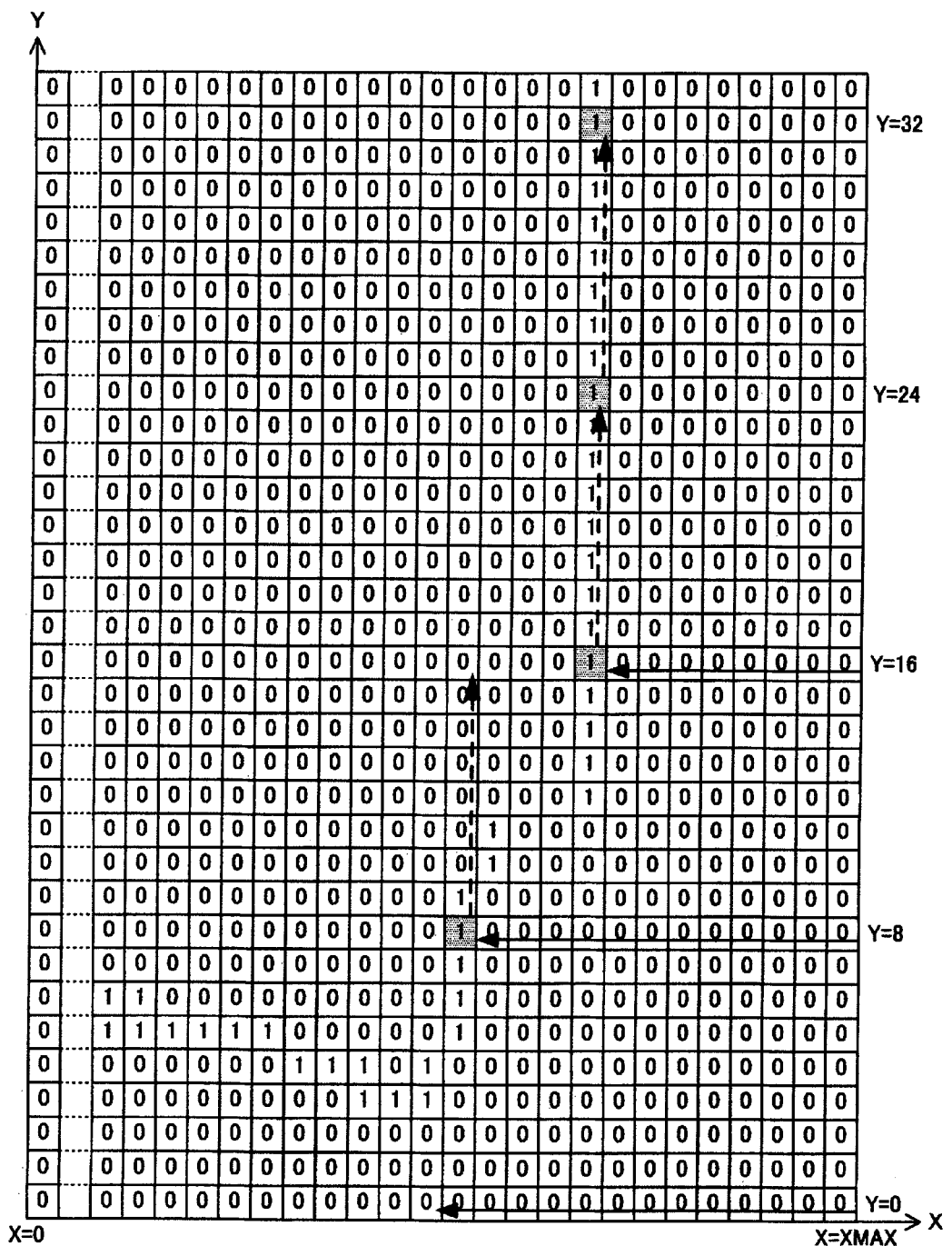
FIG. 8 is a schematic representation to show the composition of edge image data.

If the CPU 70 determines that the subscanning direction check position Ye does not exceed the check range (NO at S620), the CPU 70 references the pixel value of the check target data corresponding to the check position (X, Y)=(Xe, Ye) defined by the main scanning direction check position Xe and the subscanning direction check position Ye, thereby determining whether or not the check position (Xe, Ye) is ill edge point (S625). FIG. 8 is a schematic representation to show the composition of edge image data in an extraction manner and further represent the locus of edge points traced by executing the right edge detection processing. In the example shown in FIG. 8, the point of a pixel value "1" corresponds to the edge point.

If the CPU 70 determines that the check position (Xe, Ye) is not an edge point (NO at S625), the CPU 70 goes to S640 and updates the main scanning direction check position Xe to a position with one pixel moved in the X axis minus direction from the main scanning direction check position Xe (Xe←Xe−1) and determines whether or not the post-updated main scanning direction check position Xe protrudes from the left end of the readable area RD. Specifically, the CPU 70 determines whether or not Xe<0 (S643).

If the CPU 70 determines that the main scanning direction check position Xe does not protrude from the left end of the readable area R0 (NO at S643), the CPU 70 goes to S620 and determines whether or not the subscanning direction check position Ye exceeds the check range (Ye>S). If the CPU 70 determines that the subscanning direction check position Ye does not exceed the check range (NO at S620), the CPU 70 goes to S625; if the CPU 70 determines that the subscanning direction check position Ye exceeds the check range (YES at S620), the CPU 70 goes to S690.

In contrast, if the CPU 70 determines at S643 that the main scanning direction check position Xe protrudes from the left end of the readable area R0 (Xe<0), the CPU 70 goes to $647 and sets the main scanning direction check position Xe to the right end (XMAX) of the readable area R0 (Xe=XMAX) and updates the subscanning direction check position Ye to a value resulting from adding eight to the current value Ye (Ye←Ye+8). That is, the CPU 70 sets the subscanning direction check position Ye to a position with eight pixels advanced in the Y axis direction from the subscanning direction check position Ye. Then, the CPU 70 goes to S620 and executes the processing described above.

If the CPU 70 determines that the check position (Xe, Ye) is an edge point (YES at S625), the CPU 70 goes to S630 and sets the coordinate value of the current check position (Xe, Ye) in a variable (X0, Y0) (X0←Xe, Y0←Ye). The CPU 70 also updates a variable Y1 to a coordinate value Y1 with eight pixels advanced in the Y axis direction from coordinate Y=Y0 (Y1=Y0+8) (S633).

Then, the CPU 70 determines whether or not at least one of the point of coordinates (X0−1, Y1), the point of coordinates (X0, Y1), and the point of coordinates (X0+1, Y1) is an edge point (S637). If none of the point of coordinates (X0−1, Y1), the point of coordinates (X0, Y1), and the point of coordinates (X0+1, Y1) is an edge point (NO at S637), the CPU 70 goes to S640 and updates the main scanning direction check position Xe to a position with one pixel moved in the X axis minus direction from the main scanning direction check position Xe (Xe←Xe−1).

In contrast, if the CPU 70 determines that at least one of the point of coordinates (X0−1, Y1), the point of coordinates (X0, Y1), and the point of coordinates (X0+1, Y1) is an edge point (YES at S637), the CPU 70 goes to S650 and determines that the point of coordinates (X0, Y0) is a continuous edge point and temporarily stores the coordinates (X0, Y0) as the coordinate data of the continuous edge point.

After S650, the CPU 70 goes to S660 and selects one edge point from along the point of coordinates (X0−1, Y1), the point of coordinates (X0, Y1), and the point of coordinates (X0+1, Y1) according to predetermined priority.

Specifically, in the right edge detection processing, the coordinates nearer to the right end of the readable area R0 is assigned the higher priority. That is, the point of coordinates (X0+1, Y1) near to the right end of the readable area R0 is assigned priority "high," the point of coordinates (X0, Y1) is assigned priority "medium," and the point of coordinates (X0−1, Y1) is assigned priority "low."

The reason why the priority is thus set is that nothing should exist on the document table 11a and no edge point should exist on the right from the right end of the document and that the nearer the edge point to the right end of the readable area R0, the higher the possibility that the edge point may be the edge point corresponding to the right end of the document.

That is, at S660, the CPU 70 selects the edge point with the highest priority from among the point of coordinates (X0−1, Y1), the point of coordinates (X0, Y1), and the point of coordinates (X0+1, Y1) according to the priority. The CPU 70 updates the variable X0 to the X coordinate of the selected point and the variable Y0 to the Y coordinate of the selected point. Then, the CPU 70 adds one to the variable C to update the variable C (S663).

After S663, the CPU 70 determines whether or not the post-updated value of the variable C is 8 (C=8). If the CPU 70 determines that the value of the variable C is not 8 (NO at S667), the CPU 70 goes to S633 and updates the variable Y1 to the Y coordinate of the point with eight pixels advanced in the Y axis direction from coordinate Y=Y0 (Y1=Y0+8). Then, the CPU 70 executes S637 and the later steps.

The CPU 70 executes the processing, thereby checking whether or not edge points are continuous in the Y axis direction every eight pixels in the Y axis direction as shown in FIG. 8. If the CPU 70 determines that the value of the variable C is 8 (YES at S667), the CPU 70 stores the coordinate data of the eight points in total determined to be continuous edge points at S650 repeated eight times in the RAM 80 as document right edge data (S670).

After S670, the CPU 70 goes to S680 and determines whether or not the subscanning direction check position Ye exceeds the check range (Ye>S). If the CPU 70 determines that the subscanning direction check position Ye does not exceed the check range (NO at S680), the CPU 70 updates the subscanning direction check position Ye to a position with 64 pixels advanced from the subscanning direction check position Ye (S685) and goes to S615.

The CPU 70 thus detects eight continuous edge points as one set repeatedly. When the subscanning direction check position Ye exceeds the check range (YES at S620 or YES at S680), the CPU 70 goes to S690 and deletes the coordinate data with low likelihood as the right edge (edge points representing the right end of the document) from the coordinate data stored as the document right edge data at S670 and determines the document right edge data.

Figure 9:
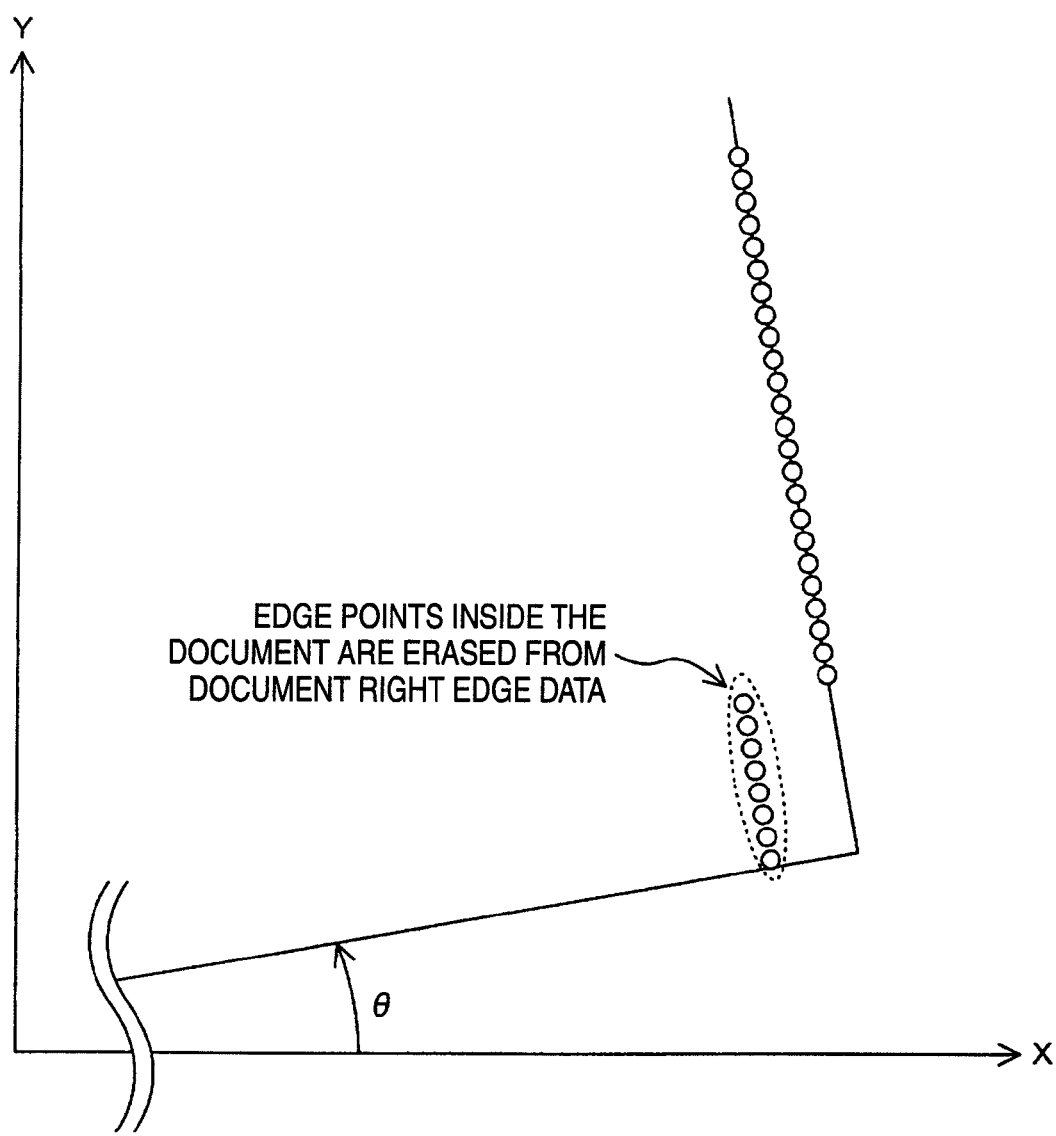
FIG. 9 is a schematic representation to describe a determining technique of document right edge data.

Specifically, as shown in FIG. 9, obviously discontinuous coordinate data at a position largely shifting to the document inside area relative to the continuous coordinate data among the coordinate data stored as the document right edge data is deleted from the document right edge data and the document right edge data is determined. Then, the right edge detection processing is exited. However, S690 is a step for enhancing the document edge detection accuracy and therefore may be skipped in the right edge detection processing.

When thus exiting the right edge detection processing, the CPU 70 returns to the document estimation processing and goes to S430 and determines whether or not the right edge detection results in failure in the immediately preceding right edge detection processing. Specifically, if there is no coordinate data registered as the document right edge data in the immediately preceding right edge detection processing, the CPU 70 determines that the right edge detection results in failure, if there is coordinate data registered as the document right edge data, the CPU 70 determines that the right edge detection results in success.

However, exceptionally, if the coordinate data registered as the document right edge data exists in the proximity of the left end (Y=0) of the readable area R0, it may be assumed that the coordinate data of the left edge (edge points representing the left end of the document) is erroneously registered as the document right edge data and even if there is coordinate data registered as the document right edge data, it may be determined that the right edge detection results in failure.

As the case where the right edge detection results in failure, the case where the document size is larger than the size of the document table 11*a* and the right end of the document protrudes from the document table 11*a* or the like can be named.

If the CPU 70 determines that the right edge detection results in failure (YES at S430), the CPU 70 goes to S431 and estimates that the size (height×width) of the document placed on the document table 11*a* is the maximum size (the size corresponding to the readable area R0) of die document that can be placed on the document table 11*a* (S431), estimates that the inclination angle θ of the document is zero (θ=0) (S433), and estimates that the whole readable area R0 is the placement area of the document (S435). After S435, the CPU 70 exits the document estimation processing.

In contrast, if the CPU 70 determines that the right edge detection results in success (NO at S430), the CPU 70 goes to S437 and approximates the points indicated by the document right edge data determined in the right edge detection processing to a line and calculates an approximate line of the points indicated by the document right edge data (which will be hereinafter represented as "right edge approximate line").

Then, the CPU 70 goes to S440 and determines whether or not the right edge approximate line is inclined larger than a predetermined angle with respect to the Y axis. In the exemplary embodiment, specifically, the CPU 70 determines whether or not the right edge approximate line is inclined larger than 0.5 degrees with respect to the Y axis.

If the CPU 70 determines that the inclination of the right edge approximate line is equal to or less than the predetermined angle (NO at S440), the CPU 70 assumes that the document is struck against the lower-left corner of the inside of the frame 13*a* and is placed correctly on the document table 11*a*, and estimates that the intersection point of the right edge approximate line and the lower end margin of the document table 11*a* (in other words, the inside of the lower side of the frame 13*a* (which will be hereinafter represented as "lower frame")) is the lower-right corner position of the document (S441), as shown at the right of FIG. 6.

After S441, the CPU 70 assumes that the lower-left corner position of the document is the point of the lower-left corner of the document table 11*a* (in other words, the lower-left corner of the inside of the frame 13*a*), and estimates the document size. Specifically, assuming that the document placed on the document table 11*a* is a rectangular blank form, the CPU 70 estimates that the length from the lower-left corner position of the document to the lower-right corner position of the document estimated at S441 is the short side length (width) of the document and estimates that √2 times the short side length is the long side length (height) of the document (S443). The reason why it is estimated that √2 times the short side length of the document is the long side length of the document is that the ratio of the short side length of the blank form: the long side length is 1:√2.

After S443, the CPU 70 goes to S445 and estimates that the inclination angle θ of the document placed on the document table 11*a* is zero (in other words, estimates that the document is not inclined) and derives the coordinates of the positions of the upper-left corner and the upper-right corner of the document from the relationship among the lower-left corner position, the estimated lower-right corner position, the document size, and the document inclination angle θ. Accordingly, the CPU 70 estimates that the sides of a quadrangle formed by connecting the four concerns are the outer margin of the document and estimates that the area surrounded by the outer margin is the placement area of the document (S447).

That is, if the lower-left corner of the document is struck against the lower-left corner of the inside of the frame 13*a* and in this state, the long side of the document of the estimated size is placed in parallel with the Y axis and the short side of the document is placed in parallel with the X axis, it is estimated that the area where the document covers the read glass 11 is the placement area of the document (S447). Then, the CPU 70 exits the document estimation processing.

Figure 10:
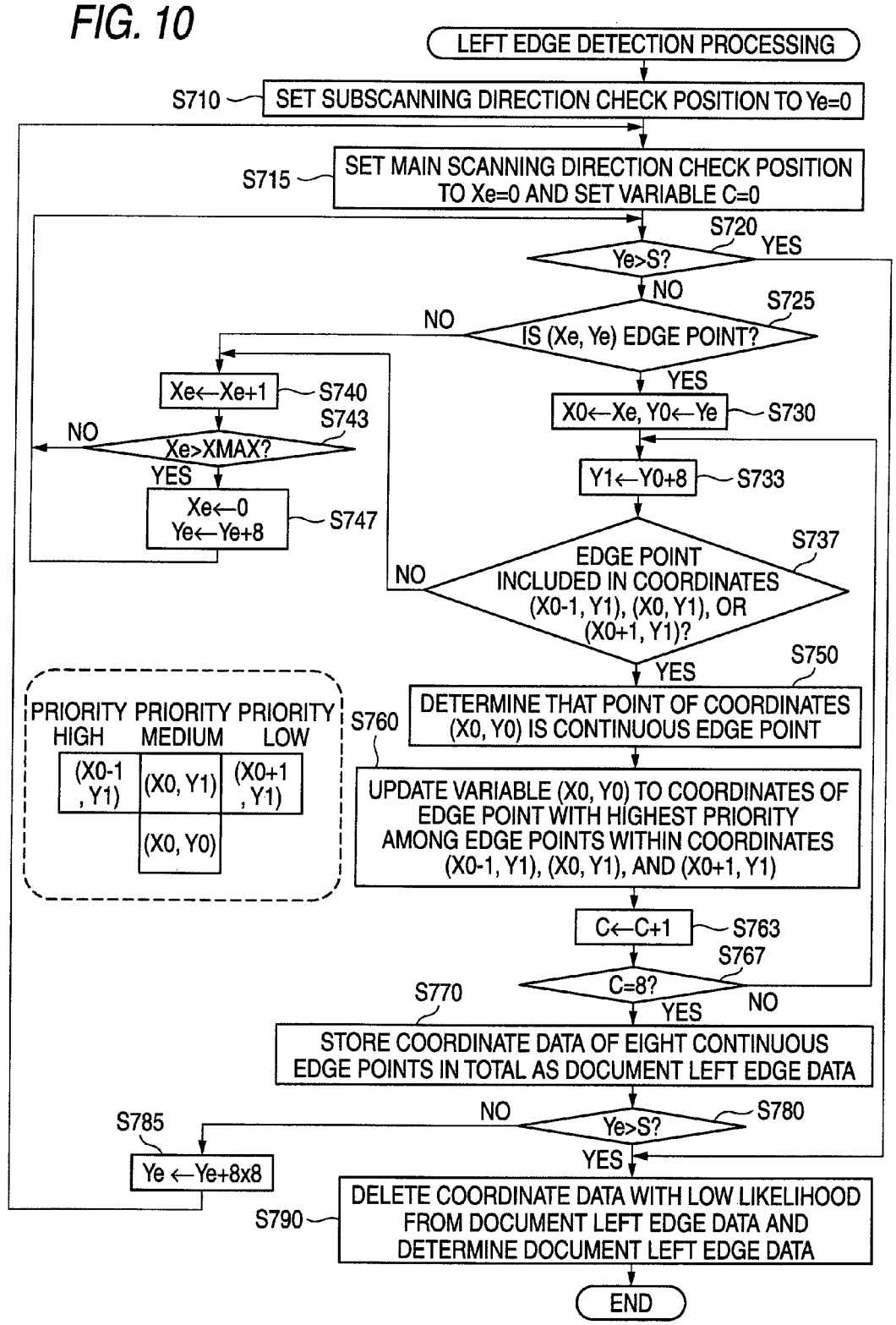
FIG. 10 is a flowchart to represent left edge detection processing executed by the CPU.

In contrast, if the CPU 70 determines that the right edge approximate line is inclined larger than the predetermined angle with respect to the Y axis (YES at S440), the CPU 70 goes to S450 and executes left edge detection processing shown in FIG. 10. FIG. 10 is a flowchart to represent the left edge detection processing executed by the CPU 70.

When starting the left edge detection processing, the CPU 70 sets the subscanning direction check position Ye to 0 (Ye=0) at S710 and sets the main scanning direction check position Xe to the left end X coordinate of the readable area R0 (Xe=0) and also initializes the variable C to a value of zero (C=0) at S715.

Then, the CPU 70 determines whether or not the subscanning direction check position Ye exceeds the check range (namely, Ye>S) (S720). If the CPU 70 determines that the subscanning direction check position Ye does not exceed the check range (NO at S720), the CPU 70 references the pixel value of the check target data corresponding to the check position (X, Y)=(Xe, Ye) and determines whether or not the check position (Xe, Ye) is an edge point (S725).

If the CPU 70 determines that the check position (Xe, Ye) is not an edge point (NO at S725), the CPU 70 goes to S740 and updates the main scanning direction check position Xe to a position with one pixel moved in the X axis plus direction from the main scanning direction check position Xe (Xe←Xe+1) and determines whether or not the updated main scanning direction check position Xe protrudes from the right end of the readable area R0. Specifically, the CPU 70 determines whether or not Xe>MAX (S743). If the CPU 70 determines that the main scanning direction check position Xe does not protrude from the right end of the readable area R0 (NO at S743), the CPU 70 goes to S720.

In contrast, if the CPU 70 determines at S743 that the main scanning direction check position Xe protrudes from the right end of the readable area no (Xe>MAX), the CPU 70 goes to S747 and sets the main scanning direction check position Xe to the left end of the readable area R0 (Xe=0) and updates the subscanning direction check position Ye to a position with eight pixels advanced in the Y axis direction from the subscanning direction check position Ye (Ye←Ye+8). Then, the CPU 70 goes to S720.

If the CPU 70 determines that the check position (Xe, Ye) is an edge point (YES at S725), the CPU 70 goes to S730 and sets the coordinate value of the current check position (Xe, Ye) in the variable (X0, Y0) (X0←Xe, Y0←Ye) and also updates the variable Y1 to value Y1=Y0+8 (S733).

Then, the CPU 70 determines whether or not at least one of the point of coordinates (X0−1, Y1), the point of coordinates (X0, Y1), and the point of coordinates (X0+1, Y1) is an edge point (S737). If none of the point of coordinates (X0−1, Y1), the point of coordinates (X0, Y1), and the point of coordinates (X0+1, Y1) is an edge point (NO at S737), the CPU 70 goes to S740.

In contrast, if the CPU 70 determines that at least one of the point of coordinates (X0−1, Y1), the point of coordinates (X0, Y1), and the point of coordinates (X0+1, Y1) is an edge point (YES at S737), the CPU 70 goes to S750 and determines that the point of coordinates (X0, Y0) is a continuous edge point and temporarily stores the coordinates (X0, Y0) as the coordinate data of the continuous edge point.

After S750, the CPU 70 goes to S760 and selects one edge point from among the point of coordinates (X0−1, Y1), the point of coordinates (X0, Y1), and the point of coordinates (X0+1, Y1) according to predetermined priority.

Specifically, in the left edge detection processing, it is assumed that the coordinates nearer to the left end of the readable area R0 is assigned the higher priority. That is, the point of coordinates (X0−1, Y1) near to the left end of the readable area R0 is assigned priority "high," the point of coordinates (X0, Y1) is assigned priority "medium," and the point of coordinates (X0+1, Y1) is assigned priority "low." The reason why the priority is thus set is that nothing should exist on the document table 11a and no edge point should exist on the left from the left end of the document and that the nearer the edge point to the left end of the readable area R0, the higher the possibility that the edge point may be the edge point corresponding to the left end of the document.

Therefore, at S760, the CPU 70 selects the edge point with the highest priority from among the point of coordinates (X0−1, Y1), the point of coordinates (X0, Y1), and the point of coordinates (X0+1, Y1) according to the priority. The CPU 70 updates the variable X0 to the X coordinate of the selected point and the variable Y0 to the Y coordinate of the selected point. Then, the CPU 70 adds one to the variable C to update the variable C (S763).

After S763, the CPU 70 determines whether or not the post-updated value of the variable C is 8 (C=8). If the CPU 70 determines that the value of the variable C is not 8 (NO at S767), the CPU 70 goes to S733 and updates the variable Y1 to Y1=Y0+8. Then, the CPU 70 executes S737 and the later steps.

According to the processing procedure, the CPU 70 checks whether or not edge points are continuous in the Y axis direction every eight pixels in the Y axis direction as in the right edge detection processing (see FIG. 8). If the CPU 70 determines C=8 (YES at S767), the CPU 70 stores the coordinate data of the eight points in total determined to be continuous edge points at S750 in the RAM 80 as document left edge data (S770).

After S770, the CPU 70 goes to S780 and determines whether or not the subscanning direction check position Ye exceeds the check range (Ye>S). If the CPU 70 determines that the subscanning direction check position Ye does not exceed the check range (NO at S780), the CPU 70 updates the subscanning direction check position Ye to a position with 64 pixels advanced from the subscanning direction check position Ye (S785) and goes to S715.

The CPU 70 thus detects eight continuous edge points at a time repeatedly. When the subscanning direction check position Ye exceeds the check range (YES at S720 or YES at S780), the CPU 70 goes to S790 and deletes the coordinate data with low likelihood as the left edge (edge points representing the left end of the document) from the coordinate data stored as the document left edge data at S770 and determines the document left edge data.

Specifically, as at S690, obviously discontinuous coordinate data at a position largely shifting to the document inside area relative to the continuous coordinate data among the coordinate data stored as the document left edge data is deleted from the document left edge data and the document left edge data is determined. Then, the left edge detection processing is exited. However, S790 may be skipped in the left edge detection processing.

When thus exiting the left edge detection processing, the CPU 70 returns to the document estimation processing and goes to S455 and approximates the points indicated by the document left edge data determined in the left edge detection processing to a line and calculates an approximate line of the points indicated by the document left edge data (which will be hereinafter represented as "left edge approximate line"). Then, the CPU 70 goes to S460.

However, if there is no coordinate data registered as the document left edge data in the immediately preceding left edge detection processing, the CPU 70 determines that the left edge detection results in failure and goes to S460 without calculating the left edge approximate line. In addition, if all or a part of the coordinate data registered as the document left edge data is also registered as the document right edge data, it may be assumed that the coordinate data of the right edge (edge points representing the right end of the document) is erroneously registered as the document left edge data and even if there is coordinate data registered as the document left edge data, it may be determined that the left edge detection results in failure and the CPU 70 may go to S460 without calculating the left edge approximate line.

Figure 11:
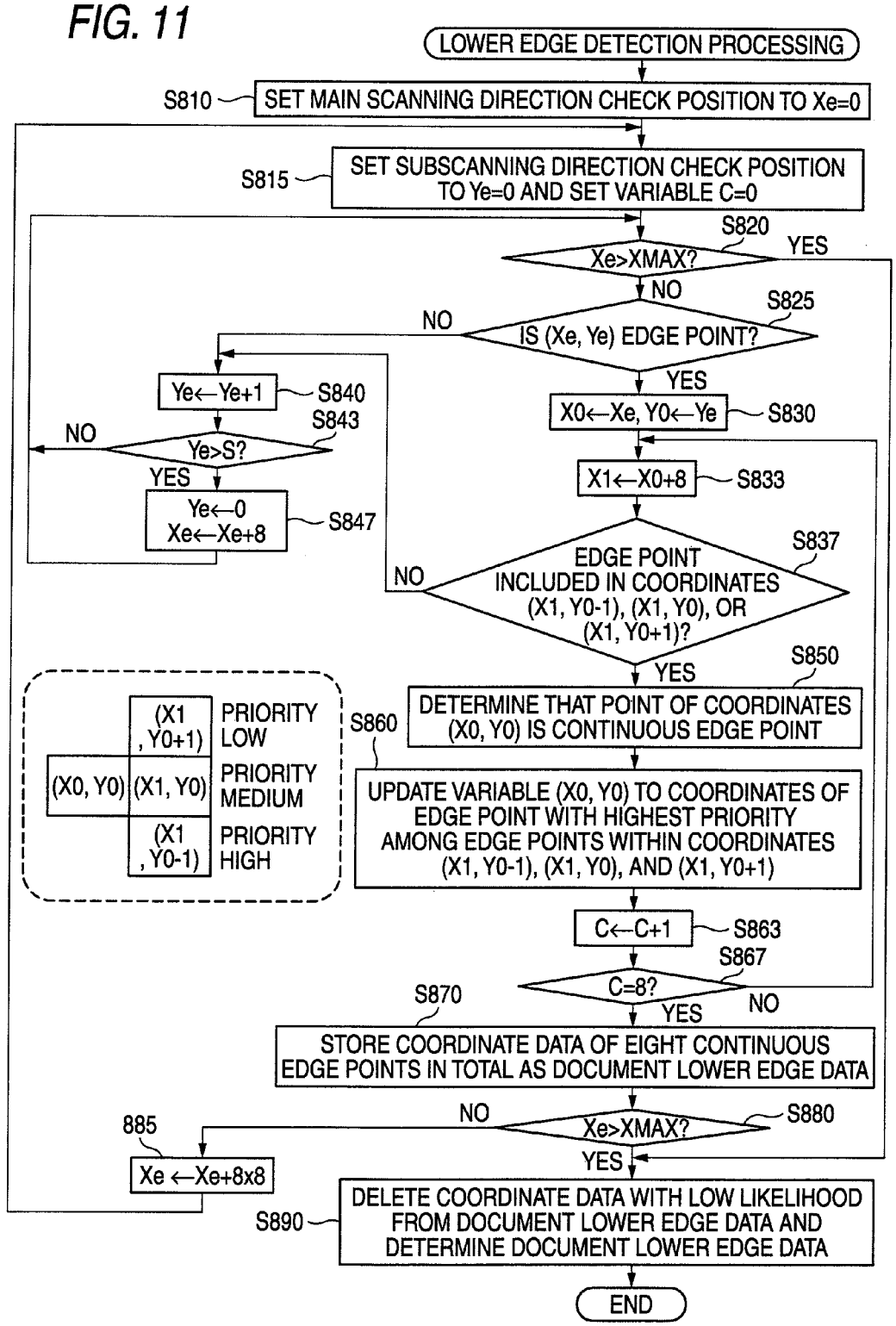
FIG. 11 is a flowchart to represent lower edge detection processing executed by the CPU.

At S460, the CPU 70 executes lower edge detection processing shown in FIG. 11. FIG. 11 is a flowchart to represent the lower edge detection processing executed by the CPU 70.

When starting the lower edge detection processing, the CPU 70 sets a main scanning direction check position Xe to the left end X coordinate of the readable area R0 (Xe=0) at S810 and sets a subscanning direction check position Ye to the lower end Y coordinate of the readable area R0 (Ye=0) at S815. The CPU 70 also initializes the variable C to a value of zero (C=0) at S815.

Then, the CPU 70 determines whether or not the main scanning direction check position Xe exceeds the right end of the readable area R0 (namely, Xe>MAX) (S820). If the CPU 70 determines that the main scanning direction check position Xe does not exceed the right end of the readable area R0 (NO at S580), the CPU 70 references the pixel value of the check target data corresponding to the check position (X, Y)=(Xe, Ye) and determines whether or not the check position (Xe, Ye) is an edge point (S825).

If the CPU 70 determines that the check position (Xe, Ye) is not an edge point (NO at S825), the CPU 70 goes to S840 and updates the subscanning direction check position Ye to a position with one pixel moved in the Y axis plus direction from the subscanning direction check position Ye (Ye←Ye+1) and determines whether or not the post-updated subscanning direction check position Ye exceeds the check range (Ye>S) (S843).

If the CPU 70 determines that the subscanning direction check position Ye does not exceed the check range (NO at S843), the CPU 70 goes to S820.

In contrast, if the CPU 70 determines at S843 that the subscanning direction check position Ye exceeds the check range (Ye>S), the CPU 70 goes to S847 and sets the subscanning direction check position Ye to the lower end of the readable area R0 (Ye=0) and also sets the main scanning direction check position Xe to a position with eight pixels advanced in the X axis direction from the main scanning direction check position Xe (Xe←Xe+8). Then, the CPU 70 goes to S820.

In addition, if the CPU 70 determines that the check position (Xe, Ye) is an edge point (YES at S825), the CPU 70 goes to S830 and sets the coordinate value of the current check position (Xe, Ye) in the variable (X0, Y0) (X0←Xe, Y0←Ye). The CPU 70 also updates a variable X1 to value X1=X0+8 (S833).

Then, the CPU 70 determines whether or not at least one of the point of coordinates (X1, Y0−1), the point of coordinates (X1, Y0), and the point of coordinates (X1, Y0+1) is an edge point (S837). If none of the point of coordinates (X1, Y0−1), the point of coordinates (X1, Y0), and the point of coordinates (X1, Y0+1) is an edge point (NO at S837), the CPU 70 goes to S840.

In contrast if the CPU 70 determines that at least one of the point of coordinates (X1, Y0−1), the point of coordinates (X1, Y0), and the point of coordinates (X1, Y0+1) is an edge point (YES at S837), the CPU 70 goes to S850 and determines that the point of coordinates (X0, Y0) is a continuous edge point and temporarily stores the coordinates (X0, Y0) as the coordinate data of die continuous edge point.

After S850, the CPU 70 goes to S860 and selects one edge point from among the point of coordinates (X1, Y0−1), the point of coordinates (X1, Y0), and the point of coordinates (X1, Y0+1) according to predetermined priority.

Specifically, in the lower edge detection processing, the coordinates nearer to the lower end of the readable area R0 is assigned the higher priority. That is, the point of coordinates (X1, Y0−1) near to the lower end of the readable area R0 is assigned priority "high," the point of coordinates (X1, Y0) is assigned priority "medium," and the point of coordinates (X1, Y0+1) is assigned priority "low."

The reason why the priority is thus set is that nothing should exist on the document table 11*a* and no edge point should exist below the lower end of the document and that the nearer the edge point to the lower end of the readable area R0, the higher the possibility that the edge point may be the edge point corresponding to the lower end of the document.

Therefore, at S860, the CPU 70 selects the edge point with the highest priority from among the point of coordinates (X1, Y0−1), the point of coordinates (X1, Y0), and the point of coordinates (X1, Y0+1) according to the priority. The CPU 70 updates the variable X0 to the X coordinate of the selected point and the variable Y0 to the Y coordinate of the selected point. Then, the CPU 70 adds one to the variable C to update the variable C (S863).

After S863, the CPU 70 determines whether or not the post-updated value of the variable C is 8 (C=8) (S867). If the CPU 70 determines that the value of the variable C is not 8 (NO at S867), the CPU 70 goes to S533 and updates the variable X1 to X1=X0+8. Then, the CPU 70 executes S837 and the later steps.

The CPU 70 executes the processing, thereby checking whether or not edge points are continuous in the X axis direction every eight pixels in the X axis direction. If the CPU 70 determines C=8 (YES at S867), the CPU 70 stores the coordinate data of the eight points in total determined to be continuous edge points at S850 in the RAM 80 as document lower edge data (S870).

After S870, the CPU 70 goes to S880 and determines whether or not the main scanning direction check position Xe exceeds the right end of the readable area R0 (Xe>XMAX). If the CPU 70 determines that the main scanning direction check position Xe does not exceed the right end of the readable area R0 (NO at S880), the CPU 70 updates the main scanning direction check position Xe to a point with 64 pixels advanced from the main scanning direction check position Xe (S885) and goes to S815.

The CPU 70 thus detects eight continuous edge points at a time repeatedly. When the main scanning direction check position Xe exceeds the right end of the readable area R0 (YES at S820 or YES at S880), the CPU 70 goes to S890 and deletes the coordinate data with low likelihood as the lower edge (edge points representing the lower end of the document) from the coordinate data stored as the document lower edge data at S870 and determines the document lower edge data.

Specifically, as at step S690, obviously discontinuous coordinate data at a position largely shifting to the document inside area relative to the continuous coordinate data among the coordinate data stored as the document lower edge data is deleted from the document lower edge data and the document lower edge data is determined. Then, the lower edge detection processing is exited. However, S890 may be skipped in the lower edge detection processing.

When thus exiting the lower edge detection processing, the CPU 70 returns to the document estimation processing and goes to S465 and approximates the points indicated by the document lower edge data determined in the lower edge detection processing to a line and calculates an approximate line of the points indicated by the document lower edge data (which will be hereinafter represented as "lower edge approximate line"). Then, the CPU 70 goes to S470. However, if there is no coordinate data registered as the document lower edge data in the immediately is preceding lower edge detection processing, the CPU 70 determines that the lower edge detection results in failure and goes to S470 without calculating the lower edge approximate line.

At S470, the CPU 70 determines whether or not inclination A of right edge approximate line Y=A·X+B is negative (A<0). If the CPU 70 determines that the inclination A of the right edge approximate line is negative (YES at S470)) the CPU 70 executes first corner position estimation processing shown in FIG. 12 (S480); if the CPU 70 determines that the inclination A of the right edge approximate line is not negative (NO at S470), the CPU 70 executes second corner position estimation processing shown in FIG. 15 (S485).

Figure 12:
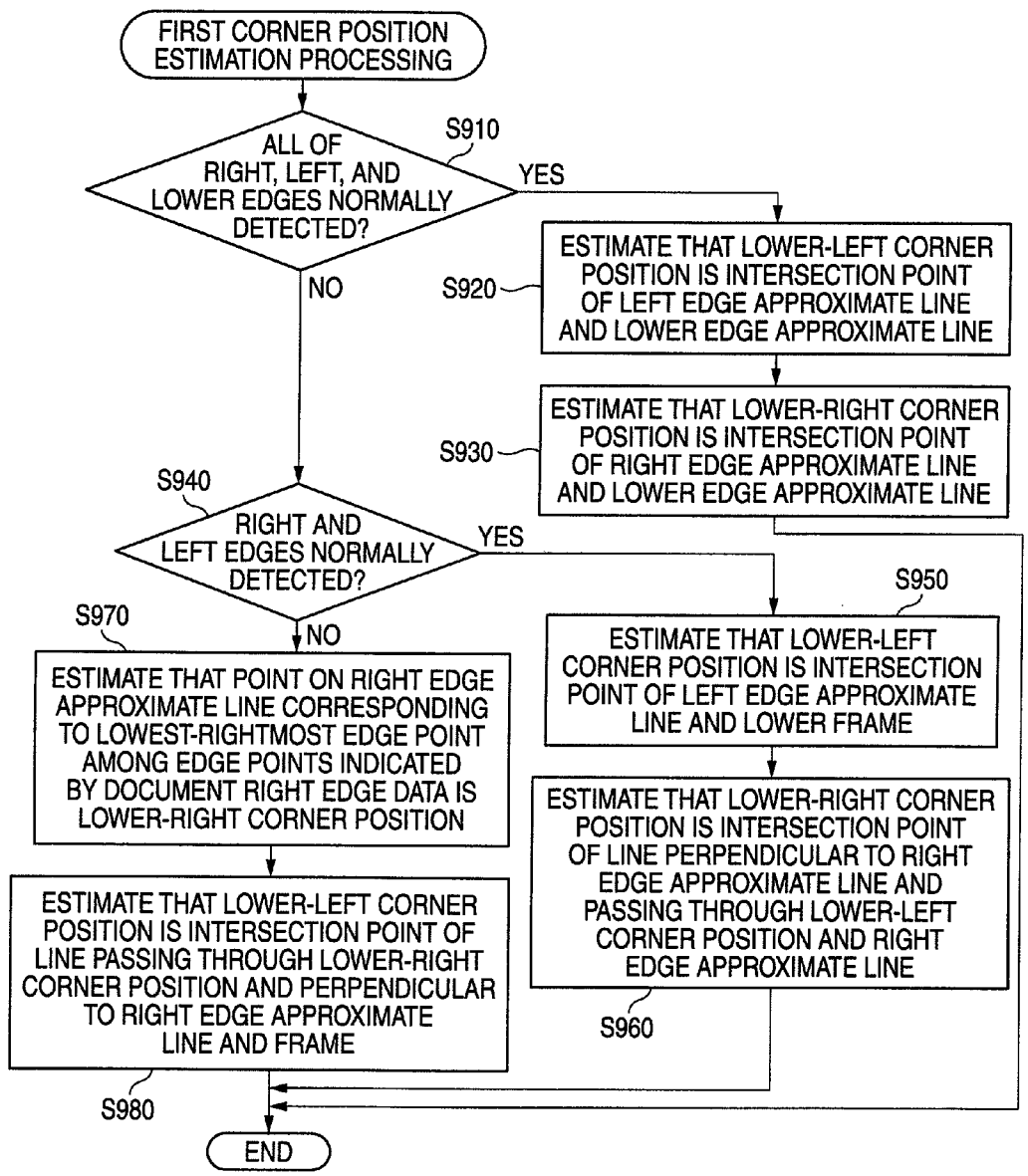
FIG. 12 is a flowchart to represent first corner position estimation processing executed by the CPU.

FIG. 12 is a flowchart to represent the first corner position estimation processing executed by the CPU 70. When starting the first coiner position estimation processing at S480, the CPU 70 determines whether all of the right edge, the left edge, and the lower edge have been normally detected at S420, S450, and S460 (S910).

Specifically, if detection of any of the right edge, the left edge, or the lower edge results in failure, the determination at S910 is NO. Even if detection of all of the right edge, the left edge, and the lower edge results in success, if the right edge approximate line and the lower edge approximate time which should be orthogonal to each other are not orthogonal to each others it is determined that all of the right edge, the left edge, and the lower edge are not normally detected.

Likewise, if the right edge approximate line and the left edge approximate line which should be parallel to each other are not parallel to each other, it is also determined that all of the right edge, the left edge, and the lower edge are not normally detected. Otherwise, the determination at S910 is YES.

Figure 13:
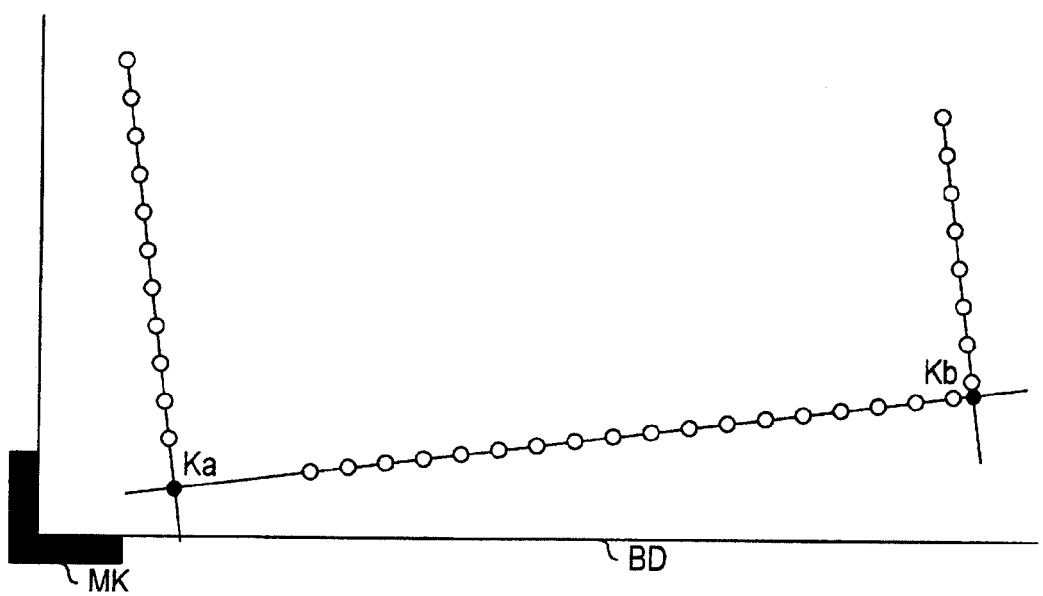
FIG. 13 is a schematic representation to show an estimation method of a document lower-left corner position and a document lower-right corner position.

When the CPU 70 executes S910 according to the determination technique and determines that all of the right edge, the left edge, and the lower edge are normally detected (YES at S910), the CPU 70 estimates that the lower-left corner position of the document is the intersection point of the left edge approximate line and the lower edge approximate line and calculates the coordinate value of the position (S920) and further estimates that the lower-right corner position of the document is the intersection point of the right edge approximate line and the lower edge approximate line and calculates the coordinate value of the position (S930). Then, the CPU 70 exits the first corner position estimation processing. FIG. 13 is a schematic representation to show an estimation method of a document lower-left corner position Ka and a document lower-right corner position Kb when the determination at S910 is YES. In the figure, an open circle represents an edge point and filled circles represent the corner positions Ka and Kb.

In contrast, if the CPU 70 determines that all of the right edge, the left edge, and the lower edge are not normally detected (NO at S910), the CPU 70 goes to S940 and determines whether or not both of the right edge and the left edge are normally detected.

Specifically, if detection of the right edge or the left edge results in failure, the determination at S940 is NO. Even if detection of the right edge and the left edge results in success, if the right edge approximate line and the left edge approximate line which should be parallel to each other are not parallel to each other, it is also determined that both of the right edge and the left edge are not normally detected. Otherwise, the determination at S940 is YES.

When the CPU 70 executes S940 according to the determination technique and determines that both of the right edge and the left edge are normally detected (YES at S940), the CPU 70 goes to S950 and estimates that the lower-left corner position of the document is the intersection point of the left edge approximate line and the lower end margin of the document table 11a (namely, the inside of the lower frame) and calculates the coordinate value of the position. Then, the CPU 70 estimates that the lower-right corner position of the document is the intersection point of a line perpendicular to the right edge approximate line and passing through the estimated lower-left corner position and the right edge approximate line and calculates the coordinate value of the position (S960).

Figure 14A:
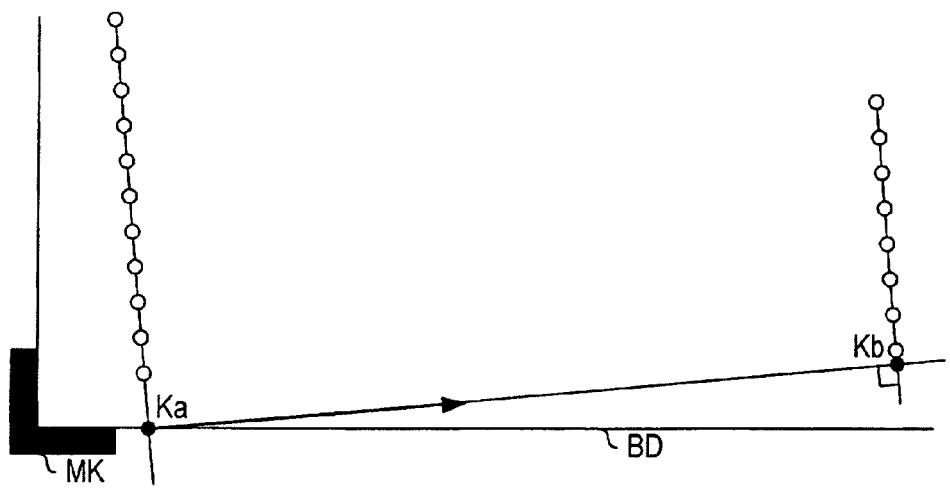
FIGS. 14A and 14B are schematic representations each to show an estimation method of the document lower-left corner position and the document lower-right corner position.

FIG. 14A is a schematic representation to show an estimation method of the document lower-left corner position Ka and the document lower-right corner position Kb when the determination at S940 is YES. The reason why it is estimated at S950 that the lower-left corner position of the document is the intersection point of the left, edge approximate line and the lower end margin of the document table 11a (namely, the inside of the lower frame) is that if the document is inclined to the left, the possibility that the lower-left corner of the document may strike against a step on the boundary between the lower end margin of the document table 11a and the inside of the lower frame is high. From such a reason, in the exemplary embodiment, when the lower edge cannot normally be detected, the lower-left corner position of the document is estimated by assuming that the lower-left corner of the document strikes against the step on the boundary between the lower end margin of the document table 11a and the inside of the lower frame.

When thus completing the processing at S960, the CPU 70 exits the first corner position estimation processing.

In contrast, if the CPU 70 determines at S940 that both of the right edge and the left edge are not normally detected (NO at S940), the CPU 70 goes to S970 and estimates that the point on the right edge approximate line corresponding to the lowest-rightmost edge point on the document table 11a among the edge points indicated by the document right edge data is the lower-right corner position of the document, and calculates the coordinate value of the position. At S970, the intersection point at which a line orthogonal to the right edge approximate line extended from the edge point indicated by the document right edge data to the right edge approximate line crosses the right edge approximate line, the intersection point of the rightmost edge point on the right edge approximate line may be handled as "the point on the right edge approximate line corresponding to the lowest-rightmost edge point."

After S970, the CPU 70 estimates that the lower-left corner position of the document is the intersection point of a line passing through the estimated lower-right corner position and perpendicular to the right edge approximate line and the end margin of the document table 11a (the inside of the frame) and calculates the coordinate value of the position (S980). Then, the CPU 70 exits the first corner position estimation processing.

Figure 14B:
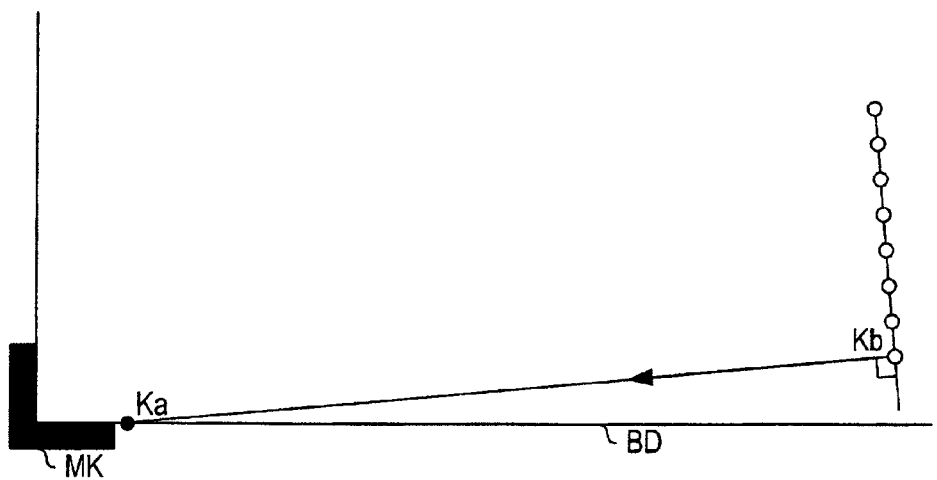

FIG. 14B is a schematic representation to show an estimation method of the document lower-left corner position Ka and the document lower-right corner position Kb when the determination at S940 is NO. The reason why the lower-left corner position and the lower-right corner position of the document are estimated using the document right edge data at S970 and S980 is that the document strike position is set in the lower-left corner of the inside of the frame 13a and an unreadable area exists in the proximity of the end margin of the document table 11a and thus the right edge can be detected most correctly among the right edge, the left edge, and the lower edge and the most likely data that can be trusted most among the document right edge data, the document left edge data, and the document lower edge data is the document right edge data. From such a reason, in the exemplary embodiment, the document right edge data is most trusted and the document size and the document inclination angle θ are estimated based on the document right edge data and the right edge approximate line.

Figure 15:
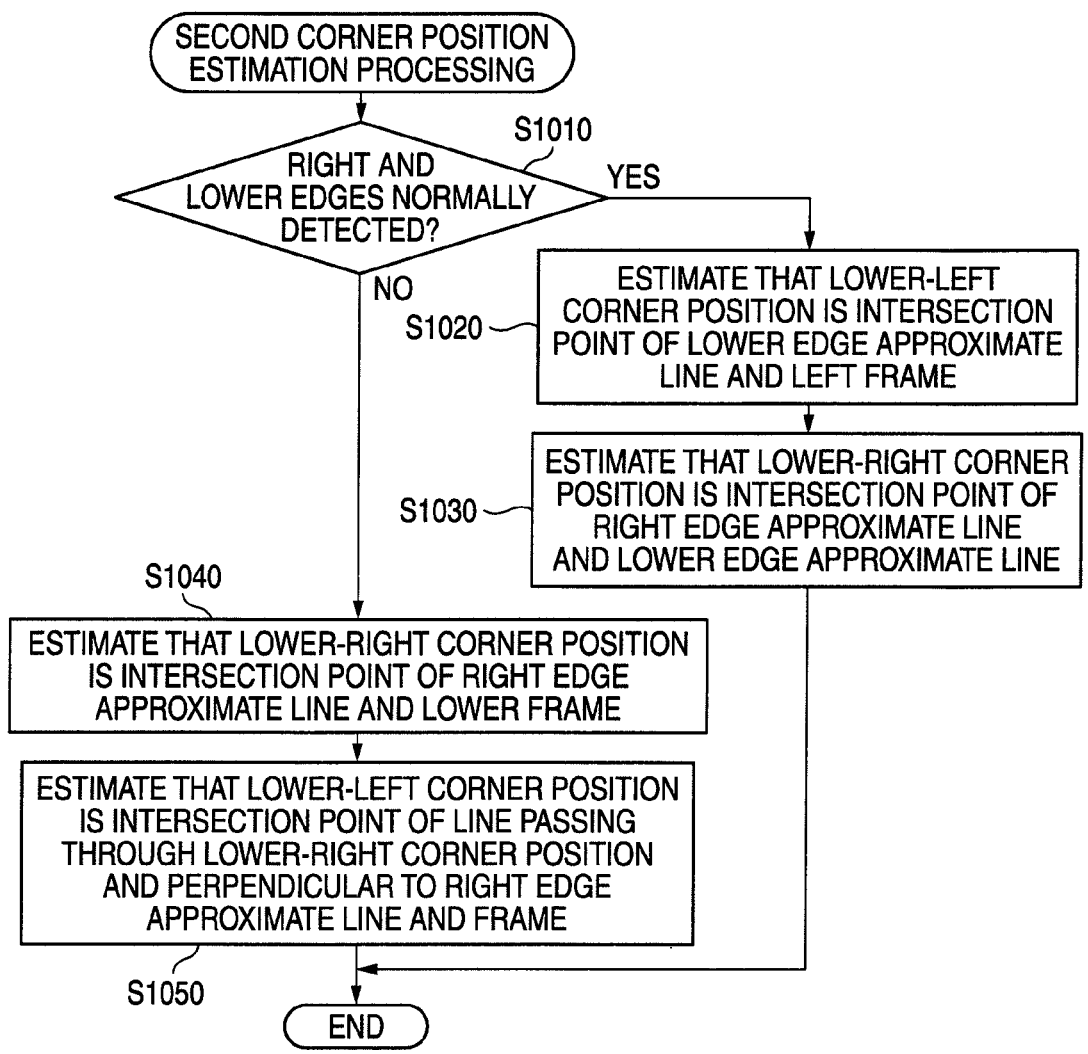
FIG. 15 is a flowchart to represent second corner position estimation processing executed by the CPU.

Subsequently, the second corner position estimation processing executed at S485 by the CPU 70 will be discussed. FIG. 15 is a flowchart to represent the second corner position estimation processing executed by the CPU 70. When starting the second corner position estimation processing, first the CPU 70 determines whether or not both of the right edge and the lower edge have been normally detected at S420 and S460 (S100).

Specifically, if detection of the right edge or the lower edge results in failure, the determination at S1010 is NO. Even if detection of both of the right edge and the lower edge results in success, if the right edge approximate line and the lower edge approximate line which should be orthogonal to each other are not orthogonal to each other, it is determined that both of the right edge and the lower edge are not normally detected. Otherwise, the determination at S810 is YES.

Figure 16A:
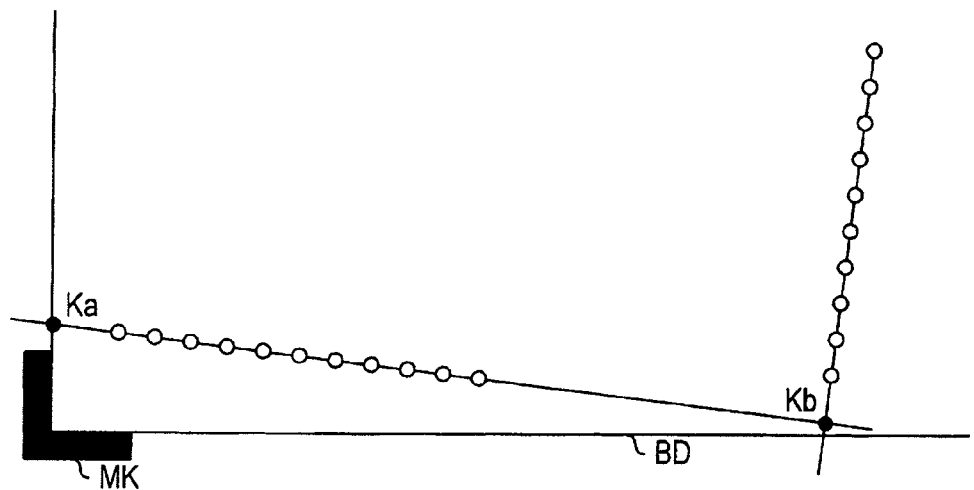
FIGS. 16A and 16B are schematic representations each to show an estimation method of the document lower-left corner position and the document lower-right corner position.

In the second corner position estimation processing, the lower-left corner position and the lower-right corner position of the document are estimated without using the detection result of the left edge. The reason why the corner positions of the document are estimated according to the technique is as follows: If the document is inclined to the right, the possibility that the right end of the document may fit in a sufficient length in the prescan area as shown in FIG. 16A is high and the likelihood or accuracy of the document right edge data is very high; while, the possibility that the left end of the document may not fit in a sufficient length in the prescan area is high and the likelihood or accuracy of the document left edge data is low as compared with that of the document right edge data or the document lower edge data.

When the CPU 70 executes S1010 according to the determination technique and determines that both of the right edge and the lower edge are normally detected (YES at S1010), the CPU 70 estimates that the lower-left coiner position of the document is the intersection point of the lower edge approximate line and the left end margin of the document table 11a (the inside of the frame) and calculates the coordinate value of the position (S1020) and further estimates that the lower-right corner position of the document is the intersection point of the right edge approximate line and the lower edge approximate line and calculates the coordinate value of the position (S1030). Then, the CPU 70 exits the second corner position estimation processing. FIG. 16A is a schematic representation to show an estimation method of the document lower-left corner position Ka and the document lower-right corner position Kb when the determination at S1010 is YES.

In contrast, if the CPU 70 determines that both of the right edge and the lower edge are not normally detected (NO at S1010), the CPU 70 goes to S1040 and estimates that the lower-right corner position of the document is the intersection point of the right edge approximate line and the lower end margin of the document table 11a (the inside of the lower frame) and calculates the coordinate value of the position. Then, the CPU 70 estimates that the lower-left corner position of the document is the intersection point of a line passing through the estimated lower-right corner position and perpendicular to the right edge approximate line and the end margin of the document table 11a (the inside of the frame) and calculates the coordinate value of the position (S1050). Then, the CPU 70 exits the second corner position estimation processing.

Figure 16B:
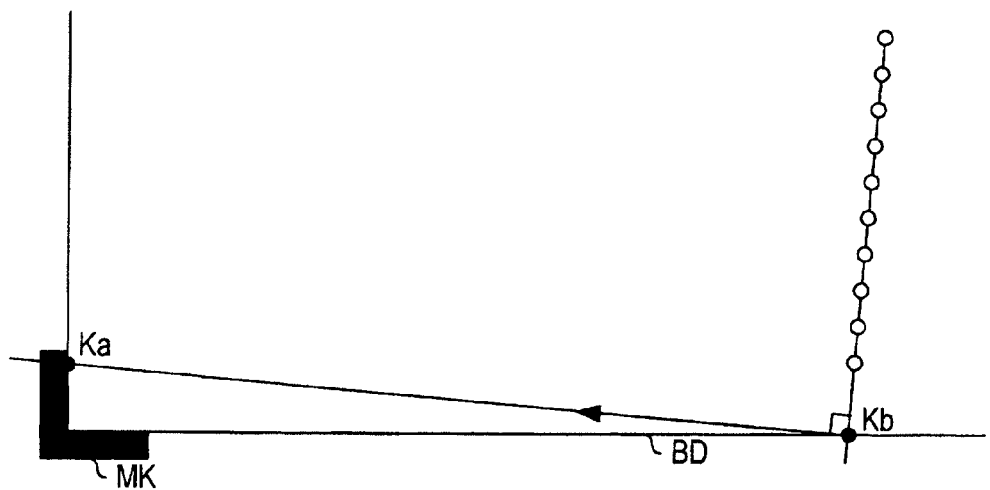

FIG. 16B is a schematic representation to show an estimation method of the document lower-left corner position Ka and the document lower-right corner position Kb when the determination at S1010 is NO. If the document is inclined to the right, the possibility that the lower-right corner of the document may strike against the step on the boundary BD between the lower end margin of the document table 11a and the inside of the lower frame is high. Thus, in the exemplary embodiment, when the lower edge cannot normally be detected, the lower-right corner position of the document is estimated by assuming that the lower-right corner of the document strikes against the step on the boundary BED between the lower end margin of the document table 11a and the inside of the lower frame.

When thus exiting the first or second corner position estimation processing (S480, S485), the CPU 70 returns to the document estimation processing and goes to S490 and estimates the document size based on information of the corner position estimated at S480 or S485. That is, assuming that the document placed on the document table 11a is a rectangular blank form, the CPU 70 estimates that the length from the lower-left corner position of the document to the lower-right corner position of the document estimated as described above is the short side length (width) of the document and estimates that √2 times the short side length is the long side length (height) of the document.

After S490, the CPU 70 estimates the inclination angle θ of the document with the right edge approximate line as the reference. That is, the CPU 70 estimates that the angle of the right edge approximate line with respect to the Y axis is the inclination angle θ of the document (S493).

Then, the CPU 70 goes to S497 and estimates the placement area of the document tabled on the information of the corner positions, the document size, and the document inclination angle θ estimated as described above. Specifically, the CPU 70 derives the upper-left corner position and the upper-right corner position of the document from the information of the lower-left corner position, the lower-right corner position, the document inclination angle θ, and the document size estimated as described above, thereby estimating the outer margin of the document and estimating that the area surrounded by the outer margin of the document is the placement area of the document. After S497, the CPU exits the document estimation processing and returns to the second copy processing and executes S330 and the later steps.

That is, the CPU 70 sets the scaling factor and the inclination correction amount based on the information of the estimated document size and the estimated document inclination angle θ (S340 and S350) and also sets the document read start position and the document read termination position based on the information of the estimated document placement area, thereby setting the read area corresponding to the document placement area (S360). The CPU 70 conveys the read unit in the read area, reads an image reflected on the read area through the read unit, and performs scaling up or down and rotation processing of the image data recorded in the RAM 80 as the read result in response to the preset scaling factor and inclination correction amount, thereby generating image data for print (S380). The CPU 70 uses the image data as print data and executes print processing about the print data (S390), thereby printing a copy image of the document on the record sheet. Then, the CPU 70 exits the second copy processing and returns to the main routine of the copy control processing and then completes the processing corresponding to the external entered copy command.

The configuration of the multifunction device 1 of the exemplary embodiment has been described. According to the multi-function device 1, when an "automatic scaling/inclination correction" copy command is entered, a part of the readable area RU is prescanned and the document state (the document size, the document inclination, and the document placement area) is estimated based on the read result.

Therefore, according to the exemplary embodiment, when the "automatic scaling/inclination correction" copy command is entered, the prescanning operation can be completed at higher speed than the prescanning technique of the whole readable area R0 as in the "borderless" copy and the document state can be estimated efficiently.

In the exemplary embodiment, when a "borderless" copy command is entered, the whole readable area RD is prescanned and the document state is estimated based on the result, because precise estimating of the document state as much as possible is preferred to high speed of processing to appropriately realize the "borderless" copy from the purpose of the copy command.

That is, in the exemplary embodiment, the operation mode is switched in response to a user's request and if precise state estimation is required, the overall prescanning processing is executed and the document state is estimated; if precise state estimation is not required, the leading end prescanning processing is executed and the document state is estimated, so that harmony between preciseness and rapidity of processing is produced. Therefore, according to the multi-function device 1, the convenience of the user can be more enhanced than was previously possible.

In the exemplary embodiment, to estimate the document state in the document estimation processing, the state of the document placed on the document table 11*a* is estimated by assuming that the document P placed on the document table 11*a* is a blank form. Therefore, if a blank form is placed on the document table 11*a*, the document size, the document inclination, and the document placement area can be precisely estimated simply by prescanning a part of the readable area R0, and the read area the scaling factor, and the inclination correction amount can be appropriately set based on the estimation result and an appropriate copy image can be printed on a record sheet.

Specifically, in the exemplary embodiment, the prescan image data provided by performing the leading end prescanning processing is converted into edge image data, the edge points corresponding to the right edge, the left edge, and the lower edge are extracted from the edge image data, and the corner positions of the document are estimated from the approximate lines.

Specifically, in the exemplary embodiment when it is considered that the right edge approximate line is inclined and the document is not precisely placed and when it is considered that the likelihood of the right edge approximate line, the left edge approximate line, and the lower edge approximate line is high, the intersection point of the right edge approximate line and the lower edge approximate line is estimated to be the lower-right corner position and the intersection point of the left edge approximate line and the lower edge approximate line is estimated to be the lower-left corner position.

Therefore, according to the exemplary embodiment, the corner positions of the document can be appropriately estimated and the document state (the size, etc.,) can be estimated if a corner of the document does not appear in the prescanning result as the document is not precisely placed and a corner of the document is broken or is TO outside the readable area, etc., as well as if the whole image of the document does not appear in the prescan image data.

In the exemplary embodiment, since the end part of the document table 11*a* is outside the readable area, if the lower-left corner of the document P is precisely struck against the lower-left corner of the inside of the frame 13*a*, the left edge and the lower edge of the document cannot be detected. Therefore, in the exemplary embodiment, if the document inclination is a minute amount, the document size, etc., is estimated only using the right edge approximate line. If the document inclination is a considerable amount, the left edge and the lower edge may be unable to be precisely detected.

In contrast, in the exemplary embodiment, since the mark MK allows the user to strike a document as an indication, if the document is inclined, it is hard to consider that the document placement state largely shifts from the correct document placement state. If the document is inclined to the left, the possibility that the lower-left corner of the document may strike against the step on the boundary BD between the document table 11*a* and the frame 13*a* is high; if the document is inclined to the right, the possibility that the lower-right corner of the document may strike against the step is high.

Thus, in the exemplary embodiment, when the document is inclined and when the right edge, the left edge, and the tower edge cannot precisely be detected, it is assumed that the detection result of the right edge is most correct; if the document is inclined to the left, it is assumed that the lower-left corner of the document strikes against the step on the boundary between the document table 11*a* and the frame 13*a* and if the document is inclined to the right, it is assumed that the lower-right corner of the document strikes against the step and the lower-left corner position and the lower-right corner position of the document are estimated.

Therefore, according to the exemplary embodiment, if the right edge, the left edge, and the lower edge cannot precisely be detected, the document size, the document inclination, and the document placement area can be estimated correctly for the most part.

A partial prescanning unit of the invention is implemented as S310 executed by the CPU 70 and the processing of the read control unit 20, and a corner estimation unit is implemented as S315 executed by the CPU 70 and S410 to S485 in the document estimation processing (S320). In addition, a document estimation unit is implemented as S490 to S497, and a read area determination unit is implemented as S360 executed by the CPU 70.

An overall prescanning unit of the invention is implemented as S210 executed by the CPU 70 and the processing of the read control unit 20, a subdocument estimation unit is implemented as S215 and S220, and a switching unit is implemented as S110 and S130.

A conversion unit of the invention is implemented as S315 executed by the CPU 70, and a corner estimation unit is implemented as S315 executed by the CPU 70 and S410 to S485 in the document estimation processing (S320). A first side of a document table corresponds to the lower side (lower end margin) of the document table 11a, a second side corresponds to the left side (left end margin) of the document table 11a, and a third side corresponds to the right side (right end margin) of the document table 11a in the exemplary embodiment. A convex strip of the invention is formed of the frame 13a projecting from the surface of the document table 11a in the exemplary embodiment.

In addition, the operation of the corner estimation unit when extraction of the edge points corresponding to the second side of the document results in failure and extraction of the edge points corresponding to the third side of the document results in success is implemented as S970 and S980 executed by the CPU 70 in the exemplary embodiment. The operation of the corner estimation unit when extraction of the edge points corresponding to the first side of the document results in failure and extraction of the edge points corresponding to the second side and the third side of the document results in success is implemented as S950 and S960 executed by the CPU 70 in the exemplary embodiment.

A prescanning unit of the invention is implemented as S310 executed by the CPU 70 and the processing of the read control unit 20, and a document estimation unit is implemented as S490.

In the exemplary embodiment, the document inclination angle θ is found from the right edge approximate line (S493). However, at S493, the angle which the line connecting the lower-left corner and the lower-right corner of the document forms with the X axis may be found as the document inclination angle θ based on the position coordinates of the lower-left corner and the lower-right corner of the document estimated in the first or second corner position estimation processing.

Second Exemplary Embodiment

A second exemplary embodiment of the invention will be discussed. Components similar to those of the first exemplary embodiment are denoted by the same reference numerals and will not be discussed again in detail.

In a multi-function device 1 of the second exemplary embodiment, when the user enters a copy command through an operation key provided on a display and operation unit 50, a CPU 70 executes copy control processing (see FIG. 17), controls units of the apparatus, and prints a read image of a document P placed on read glass 11. More specifically, the CPU 70 estimates the size of the document P placed on the read glass 11 based on the read result through a read unit 15, sets a scaling factor from the estimated document size and the record sheet size, scales up or down the read image of the document P to the size fitted to the record sheet size, and prints the read image on the record sheet through a print unit 30 (automatic scaling copy processing).

The copy control processing of the second exemplary embodiment will be specifically described.

In the multi-function device 1 of the second exemplary embodiment, the lower-left corner of a document table 11a (in other words, the inner lower-left corner of a frame 13a) is defined as the position with which the corner of the document P is to be matched, and the left end margin and the lower end margin extending from the lower-left corner of the document table 11a are defined as end margins with which the sides of the document P (end margins) are to be matched. The multi-function device 1 estimates the document size, etc., and realizes the copy operation of the document on the assumption that the user places the document P so as to be matched with a mark MK for the most part.

In addition, in the multi-function device 1 of the second exemplary embodiment, an XY coordinate system wherein the lower-left corner of a readable area R0 corresponding to the lower-left corner of the inside of the frame 13a on which the mark MK is put is an origin, the main scanning direction is an X axis, and the subscanning direction is a Y axis is introduced (see FIG. 2B). The CPU 70 uses the XY coordinate system to execute copy control processing shown in FIG. 17.

Figure 17:
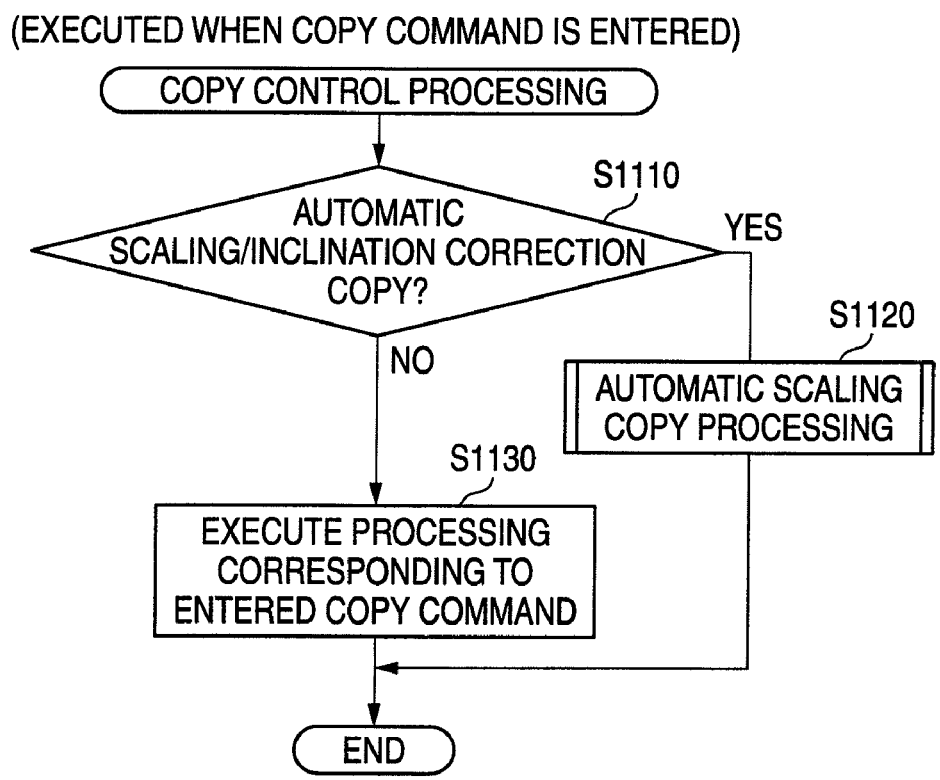
FIG. 17 is a flowchart to represent copy control processing in a second exemplary embodiment of the invention, executed by a CPU.

Subsequently, the copy control processing executed by the CPU 70 will be discussed. FIG. 17 is a flowchart to represent the copy control processing executed by the CPU 70 when the user enters a copy command through the operation key.

When starting the copy control processing, the CPU 70 determines whether or not the copy command entered through the operation key is an "automatic scaling/inclination correction" copy command (S1110). If the CPU 70 determines that the copy command is an "automatic scaling/inclination correction" copy command (Yes at S1110), the CPU 70 goes to S1120 and executes automatic scaling copy processing shown in FIG. 18. Then, the CPU 70 completes the copy control processing.

In contrast, if the CPU 70 determines that the copy command entered through the operation key is a copy command other than the "automatic scaling/inclination correction" copy command (for example, if the CPU 70 determines that the entered copy command is a normal copy command without specification of automatic scaling or inclination correction), the CPU 70 executes the processing corresponding to the entered copy command at S1130 and then completes the copy control processing.

Figure 18:
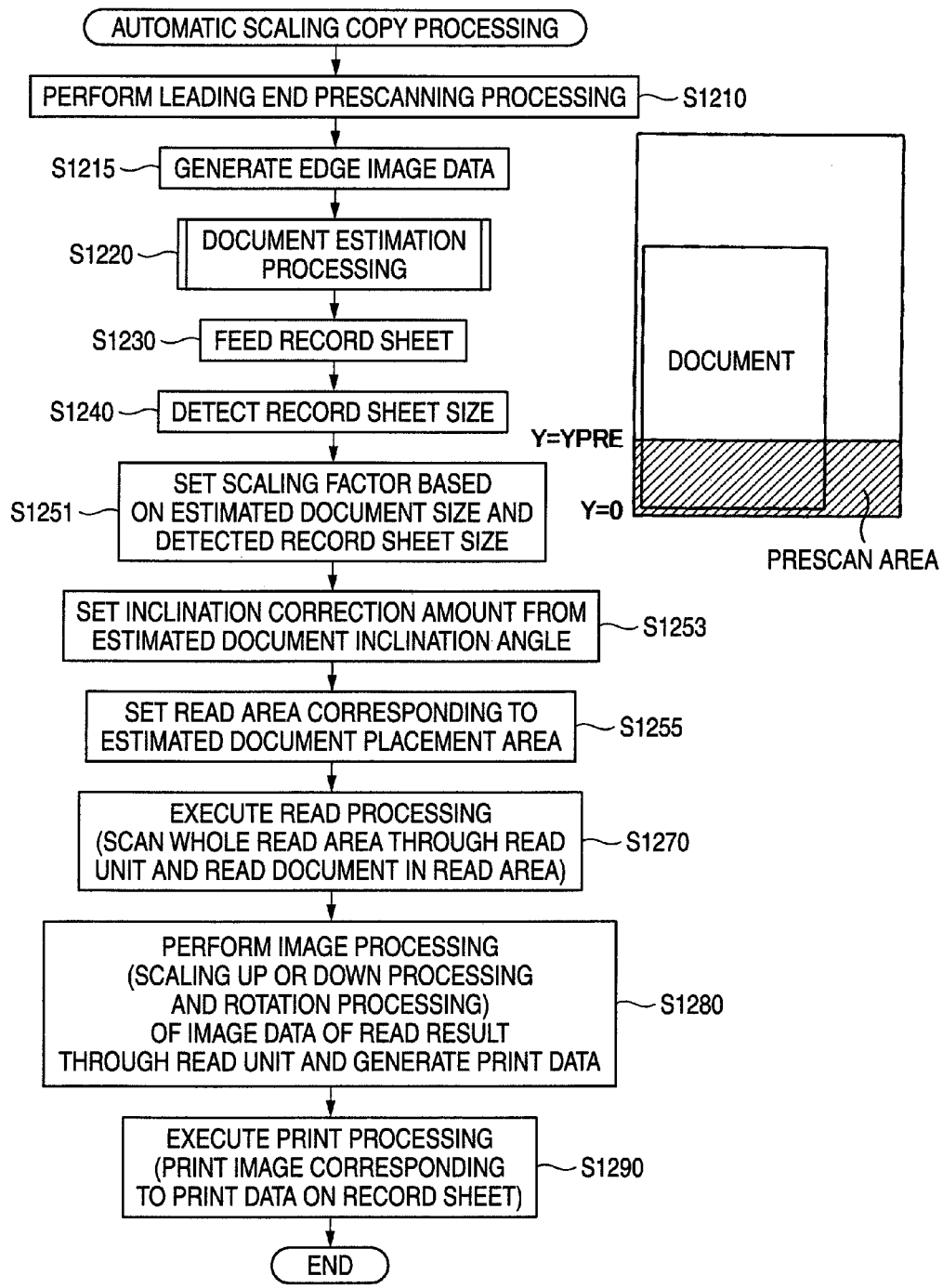
FIG. 18 is a flowchart to represent automatic scaling copy processing executed by the CPU.

Subsequently, the automatic scaling copy processing executed at S1120 by the CPU 70 will be discussed. FIG. 18 is a flowchart to represent the automatic scaling copy processing executed by the CPU 70.

When starting the automatic scaling copy processing executed at S1120, first the CPU 70 sets the document read start position to the lower end (Y=0) of the readable area R0 and the document read termination position to a position (Y=YPRE) at a predetermined distance from the lower end of the readable area R0 predetermined at the design stage, thereby setting a part of the readable area R0 corresponding to the area from the document read start position to the document read termination position to the read area (in other words, prescan area), and causes an image read unit 10 to execute the prescanning operation over the read area through a read control unit 20 (S1210: Leading end prescanning processing).

That is, at S1210, the image read unit 10 is caused to execute the prescanning operation from the lower end of the readable area R0 to a point at a predetermined distance from the lower end of the readable area R0 to the inside of the readable area no (in the second exemplary embodiment, to a point at a distance of 30 mm from the lower end of the readable area R0) rather than caused to execute the prescanning operation over the whole readable area R0. Accordingly, the CPU 70 acquires the image data representing the read result of the partial area of the readable area R0 as the prescanning result from the image read unit 10.

As the prescanning direction, the image read unit 10 executes the operation of conveying the read unit 15 in the subscanning direction at speed corresponding to the resolution for prescanning from one end to the other of the setup read area, causing the read unit 15 to read an image of the read area, and records low-resolution image data as the prescanning result (which will be hereinafter referred to as "prescan image data") in RAM 80 through the read control unit 20. However, as the read resolution for prescanning, it is assumed that the same resolution is determined for the main scanning direction resolution and the subscanning direction resolution.

After S1210, then the CPU 70 executes edge detection processing for the prescan image data recorded in the RAM 80 and generates edge image data corresponding to the image data (S1215). That is, the CPU 70 passes the prescan image data recorded in the RAM 80 through an image filter for edge detection (such as differential filter) and generates edge image data representing an edge image corresponding to the image data.

Figure 19:
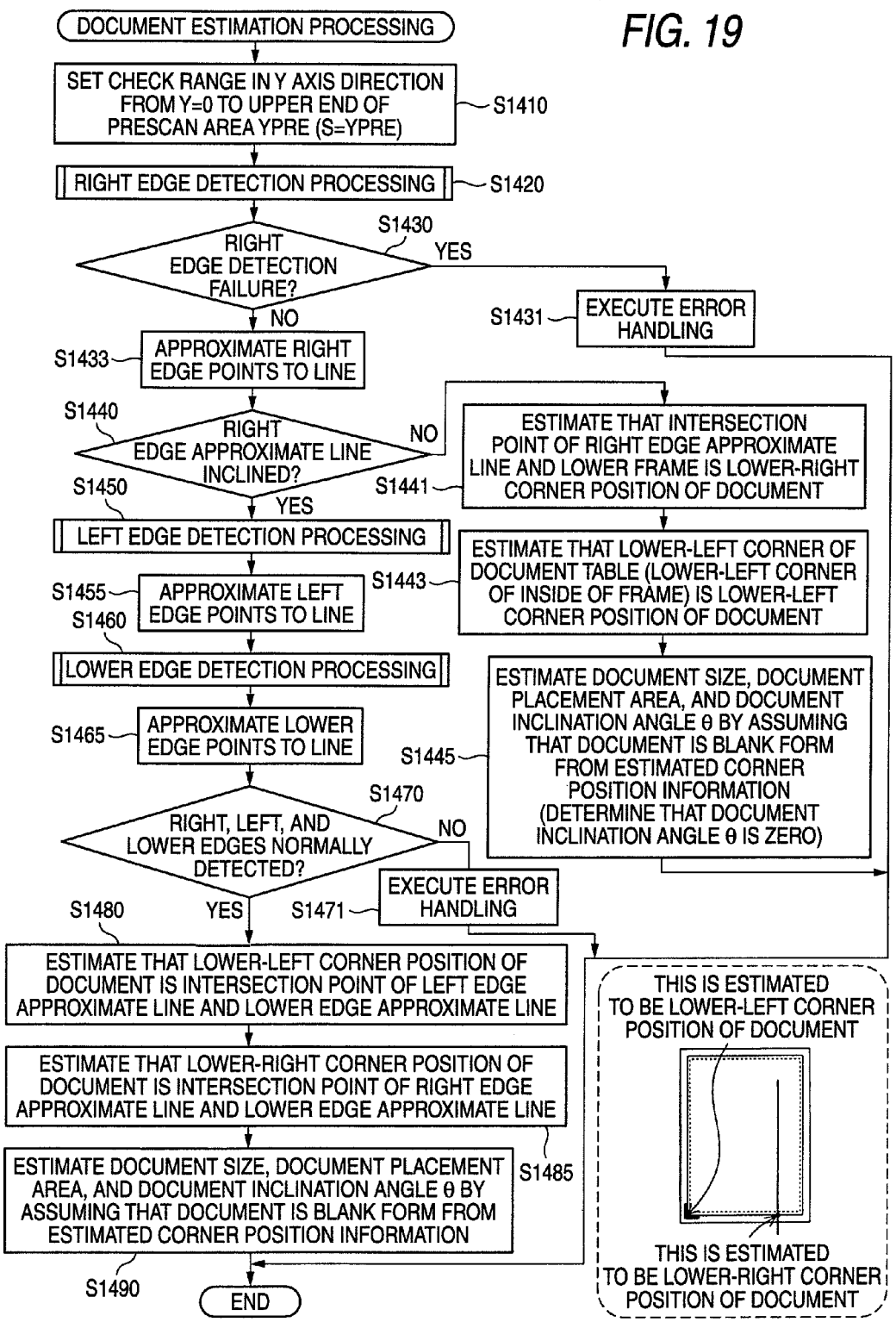
FIG. 19 is a flowchart to represent document estimation processing executed by the CPU.

After S1215, the CPU 70 sets the generated edge image data to check target data and executes document estimation processing shown in FIG. 19 (S1220). Although described later in detail, in the document estimation processing, the check target data (the edge image data provided at S1215) is analyzed, a document edge is detected, and the size (height× width) of the document placed on the document table 11$a$, an inclination angle θ of the document, and the placement area of the document on the document table 11$a$ are estimated.

After S1220, the CPU 70 causes the print unit 30 to execute the sheet feed operation through a print control unit 40 (S1230) and also detects the size of the fed record sheet (S1240). Then, the CPU 70 goes to S1251. The size of the record sheet can be detected according to a technique using a sensor provided in the conveying passage of the record sheet, for example.

At S1251, the CPU 70 sets the scaling factor according to a predetermined calculation expression based on the document size estimated at S1220 and the record sheet size detected at S1240. Specifically, the CPU 70 sets the scaling factor to the scaling factor corresponding to the ratio between the document size and the record sheet size (for example, record sheet short side length÷document short side length) so that a copy image of the document is printed on the record sheet as it is scaled up according to the scaling factor corresponding to the ratio between the document size and the record sheet size (or is scaled down if the scaling factor is less than 1) in the subsequent processing.

After S1251, the CPU 70 sets the inclination correction amount of the image data from the document inclination angle ( ) estimated at S1220 (S1253). Specifically, the CPU 70 sets the inclination correction amount so that the copy image of the document is printed on the record sheet straightly without any inclination. However, if the estimated document inclination angle θ is a minute amount (in the second exemplary embodiment, −0.5 degrees≦θ≦0.5 degrees), an error is also considered and the inclination correction amount is set to zero.

After S1253, the CPU 70 sets the document read start position and the document read termination position based on information of the document placement area estimated at S1220, and makes the read area defined by the document read start position and the document read termination position correspond to the placement area of the document on the document table 11$a$ (S1255).

Specifically, to enable the read unit 15 to read the whole placement area of the document, the document read start position is set to the position corresponding to the end point of the document at the lowest position in the subscanning direction and the document read termination position is set to the position corresponding to the end point of the document at the uppermost position in the subscanning direction so that the read area is made to correspond to the placement area of the document on the document table 11$a$. After S1255, the CPU 70 goes to S1270.

At S1270, the CPU 70 controls the image read unit 10 through the read control unit 20, thereby causing the image read unit 10 to convey the read unit 15 in the subscanning direction from the document read start position to the document read termination position and while the read unit 15 is conveyed, causing the read unit 15 to execute the read operation for each line so as to read an image of the setup read area and record the image data representing the read result of the read area in the RAM 80 (S1270).

Then, the CPU 70 performs scaling up or down processing of the image data representing the read result recorded in the RAM 80 according to the preset scaling factor, performs rotation processing of the image data as much as the preset inclination correction amount, converts the image data representing the read result into image data for print, and sets the provided image data in print data (S1280). However, if the inclination correction amount is set to zero, the rotation processing is skipped at S1280.

After S1280, the CPU 70 executes print processing about the print data (S1290). That is, the CPU 70 causes the print unit 30 to print an image based on the print data on the fed record sheet through the print control unit 40. Then, the copy control processing is completed.

Thus, in the automatic scaling copy processing, the document size, etc., is estimated based on the prescanning result of the partial area in the readable area R0 and from the result, the read area at the scanning time (S1270 executing time) is determined and the scaling factor and the inclination correction amount are also determined. The copy image of the document is scaled up or down to the size corresponding to the ratio between the document size and the record sheet size and is subjected to inclination correction and then is printed on the record sheet.

Subsequently, the document estimation processing executed at S1220 by the CPU 70 will be discussed with FIG. 19. FIG. 19 is a flowchart to represent the document estimation processing executed by the CPU 70.

When starting the document estimation processing, first the CPU 70 sets a variable S in YPER of the Y coordinate of the upper end of the prescan area described above (S=YPRE), thereby setting the check range in the Y axis direction from Y=0 to Y=S=YPRE (S1410). Then, the CPU 70 goes to S1420 and executes right edge detection processing shown in FIG. 7 as in the first exemplary embodiment.

When exiting the right edge detection processing, the CPU 70 returns to the document estimation processing and goes to S1430 and determines whether or lot the right edge detection results in failure in the immediately preceding right edge detection processing. Specifically, if there is no coordinate data registered as the document right edge data in the immediately preceding right edge detection processing, the CPU 70 determines that the right edge detection results in failure; if there is coordinate data registered as the document right edge data, the CPU 70 determines that the right edge detection results in success.

However, exceptionally, if the coordinate data registered as the document right edge data exists in the proximity of the left end (Y=0) of the readable area R0, it may be assumed that the coordinate data of the left edge (edge points representing the left end of the document) is erroneously registered as the document right edge data and even if there is coordinate data registered as the document right edge data, it may be determined that the right edge detection results in failure.

As the case where the right edge detection results in failure, the case where the document size is larger than the size of the document table 11a and the right end of the document protrudes from the document table 11a or the like can be named.

If the CPU 70 determines that the right edge detection results in failure (YES at S1430), the CPU 70 goes to S1431 and executes error handling. For example, as the error handling at S1431, the multi-function device 1 can be configured so as to execute processing of "displaying a message for prompting the user to place the document correctly or a message for prompting the user to enter another copy command because the automatic scaling copy function cannot be used on a display of the display and operation unit 50 and then forcibly terminating the copy control processing corresponding to the copy command causing S1431 to be executed and invalidating the copy command."

In addition, as the error handling at S1431, the multi-function device 1 may be configured so as to execute processing of "estimating perfunctorily that the size of the document placed on the document table 11a is a predetermined fixed size and estimating that the document inclination angle θ is zero and father estimating that the document placement area is an area where the document is placed when it is assumed that the lower-left corner of the document of the estimated size is struck correctly against the lower-left corner of the document table 11a" and then the CPU 70 may exit the document estimation processing, return to the automatic scaling copy processing, and go to S1230.

In contrast, if the CPU 70 determines that the right edge detection results in success (NO at S1430), the CPU 70 goes to S1433 and approximates the points indicated by the document right edge data determined in the right edge detection processing to a line and calculates an approximate line of the points indicated by the document right edge data (which will be hereinafter represented as "right edge approximate line").

Then, the CPU 70 goes to S1440 and determines whether or not the right edge approximate line is inclined larger than a predetermined angle with respect to the Y axis. In the second exemplary embodiment, specifically, the CPU 70 determines whether or not the right edge approximate line is inclined larger than 0.5 degrees with respect to the Y axis.

If the CPU 70 determines that the inclination of the right edge approximate line is equal to or less than the predetermined angle (NO at 81440), the CPU 70 estimates that the document is struck against the lower-left corner of the inside of the frame 13a and is placed correctly on the document table 11a, and estimates that the intersection point of the right edge approximate line and the lower end margin of the document table 11a is the lower-right corner position of the document (S1441), as shown at the right of FIG. 19.

After S1441, the CPU 70 estimates that the lower-left corner position of the document is the point of the lower-left corner of the document table 11a (S1443), and estimates the size of the document placed on the document table 11a and the placement area of the document on the document table 11a by assuming that the document placed on the document table 11a is a quadrangular blank form based on the coordinates of the corner positions estimated at S1441 and S1443, and also estimates the document inclination angle θ (S144).

Specifically, the CPU 70 estimates that the length from the lower-left corner position of the document to the lower-right corner position of the document estimated at S1441 and S1443 is the short side length (width) of the document, estimates that $\sqrt{2}$ times the short side length is the long side length (height) of the document, and estimates the document size. The CPU 70 derives the coordinates of the positions of the upper-left corner and the upper-right corner of the document by assuming that the document of the size mentioned above is placed on the document table 11a based on the estimated lower-left corner position and the estimated lower-right corner position, and estimates that the area in a quadrangle formed by connecting the four concerns is the document placement area. The reason why it is estimated that $\sqrt{2}$ times the short side length of the document is the long side length of the document is that the ratio of the short side length of the blank form: the long side length is $1:\sqrt{2}$.

Since the corner positions are found at S1441 and S1443 by assuming that the document is struck precisely against the lower-left corner of the document table 11a and is placed on the document table 11a, it is estimated at S1445 that the document inclination angle θ is zero (no inclination).

After S1445, the CPU 70 exits the document estimation processing (S1220), returns to the automatic scaling copy processing, goes to S1230, and executes the subsequent processing as described above. That is, the CPU 70 sets the scaling factor and the inclination correction amount based on the information of the document size, the document inclination angle, and the document placement area estimated in the document estimation processing (S1251 and S1253) and further sets the read area (S1255). Then, the CPU 70 goes to S1270 (scanning) and realizes the copy operation. However, here, the document inclination angle θ is estimated to be zero and therefore inclination correction is not substantially executed.

Referring again to FIG. 19, in the document estimation processing, if the CPU 70 determines at S1440 that the right edge approximate line is inclined larger than the predetermined angle with respect to the Y axis (YES at S1440), the CPU 70 goes to S1450 and executes left edge detection processing shown in FIG. 10 as in the first exemplary embodiment.

When exiting the left edge detection processing, the CPU 70 returns to the document estimation processing and goes to S1455 and approximates the points indicated by the document left edge data determined in the left edge detection processing to a line and calculates an approximate line of the points indicated by the document left edge data (which will be hereinafter represented as "left edge approximate line"). Then, the CPU 70 goes to S1460.

However, if there is no coordinate data registered as the document left edge data in the immediately preceding left edge detection processing, the CPU 70 determines that the left edge detection results in failure and goes to S1460 without calculating the left edge approximate line. In addition, if all or a part of the coordinate data registered as the document left edge data is also registered as the document right edge data, it may be assumed that the coordinate data of the right edge (edge points representing the right end of the document) is erroneously registered as the document left edge data and even if there is coordinate data registered as the document left edge data, it may be determined that the left edge detection results in failure and the CPU 70 may go to S1460 without calculating the left edge approximate line.

At S1460, the CPU 70 executes lower edge detection processing shown in FIG. 11 as in the first exemplary embodiment.

When exiting the lower edge detection processing, the CPU 70 returns to the document estimation processing and goes to S1465 and approximates the points indicated by the document lower edge data determined in the lower edge detection processing to a line and calculates an approximate line of the points indicated by the document lower edge data (which will be hereinafter represented as "lower edge approximate line"). Then, the CPU 70 goes to S1470. However, if there is no coordinate data registered as the document lower edge data in the immediately preceding lower edge detection processing, the CPU 70 determines that the lower edge detection results in failure and goes to S1470 without calculating the lower edge approximate line.

At S1470, the CPU 70 determines whether or not the document edges are detected correctly in the right edge detection processing (S8420), the left edge detection processing (S1450), and the lower edge detection processing (S1460) from the correlation among the right edge approximate line, the left edge approximate line, and the lower edge approximate line. That is, the CPU 70 determines whether or not all of the right edge, the left edge, and the lower edge are normally detected.

Specifically, if the right edge approximate line and the left edge approximate line are parallel with each other, the right edge approximate line and the lower edge approximate line are orthogonal to each other, and the left edge approximate line and the lower edge approximate line are orthogonal to each other, it is assumed that the document edges are detected correctly and the determination at S1470 is YES.

In contrast, if detection of any of the right edge, the left edge, or the lower edge results in failure or if the relationship among the right edge, the left edge, and the lower edge is not correct, the determination at S1470 is NO. That is, it is assumed that the document edges are not correctly detected and the determination at S1470 is NO except for the case where the right edge approximate line and the left edge approximate line are parallel with each other, the right edge approximate line and the lower edge approximate line are orthogonal to each other, and the left edge approximate line and the lower edge approximate line are orthogonal to each other. However, the determination of the correlation should be executed considering an error.

If the CPU 70 determines that the document edges are not correctly detected (NO at S1470), the CPU 70 goes to S1471 and executes error handling similar to that at S1431.

In contrast, if the CPU 70 determines that the document edges are detected correctly (YES at S1470), the CPU 70 goes to S1480 and estimates that the lower-left corner position of the document is the intersection point of the left edge approximate line and the lower edge approximate line and calculates the coordinate value of the position (S1485). FIG. 13 is a schematic representation to show an estimation method of a document lower-left corner position Ka and a document lower-right corner position Kb at S1480 and S1485. In the figure, an open circle represents an edge point and filled circles represent the corner positions Ka and Kb.

After S1485, the CPU 70 estimates the size of the document placed on the document table 11a and the placement area of the document on the document table 11a by assuming that the document placed on the document table 11a is a blank form based on the coordinates of the corner positions estimated at S1480 and S1485, and also estimates the inclination angle θ of the document placed on the document table 11a based on the right edge approximate line (S1490).

That is, the CPU 70 estimates that the length from the lower-left corner position of the document to the lower-right corner position of the document estimated at S1480 and S1485 is the short side length (width) of the document, estimates that √2 times the short side length is the long side length (height) of the document, and estimates the document size. The CPU 70 derives the coordinates of the positions of the upper-left corner and the upper-right corner of the document by assuming that the document of the size mentioned above is placed on the document table 11a based on the estimated lower-left corner position and the estimated lower-right corner position, and estimates that the area in a quadrangle formed by connecting the four concerns is the document placement area.

In addition, at S1490, the CPU 70 estimates that the angle of the right edge approximate line with respect to the Y axis is the inclination angle θ of the document. Then, the CPU 70 exits the document estimation processing at S1220, returns to the automatic scaling copy processing, goes to S1230, and executes the subsequent processing. That is, the CPU 70 sets the scaling factor and the inclination correction amount based on the estimation result in the document estimation processing (S1251 and S1253) and further sets the read area (S1255). Then, the CPU 70 goes to S1270 (scanning).

In the scanning (S1270), the CPU 70 conveys the read unit in the setup read area and reads an image reflected on the read area through the read unit. The CPU 70 performs scaling up or down processing of the read result in response to the setup scaling factor and performs rotation processing in response to the setup inclination correction amount to generate image data for print. The CPU 70 uses the image data as print data and executes print processing, thereby printing a copy image of the document automatically scaled up or down and farther subjected to the inclination correction on the record sheet through the print unit.

The configuration of the digital multi-function device 1 of the second exemplary embodiment has been described. According to the multi-function device 1 of the second exemplary embodiment, to detect the right edge and the left edge, a search is made for candidates for the edge points to be detected as the right edge and the left edge by shifting the check position one pixel at a time (corresponding to a first distance interval) in the X axis direction of the main scanning direction; while, a search is made for candidates for the edge points to be detected as the right edge and the left edge by shifting the check position eight pixels at a time (corresponding to a second distance interval) in the Y axis direction of the subscanning direction.

Thus, in the second exemplary embodiment, if continuity of the edge points is checked at intervals in the subscanning direction, an edge point group is not detected as the right edge or the left edge unless continuity of the edge points is acknowledged.

Likewise, to detect the lower edge, a search is made for candidates for the edge points to be detected as the lower edge by shifting the check position one pixel at a time (corresponding to the first distance interval) in the Y axis direction of the subscanning direction; while, a search is made for candidates for the edge points to be detected as the lower edge by shifting the check position eight pixels at a time (corresponding to the second distance interval) in the X axis direction of the main scanning direction.

Therefore, according to the multifunction device 1 of the second exemplary embodiment, erroneous detection of a document edge as large dust and small dust placed on the document table 11a form an image pattern similar to the document edge can be prevented as much as possible.

For example, in the second exemplary embodiment, the edge points recognized as continuous edge points in a 64-pixel area are detected as a document edge; if continuity check is executed every pixel rather than every eight pixels as in the second exemplary embodiment, the continuity determination criterion is too strict and it becomes impossible to detect a true document edge with good sensitivity. Thus, the continuity check area is lowered to a 32-pixel area, for example, and whether or not 32 pixels are continuous is checked. In so doing, the detection sensitivity is also enhanced for dust and erroneous detection of a document edge often occurs because of the effect of dust.

That is, according to the multi-function device 1 of the second exemplary embodiment, edge continuity is checked according to the technique described above, whereby a true document edge can be detected with good sensitivity and the sensitivity to dust, etc., can be suppressed and consequently, erroneous detection of a document edge can be suppressed.

According to the second exemplary embodiment, a search is made for the candidates for the edge points to be detected as a document edge from the end of the check target data, so that the document edge can be detected without much receiving the effect of a ruled line, etc., drawn in a document. Therefore, according to the second exemplary embodiment, the document edge can also be detected with high accuracy from the point.

In addition, in the second exemplary embodiment, the edge points are checked for continuity every eight pixels and if discontinuity occurs once (NO at S637, S737, or S837), the continuity check is stopped and a search is made for another candidate. Thus, the sensitivity to dust, etc., can be suppressed and taking time in detecting a document edge, caused by an increase in continuity check because of the effect of dust, etc., can also be suppressed and a document edge can be detected at high speed.

In the second exemplary embodiment, a partial area of the readable area R0 is prescanned, the document edges are detected based on the read result, and the document state (the document size, the document inclination, and the document placement area) is estimated. Thus, according to the second exemplary embodiment, the prescanning operation can be completed at higher speed than the prescanning technique of the whole readable area R0 as former and the document state can be estimated efficiently.

First Modified Example of Second Exemplary Embodiment

Subsequently, a first modified example of the second exemplary embodiment will be discussed. In a multi-function device of the first modified example of second exemplary embodiment, a part of automatic scaling copy processing and a part of document estimation processing executed in the automatic scaling copy processing are changed from those in the second exemplary embodiment and other components of the multi-function device are the same as the multi-function device 1 of the second exemplary embodiment and therefore the components identical with those of the second exemplary embodiment will not be discussed again where appropriate.

Figure 20:
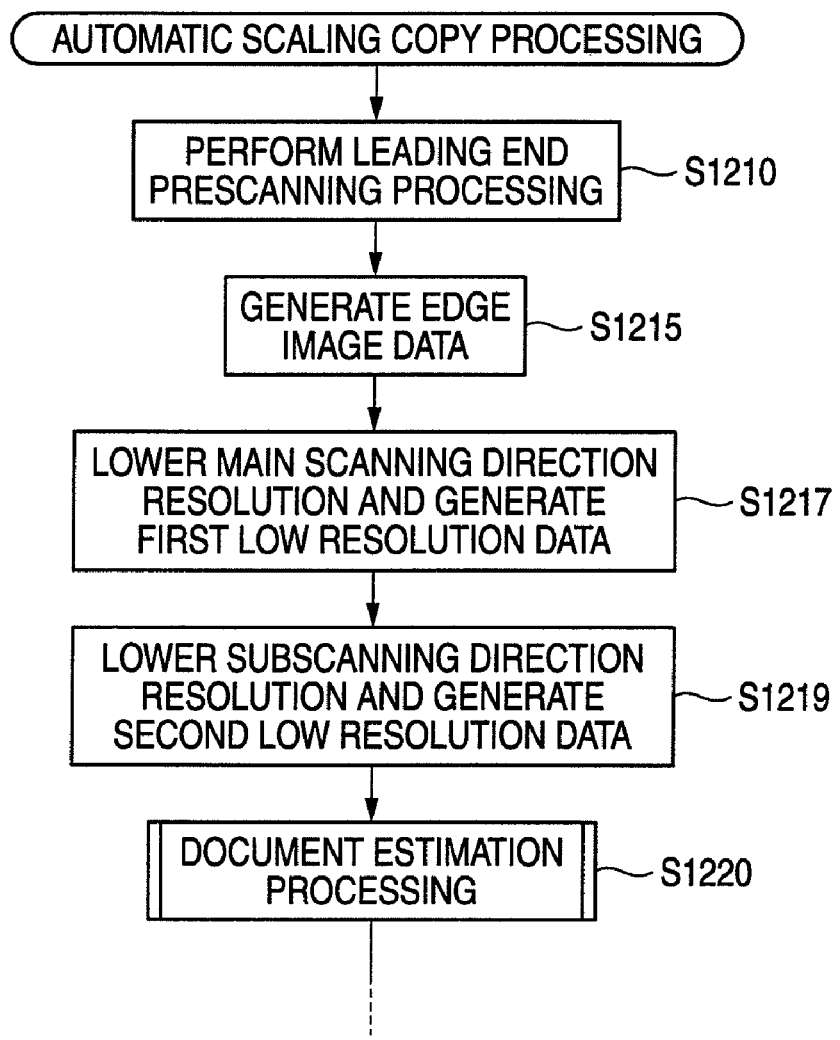
FIG. 20 is a flowchart to represent automatic scaling copy processing executed by a CPU in a first modified example of the second exemplary embodiment of the invention.

FIG. 20 is a flowchart to represent a part of the automatic scaling copy processing executed by a CPU 70 in an extraction manner in the first modified example of the second exemplary embodiment.

When an "automatic scaling/inclination correction" copy command is entered, the CPU 70 starts the automatic scaling copy processing shown in FIG. 20 at S1120. As in the exemplary embodiment described above, first the CPU 70 executes leading end prescanning processing (S1210) and then passes the prescan image data recorded in RAM 80 by executing the leading end prescanning processing through an image filter and converts the image data into edge image data (S1215).

After S1215, the CPU 70 converts the edge image data provided at S1215 into first low resolution data (S1217) and also converts the edge image data provided at S1215 into second low resolution data (S1219).

The first low resolution data is generated by lowering the main scanning direction resolution of the edge image data. Here, specifically the main scanning direction resolution of the edge image data is lowered to one-eighth to generate the first low resolution data.

In contrast, the second low resolution data is generated by lowering the subscanning direction resolution of the edge image data. Here, specifically the subscanning direction resolution of the edge image data is lowered to one-eighth to generate the second low resolution data.

FIGS. 21A to 21C are schematic representations to describe generation methods and compositions of the first low resolution data and the second low resolution data. FIG. 21B is a drawing to represent the composition of the first low resolution data and FIG. 21C is a drawing to represent the composition of the second low resolution data. FIG. 21C is a drawing to represent the composition of image data on which the low resolution data is generated based for comparison between the low resolution data shown in FIG. 21B and that shown in FIG. 21C.

As shown in FIGS. 21A and 21B, at S1217, a pixel whose position in the main scanning direction is a multiple of 8, $X=8 \cdot m$ (where $m=0, 1, 2, \ldots$) is selectively extracted from the edge image data and image data is again constructed, whereby the first low resolution data is generated by lowering the main scanning direction resolution of the edge image data to one-eighth. Each cell shown in FIGS. 21A to 21C represents a pixel, and coordinates (X, Y) shown in FIGS. 21B and 21C represent the pixel position in the image data on which the low resolution data is generated based. As shown in FIG. 21B, the first low resolution data is made up of a set of pixels whose positions in the edge image data generated at S1215 are $(X, Y)=(8 \cdot m, Y)$.

At S1219, as shown in FIG. 21C, a pixel whose position in the subscanning direction is a multiple of 8, $Y=8 \cdot m$ (where $m=0, 1, 2, \ldots$) is selectively extracted and image data is again constructed, whereby the second low resolution data is generated by lowering the subscanning direction resolution of the edge image data to one-eighth.

Figure 22:
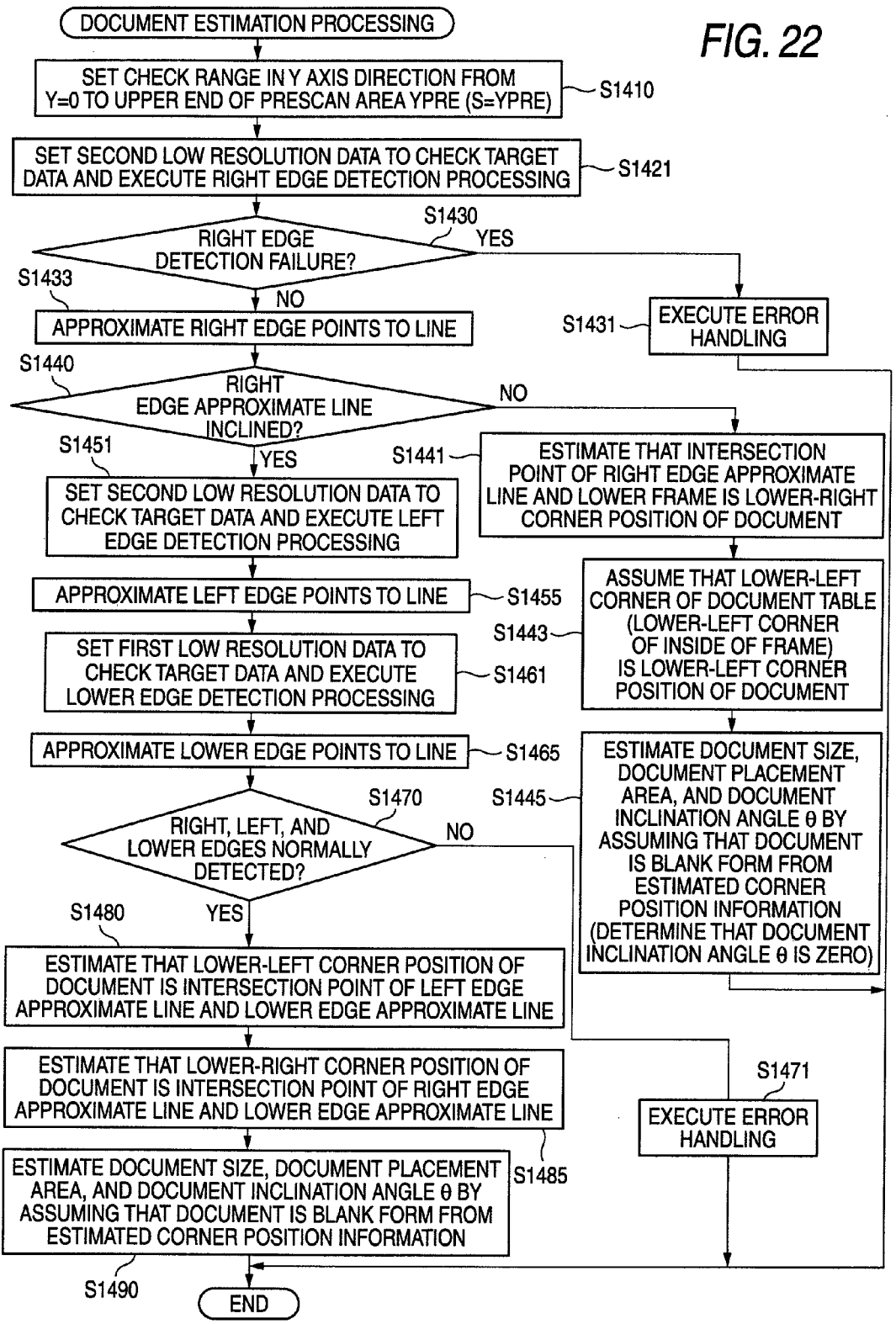
FIG. 22 is a flowchart to represent document estimation processing executed by the CPU in the first modified example the second exemplary embodiment of the invention.

After S1219, the CPU 70 executes document estimation processing shown in FIG. 22 (S1220). Then, the CPU 70 returns to the automatic scaling copy processing and goes to S1230 and executes subsequent processing (S1230 to S1290) as in the exemplary embodiment described above.

Subsequently, the document estimation processing in the first modified example will be discussed with FIG. 22. FIG. 22 is a flowchart to represent the document estimation processing executed by the CPU 70 in the first modified example.

As shown in FIG. 22, in the document estimation processing executed in the first modified example, S1421, S1451, and S1461 described below are executed in place of S1420, S1450, and S1460 described above. Other steps are similar to those in the exemplary embodiment described above. Therefore, the document estimation processing in the first modified example will be briefly described.

In the first modified example, as the first low resolution data and the second low resolution data are generated from the edge image data at S1217 and S1219 previously executed, the second low resolution data generated at S1219 is set to check target data and right edge detection processing is executed for the data at S1421 executed in place of S1420. When completing the right edge detection processing, the CPU 70 goes to S1430. The right edge detection processing is as previously described in the exemplary embodiment except that the image data to be referenced is the second low resolution data, that the variable Y1 is updated as Y1←Y0+1 at S633, that the variable Ye is updated to a value resulting from adding one rather than eight at S647, or that the variable Ye is updated to a value resulting from adding eight rather than 64 at S685 (see FIG. 7).

In the first modified example, at S1451 executed in place of S1450, the second low resolution data generated at S1219 is set to check target data and left edge detection processing is executed for the data as at S1421. When completing the left edge detection processing, the CPU 70 goes to S1455. The left edge detection processing is as previously described in the exemplary embodiment except that the image data to be referenced is the second low resolution data, that the variable Y1 is updated as Y1←Y0+1 at S733, that the variable Ye is updated to a value resulting from adding one rather than eight at S747, or that the variable Ye is updated to a value resulting from adding eight rather than 64 at S785 (see FIG. 10).

In addition, in the first modified example, at S1461 executed in place of S1460, the first low resolution data generated at S1217 is set to check target data and lower edge detection processing is executed for the data. When completing the lower edge detection processing, the CPU 70 goes to S1465. The lower edge detection processing is as previously described in the exemplary embodiment except that the image data to be referenced is the first low resolution data, that the variable X1 is updated as X1←X0+1 at S833, that the variable Xe is updated to a value resulting from adding one rather than eight at S847, or that the variable Xe is updated to a value resulting from adding eight rather than 64 at S885 (see FIG. 11).

Thus, in the modified example, the document estimation processing equivalent to that in the exemplary embodiment described above is realized by generating the first low resolution data and the second low resolution data from the edge image data. Therefore, also in the first modified example, the effect of dust, etc., can be suppressed and the document edges can be detected appropriately from the image data and consequently the scaling factor setting operation, the inclination correction operation, etc., can be executed appropriately as in the exemplary embodiment described above.

Second Modified Example of Second Exemplary Embodiment

Subsequently, a second modified example of the second exemplary embodiment will be discussed. In a multi-function device of the second modified example of the second exemplary embodiment, a part of automatic scaling copy processing and a part of the function of read control unit 20 are changed from those in the second exemplary embodiment and other components of the multi-function device are the same as the multi-function device of the first modified example described above and therefore the components identical with those of the first modified example will not be discussed again where appropriate.

Figure 23A:
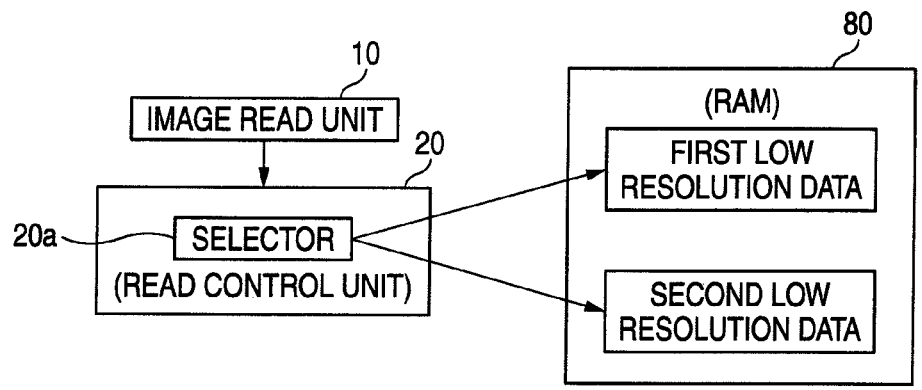
FIG. 23A is a block diagram to represent the configuration of a read control unit in a second modified example of the second exemplary embodiment.

FIG. 23A is a block diagram to schematically show the configuration of a read control unit 20 included in the multi-function device of the second modified example of the second exemplary embodiment.

As shown in FIG. 23A, the read control unit 20 included in the multi-function device of the second modified example has a selector 20a for digitally lowering the main scanning direction resolution and the subscanning direction resolution of the image data input from an image read unit 10 and after subjected to image processing of shading correction, etc., performed in the read control unit 20 and recording first low resolution data provided by lowering the main scanning direction resolution of the image data after subjected to the image processing and second low resolution data provided by lowering the subscanning direction resolution of the image data after subjected to the image processing in the RAM 80. The selector 20a functions only at the executing time of prescanning operation.

Specifically, at the time of the prescanning operation, the selector 20a included in the read control unit 20 of the second modified example lowers the main scanning direction resolution of the image data after subjected to the image processing to one-eighth to generate the first low resolution data and records the first low resolution data in the RAM 80 and also lowers the subscanning direction resolution of the image data after subjected to the image processing to one-eighth to generate the second low resolution data and records the second low resolution data in the RAM 80.

Figure 23B:
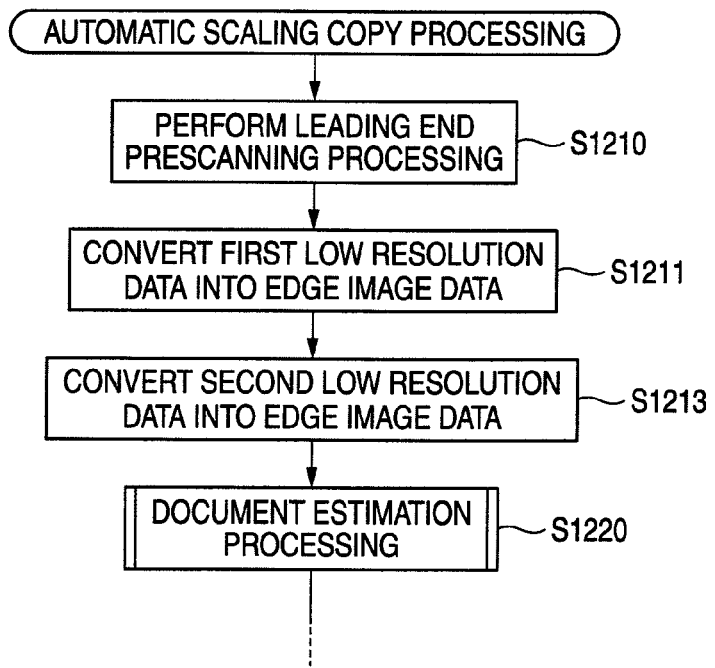
FIG. 23B is a flowchart to represent automatic scaling copy processing executed by a CPU in the second modified example of the second exemplary embodiment of the invention.

In contrast, a CPU 70 processes the post-prescanned image data as follows: FIG. 23B is a flowchart to represent a part of automatic scaling copy processing executed by the CPU 70 in the second modified example in an extraction manner.

As shown in FIG. 23B, when starting the automatic scaling copy processing at S1120, first the CPU 70 in the second modified example executes leading end prescanning processing as in the first modified example. However, here, the image read unit 10 is caused to execute the prescanning operation at the same prescanning resolution as the main scanning direction resolution and the subscanning direction resolution.

When completing the leading end prescanning processing, the CPU 70 goes to S1211 and passes the first low resolution data (image data with the main scanning direction resolution lower than the subscanning direction resolution) recorded in the RAM 80 through an image filter to convert the first low resolution data into edge image data. Then, at S1213, the CPU 70 passes the second low resolution data (image data with the subscanning direction resolution lower than the main scanning direction resolution) recorded in the RAM 80 through an image filter to convert the second low resolution data into edge image data.

Then, at S1220, the CPU 70 executes the document estimation processing shown in FIG. 22 and then executes subsequent processing (S1230 to S1290) as in the exemplary embodiment described above. In the second modified example, however, S1461 is executed using the first low resolution data after converted into the edge image data at S1211, and S1421 and S1451 are executed using the second low resolution data after converted into the edge image data at S1213.

According to the described multi-function device of the second modified example, the processing similar to that of the first modified example (processing of generating the first low resolution data and the second low resolution data) can be implemented using hardware.

The exemplary embodiments of the invention have been described. The function as the image analysis apparatus of the invention is implemented as software by the CPU 70. A read control unit is implemented as the read control unit 20, a detection unit (containing first and second detection units) is implemented as the right edge detection processing (see FIG. 7), the left edge detection processing (see FIG. 10), and the lower edge detection processing (see FIG. 11) executed by the CPU 70. Specifically, "evaluation of likelihood" is implemented as S637, S667, S737, S767, S837, S867.

A conversion unit is implemented as S1215, S1211, S1213 executed by the CPU 70, a first analysis target generation unit is implemented as S1215, S1217 in the first modified example, and a second analysis target generation unit is implemented as S1215, S1219.

The invention is not limited to the above-described exemplary embodiments and can be embodied in various forms. In the description of the exemplary embodiments, the invention is applied to the digital multi-function device 1 including the contact image sensor as the read unit by way of example, but is not limited to an image reading apparatus including a contact image sensor as a read unit.

What is claimed is:

1. An image reading apparatus comprising:
    a document table;
    a read unit, which is movable along the document table, and which reads a document placed on the document table so as to generate image data representing a read image of the document;
    a partial prescanning unit, which conveys the read unit in a partial area of a readable area of the document table that can be read through the read unit, and which controls the read unit to execute read operation in the partial area; and
    a processor comprising:
        a corner estimation unit, which converts the image data of the read result of the read unit provided by the operation of the partial prescanning unit into edge image data representing an edge image, and which estimates position coordinates on the document table corresponding to two of four corners of the document on the assumption that the document placed on the document table is quadrangular based on the edge image data; and
        a document estimation unit that estimates the state of the document placed on the document table based on the estimation result of the corner estimation unit.

2. The image reading apparatus according to claim 1, wherein the document estimation unit is configured to:
    estimate the length of one side of the document placed on the document table from the length between the position coordinates of the two corners estimated by the corner estimation unit;
    estimate the length of the side of the document orthogonal to that side from the estimated length of the side on the assumption that the document placed on the document table is a blank form; and
    estimate the size of the document placed on the document table as the state of the document placed on the document table.

3. The image reading apparatus according to claim 1, wherein the corner estimation unit is configured to:
    extract edge points corresponding to three sides of the document placed on the document table from the edge points indicated by the edge image data; and
    estimate that the position coordinates of two intersection points of three lines provided by approximating the extracted edge points corresponding to each side to a line are the position coordinates corresponding to the corners of the document placed on the document table.

4. The image reading apparatus according to claim 1, wherein the document table has a substantially quadrangular shape, and one specific corner of four corners is defined as a corner with which a corner of the document is to be matched, and
    wherein the partial prescanning unit assumes that an area from an end margin of the document table forming one side of the document table extending from the specific corner of the document table to a position at a predetermined distance from the end margin to the inside of the document table, the area corresponding to the readable area, is the partial area.

5. The image reading apparatus according to claim 4,
    wherein the partial prescanning unit assumes that an area from an end margin of the document table forming one side of the document table extending from the specific corner of the document table to a position at a predetermined distance from the end margin to the inside of the document table, the area corresponding to the readable area, is the partial area, and
    wherein the corner estimation unit extracts the edge points corresponding to a first side of the document to be placed along a first side of the document table, the edge points corresponding to a second side of the document to be placed along a second side extending form the specific corner of the document table and perpendicular to the first side, and the edge points corresponding to a third side of the document parallel to the second side of the document as the edge points corresponding to the three sides of the document placed on the document table from the edge points indicated by the edge image data.

6. The image reading apparatus according to claim 1,
    wherein the document estimation unit estimates a placement area of the document on the document table as the state of the document,
    wherein the image reading apparatus further comprises a read area determination unit that determines that the area on the document table corresponding to the placement area of the document estimated by the document estimation unit is the read area through the read unit, and
    wherein the image reading apparatus conveys the read unit in the read area determined by the read area determination unit and controls the read unit to execute the read operation so as to generate the image data representing the read image of the document.

7. The image reading apparatus according to claim 3,
    wherein the document estimation unit estimates the state of the document by estimating the size of the document placed on the document table based on the estimation result of the corner estimation unit and estimating the inclination of the document placed on the document table with respect to the document table based on the inclination of at least one of the three lines provided by approximating the edge points corresponding to each side of the document to a line, and
    wherein the image reading apparatus corrects an inclination of the image data of the read result of the read unit based on information of the inclination estimated by the document estimation unit and generates the image data representing the read image of the document placed on the document table.

8. The image reading apparatus according to claim 6, wherein the document estimation unit estimates the inclination of the document from the position coordinates of the two corners estimated by the corner estimation unit as the state of the document.

9. The image reading apparatus according to claim 1, further comprising:
    an overall prescanning unit, which conveys the read unit in the whole readable area of the document table, and which controls the read unit to execute the read operation in the whole readable area of the document table;
    a subdocument estimation unit that estimates the state of the document placed on the document table based on the read result of the read unit provided by the operation of the overall prescanning unit; and
    a switching unit that allows either of the partial prescanning unit and the overall prescanning unit to operate in accordance with an external command.

10. An image reading apparatus comprising:
a document table that is transparent;
a read unit that reads an image of a document placed on the document table through the document table so as to generate image data representing the read image of the document;
a processor comprising:
   a conversion unit that converts the image data of the read result of the read unit into edge image data representing an edge image; and
   a corner estimation unit, which extracts edge points corresponding to each side of the document placed on the document table from the edge points indicated by the edge image data provided by the conversion unit, and which estimates the position coordinates of each corner of the document placed on the document table from information of an approximate line of each side provided by approximating the edge points corresponding to each side to a line on the assumption that the document placed on the document table is quadrangular; and
a convex strip, against which the document placed on the document table is struck,
wherein the document table has a specific side defined as a side with which a side of the document is to be matched,
wherein the convex strip is provided at an outer margin corresponding to the specific side of the document table, and
wherein, if extracting the edge points of the side where the edge points are to be extracted results in failure, the corner estimation unit estimates the position coordinates of each corner of the document placed on the document table from the approximate line of each side where extracting the edge points results in success on the assumption that the document placed on the document table is quadrangular and that any corner of the document placed on the document table is struck against the convex strip.

11. The image reading apparatus according to claim 10,
wherein the document table has a substantially quadrangular shape, and two sides extending from one specific corner of the document table are defined each as the specific side with which a side of the document is to be matched and
wherein the corner estimation unit is configured to:
   extract the edge points corresponding to a first side of the document to be placed along a first side of the document table corresponding to the specific side, a second side of the document to be placed along a second side of the document table corresponding to the specific side, and a third side of the document parallel to the second side of the document as the sides where the edge points are to be extracted; and
   estimate the position coordinates of the corner connecting the first and second sides of the document placed on the document table and the position coordinates of the corner connecting the first and third sides of the document as the position coordinates of each corner of the document placed on the document table, and
wherein, if extracting the edge points corresponding to the first or second side results in failure, the corner estimation unit estimates the position coordinates of the corner connecting the first and second sides of the document placed on the document table and the position coordinates of the corner connecting the first and third sides of the document from the approximate line of each side where extracting the edge points results in success on the assumption that the document placed on the document table is quadrangular and that the corner connecting the first and second sides of the document placed on the document table is struck against the convex strip.

12. The image reading apparatus according to claim 11,
wherein, if extracting the edge points corresponding to the second side of the document results in failure and extracting the edge points corresponding to the third side of the document results in success, the corner estimation unit estimates the position coordinates of the corner connecting the first and third sides of the document from information of the edge points corresponding to the third side and estimates that the position coordinates of the point where a line passing through the estimated position coordinates of the corner connecting the first and third sides of the document and perpendicular to an approximate line of the edge points corresponding to the third side of the document crosses the specific side of the document table are the position coordinates of the corner connecting the first and second sides of the document.

13. The image reading apparatus according to claim 11,
wherein, if extracting the edge points corresponding to the first side of the document results in failure and extracting the edge points corresponding to the second and third sides of the document results in success, the corner estimation unit estimates that the position coordinates of the intersection point of an approximate line of the edge points corresponding to the second side of the document and the first side of the document table are the position coordinates of the corner connecting the first and second sides of the document and estimates that the position coordinates of the point where a line passing through the estimated position coordinates of the corner connecting the first and second sides of the document and perpendicular to the approximate line of the edge points corresponding to the third side of the document crosses the approximate line of the third side of the document are the position coordinates of the corner connecting the first and third sides of the document.

14. The image reading apparatus according to claim 11, further comprising:
   a prescanning unit, which conveys the read unit in a partial area of a readable area of the document table, the partial area belonging to an area from the first side of the document table to a position at a predetermined distance from the first side to the inside of the document table, and which controls the read unit to execute read operation in the partial area,
   wherein the corner estimation unit estimates the position coordinates of each corner of the document placed on the document table using the edge image data into which the conversion unit converts the image data of the read result of the read unit provided by the operation of the prescanning unit.

15. The image reading apparatus according to claim 14, further comprising:
   a document estimation unit, which estimates the length of one side of the document placed on the document table from the length between the position coordinates of the two corners estimated by the corner estimation unit, and which estimates the length of the side of the document orthogonal to that side from the estimated length of the side on the assumption that the document placed on the document table is a blank form.

16. An image analysis apparatus for analyzing image data representing a read image of a document generated by an image reading apparatus, the image reading apparatus comprising:
- a document table on which a quadrangular document is placed;
- a read unit that reads the document placed on the document table; and
- a read control unit that controls the read unit to read the document placed on the document table so as to generate the image data representing the read image of the document placed on the document table, an end margin of the document being placed along a specific direction on the document table, wherein the image analysis apparatus comprises:
- a processor comprising a detection unit that referencing the pixel values of pixels forming the image data generated by the read control unit and analyzing the image data so as to adopt either the end margin of the document extending in a first direction as the specific direction and the end margin of the document extending in a second direction perpendicular to the specific direction as the end margin to be detected and detecting the end margin to be detected in the image data, and
- wherein the detection unit references the pixel values of the pixels forming the image data at a first distance interval in the direction perpendicular to the direction in which the end margin to be detected extends, of the first and second directions and references the pixel values of the pixels forming the image data in a skip manner at a second distance interval wider than the first distance interval in the direction in which the end margin to be detected extends, of the first and second directions to detect the end margin to be detected in the image data.

17. The image analysis apparatus according to claim 16,
- wherein, in the image reading apparatus, the end margin of the document is placed along a main scanning direction as the specific direction or a subscanning direction perpendicular to the main scanning direction on the document table, and
- wherein the read control unit conveys the read unit in the subscanning direction along the document table and causes the read unit to read the document placed on the document table in the main scanning direction so as to generate two-dimensional image data with pixels arranged in the main scanning direction and the subscanning direction as the image data representing the read image of the document placed on the document table.

18. The image analysis apparatus according to claim 16, further comprising:
- a conversion unit that converts the image data generated by the read control unit into image data representing an edge image, wherein the detection unit references the pixel values of the pixels forming the image data representing the edge image provided by the conversion unit and detects the end margin to be detected in the image data representing the edge image provided by the conversion unit.

19. The image analysis apparatus according to claim 18,
- wherein the detection unit is configured to:
  - reference the pixel values of the pixels forming the image data representing the edge image provided by the conversion unit from an end of the image data to the inside thereof in the perpendicular direction to the direction in which the end margin to be detected extends so as to detect an edge point as a candidate for the end margin to be detected;
  - reference the pixel values of the pixels forming the image data representing the edge image provided by the conversion unit in the direction in which the end margin to be detected extends, of the first and second directions with the edge point as the candidate as the base point and checks the edge point for continuity so as to evaluate likelihood of the edge point as the candidate as the end margin to be detected; and
  - detect edge points, which are continuous from the edge point as the candidate evaluated to be likely as the end margin to be detected in the direction in which the end margin to be detected extends, as the end margin to be detected.

20. The image analysis apparatus according to claim 16, wherein the detection unit selects each of the end margin of the document extending in the first direction and the end margin of the document extending in the second direction as the end margin to be checked so as to detect each of the end margin of the document extending in the first direction and the end margin of the document extending in the second direction in the image data.

21. An image analysis apparatus for analyzing image data representing a read image of a document generated by an image reading apparatus, the image reading apparatus comprising:
- a document table on which a quadrangular document is placed;
- a read unit that reads the document placed on the document table; and
- a read control unit that conveys the read unit in a subscanning direction along the document table and controls the read unit to read the document placed on the document table in a main scanning direction perpendicular to the subscanning direction so as to generate two-dimensional image data with pixels arranged in the main scanning direction and the subscanning direction as the image data representing the read image of the document placed on the document table, an end margin of the document being placed along the main scanning direction or the subscanning direction on the document table, wherein the image analysis apparatus comprises a processor comprising:
- a first analysis target generation unit that lowers a resolution in the main scanning direction in the image data generated by the read control unit so as to generate first image data to be analyzed;
- a second analysis target generation unit that lowers a resolution in the subscanning direction in the image data generated by the read control unit so as to generate second image data to be analyzed;
- a first detection unit that references the pixel values of pixels forming the first image data to be analyzed and analyzes the image data so as to detect the end margin of the document extending in the main scanning direction in the image data; and
- a second detection unit that references the pixel values of pixels forming the second image data to be analyzed and analyzes the image data so as to detect the end margin of the document extending in the subscanning direction in the image data.

22. The image analysis apparatus according to claim 21,
- wherein the first analysis target generation unit converts the image data generated by the read control unit into image data representing an edge image and lowers the resolution in the main scanning direction in the image data before and after the conversion so as to generate the image data representing the edge image with the resolution lowered in the main scanning direction as the first image data to be analyzed, and wherein the second analysis target generation unit converts the image data generated by the read control unit into image data representing an edge image and lowers the resolution in the subscanning direction in the image data before and after the conversion so as to generate the image data representing the edge image with the resolution lowered in the subscanning direction as the second image data to be analyzed.

23. The image analysis apparatus according to claim 22, wherein the first detection unit is configured to:

reference the pixel values of the pixels forming the first image data to be analyzed from an end of the image data to the inside thereof in the subscanning direction so as to detect an edge point as a candidate for the end margin to be detected;

reference the pixel values of the pixels forming the first image data to be analyzed in the main scanning direction with the edge point as the candidate as the base point and checks the edge point for continuity so as to evaluate likelihood of the edge point as the candidate as the end margin of the document extending in the main scanning direction; and detect edge points, which are continuous in the main scanning direction from the edge point as the candidate evaluated to be likely as the end margin of the document extending in the main scanning direction, as the end margin of the document extending in the main scanning direction, and wherein the second detection unit is configured to:

reference the pixel values of the pixels forming the second image data to be analyzed from an end of the image data to the inside thereof in the main scanning direction so as to detect an edge point as a candidate for the end margin to be detected;

reference the pixel values of the pixels forming the second image data to be analyzed in the subscanning direction with the edge point as the candidate as the base point and checks the edge point for continuity so as to evaluate likelihood of the edge point as the candidate as the end margin of the document extending in the subscanning direction; and detect edge points, which are continuous in the subscanning direction from the edge point as the candidate evaluated to be likely as the end margin of the document extending in the subscanning direction, as the end margin of the document extending in the subscanning direction.

24. An image reading apparatus comprising:

a document table on which a quadrangular document is placed;

a read unit that reads the document placed on the document table;

a read control unit that controls the read unit to read the document placed on the document table so as to generate the image data representing the read image of the document placed on the document table, an end margin of the document being placed along a specific direction on the document table; and the image analysis apparatus according to claim 16.

25. An image reading apparatus comprising:

a document table on which a quadrangular document is placed;

a read unit that reads the document placed on the document table;

a read control unit that conveys the read unit in a subscanning direction along the document table and controls the read unit to read the document placed on the document table in a main scanning direction perpendicular to the subscanning direction so as to generate two-dimensional image data with pixels arranged in the main scanning direction and the subscanning direction as the image data representing the read image of the document placed on the document table, an end margin of the document being placed along the main scanning direction or the subscanning direction on the document table; and the image analysis apparatus according to claim 21.

26. An image reading apparatus comprising:

a document table on which a quadrangular document is placed;

a read unit that reads the document placed on the document table; and a processor comprising a read control unit that conveys the read unit in a subscanning direction along the document table and controls the read unit to read the document placed on the document table in a main scanning direction perpendicular to the subscanning direction so as to generate two-dimensional image data with pixels arranged in the main scanning direction and the subscanning direction as the image data representing the read image of the document placed on the document table, an end margin of the document being placed along the main scanning direction or the subscanning direction on the document table, wherein the read control unit is configured to:

generate first image data with the resolution in the main scanning direction lower than the resolution in the subscanning direction; and generate the second image data with the resolution in the subscanning direction lower than the resolution in the main scanning direction as the two-dimensional image data, and wherein the image reading apparatus further comprises:

a first detection unit that references the pixel values of pixels forming the first image data and analyzes the image data so as to detect the end margin of the document extending in the main scanning direction in the image data; and a second detection unit that references the pixel values of pixels forming the second image data and analyzes the image data so as to detect the end margin of the document extending in the subscanning direction in the image data.

\* \* \* \* \*